(12) United States Patent
Fleury, Jr. et al.

(10) Patent No.: US 9,593,999 B2
(45) Date of Patent: Mar. 14, 2017

(54) ENCLOSURE FOR LEAK DETECTOR

(75) Inventors: Leo W. Fleury, Jr., N. Smithfield, RI (US); Ganapathi Deva Varma Dintakurti, Brampton (CA); James O. Williams, Marlborough, MA (US); Shabbir Yusuf, Mississauga (CA)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 13/492,795

(22) Filed: Jun. 8, 2012

(65) Prior Publication Data

US 2013/0036796 A1 Feb. 14, 2013

Related U.S. Application Data

(60) Provisional application No. 61/523,274, filed on Aug. 12, 2011.

(51) Int. Cl.

| G01M 3/00 | (2006.01) |
|---|---|
| G01M 3/24 | (2006.01) |
| E03B 7/00 | (2006.01) |
| E03B 7/07 | (2006.01) |
| F16M 13/02 | (2006.01) |
| G08B 21/20 | (2006.01) |
| B26F 1/14 | (2006.01) |
| G01F 17/00 | (2006.01) |
| E03B 9/02 | (2006.01) |

(52) U.S. Cl.
CPC ............... *G01M 3/00* (2013.01); *B26F 1/14* (2013.01); *E03B 7/003* (2013.01); *E03B 7/071* (2013.01); *F16M 13/02* (2013.01); *G01F 17/00* (2013.01); *G01M 3/24* (2013.01); *G01M 3/243* (2013.01); *G08B 21/20* (2013.01); *E03B 9/02* (2013.01); *Y10T 83/04* (2015.04)

(58) Field of Classification Search
CPC ...... G01V 1/186; E03B 9/06; E03B 7/071; E03B 7/003; A62C 35/20; G01M 3/00; G01M 3/24; G01M 3/243
USPC .......................... 73/40.5 A, 40.5 R; 174/521
See application file for complete search history.

(56) References Cited

U.S. PATENT DOCUMENTS

| 3,592,967 A | 7/1971 | Harris |
| 3,612,922 A * | 10/1971 | Furnival ............... H03H 9/09 310/351 |
| 3,673,856 A | 7/1972 | Panigati |
| 3,815,129 A | 6/1974 | Sweany |

(Continued)

FOREIGN PATENT DOCUMENTS

| AU | 2011265675 | 5/2015 |
| CA | 2397174 | 8/2008 |

(Continued)

OTHER PUBLICATIONS

English translation of JP 2002206965 to Araki.*

(Continued)

*Primary Examiner* — Laura Martin
*Assistant Examiner* — Irving A Campbell
(74) *Attorney, Agent, or Firm* — Taylor English Duma LLP

(57) ABSTRACT

A leak detection structure for attachment to a fire hydrant includes an enclosure, the enclosure defining a cavity internal to the enclosure and a leak detection subassembly located in the cavity, the leak detection subassembly including at least one leak detection sensor and at least one circuit.

19 Claims, 29 Drawing Sheets

(56) References Cited

U.S. PATENT DOCUMENTS

| | | | |
|---|---|---|---|
| 4,056,970 A | | 11/1977 | Sollish |
| 4,083,229 A | | 4/1978 | Anway |
| 4,333,028 A | | 6/1982 | Panton |
| 4,431,873 A | * | 2/1984 | Dunn et al. .................... 381/162 |
| 4,462,249 A | | 7/1984 | Adams |
| 4,467,236 A | | 8/1984 | Kolm et al. |
| 4,543,817 A | | 10/1985 | Sugiyama |
| 4,930,358 A | | 6/1990 | Motegi et al. |
| 4,984,498 A | | 1/1991 | Fishman |
| 5,038,614 A | | 8/1991 | Bseisu et al. |
| 5,052,215 A | | 10/1991 | Lewis |
| 5,078,006 A | | 1/1992 | Maresca et al. |
| 5,085,082 A | | 2/1992 | Cantor et al. |
| 5,090,234 A | | 2/1992 | Maresca et al. |
| 5,117,676 A | | 6/1992 | Chang |
| 5,118,464 A | | 6/1992 | Richardson et al. |
| 5,163,314 A | | 11/1992 | Maresca et al. |
| 5,165,280 A | | 11/1992 | Sternberg et al. |
| 5,170,657 A | | 12/1992 | Maresca et al. |
| 5,174,155 A | | 12/1992 | Sugimoto |
| 5,187,973 A | | 2/1993 | Kunze et al. |
| 5,189,904 A | | 3/1993 | Maresca et al. |
| 5,201,226 A | | 4/1993 | John et al. |
| 5,203,202 A | | 4/1993 | Spencer |
| 5,205,173 A | | 4/1993 | Allen |
| 5,209,125 A | | 5/1993 | Kalinoski et al. |
| 5,218,859 A | | 6/1993 | Stenstrom et al. |
| 5,243,862 A | | 9/1993 | Latimer |
| 5,254,944 A | | 10/1993 | Holmes et al. |
| 5,272,646 A | | 12/1993 | Farmer |
| 5,279,160 A | | 1/1994 | Koch |
| 5,287,884 A | | 2/1994 | Cohen |
| 5,303,592 A | | 4/1994 | Livingston |
| 5,319,956 A | | 6/1994 | Bogle et al. |
| 5,333,501 A | | 8/1994 | Okada et al. |
| 5,335,547 A | | 8/1994 | Nakajima et al. |
| 5,343,737 A | | 9/1994 | Baumoel |
| 5,349,568 A | | 9/1994 | Kupperman et al. |
| 5,351,655 A | | 10/1994 | Nuspl |
| 5,361,636 A | | 11/1994 | Farstad et al. |
| 5,367,911 A | | 11/1994 | Jewell et al. |
| 5,385,049 A | | 1/1995 | Hunt et al. |
| 5,396,800 A | | 3/1995 | Drinon et al. |
| 5,408,883 A | | 4/1995 | Clark et al. |
| 5,416,724 A | | 5/1995 | Savic |
| 5,461,906 A | | 10/1995 | Bogle et al. |
| 5,519,184 A | * | 5/1996 | Umlas ...................... 219/121.64 |
| 5,526,691 A | | 6/1996 | Latimer et al. |
| 5,531,099 A | | 7/1996 | Russo |
| 5,548,530 A | | 8/1996 | Baumoel |
| 5,581,037 A | | 12/1996 | Kwun et al. |
| 5,591,912 A | | 1/1997 | Spisak et al. |
| 5,602,327 A | * | 2/1997 | Torizuka ................ H04R 17/00 73/40.5 A |
| 5,611,948 A | | 3/1997 | Hawkins |
| 5,619,423 A | | 4/1997 | Scrantz |
| 5,623,203 A | | 4/1997 | Hosohara et al. |
| 5,633,467 A | | 5/1997 | Paulson |
| 5,639,958 A | * | 6/1997 | Lange ...................... 73/40.5 A |
| 5,655,561 A | * | 8/1997 | Wendel et al. ................. 137/79 |
| 5,686,828 A | | 11/1997 | Peterman et al. |
| 5,708,195 A | | 1/1998 | Kurisu et al. |
| 5,708,211 A | | 1/1998 | Jepson et al. |
| 5,754,101 A | | 5/1998 | Tsunetomi et al. |
| 5,760,306 A | | 6/1998 | Wyatt et al. |
| 5,789,720 A | | 8/1998 | LaGally et al. |
| 5,798,457 A | | 8/1998 | Paulson |
| 5,838,633 A | | 11/1998 | Sinha |
| 5,866,820 A | | 2/1999 | Camplin et al. |
| 5,892,163 A | | 4/1999 | Johnson |
| 5,907,100 A | | 5/1999 | Cook |
| 5,965,818 A | | 10/1999 | Wang |
| 5,970,434 A | | 10/1999 | Brophy et al. |
| 5,974,862 A | | 11/1999 | Lander et al. |
| 5,987,990 A | | 11/1999 | Worthington et al. |
| 6,000,277 A | | 12/1999 | Smith |
| 6,000,288 A | | 12/1999 | Kwun et al. |
| 6,003,376 A | | 12/1999 | Burns et al. |
| 6,023,986 A | | 2/2000 | Smith et al. |
| 6,035,717 A | | 3/2000 | Carodiskey |
| 6,076,407 A | | 6/2000 | Levesque et al. |
| 6,082,193 A | | 7/2000 | Paulson |
| 6,125,703 A | | 10/2000 | MacLauchlan et al. |
| 6,127,823 A | | 10/2000 | Atherton |
| 6,138,512 A | | 10/2000 | Roberts et al. |
| 6,138,514 A | | 10/2000 | Iwamoto et al. |
| 6,164,137 A | | 12/2000 | Hancock et al. |
| 6,170,334 B1 | | 1/2001 | Paulson |
| 6,175,380 B1 | | 1/2001 | Van Den Bosch |
| 6,192,352 B1 | | 2/2001 | Alouani et al. |
| 6,243,657 B1 | | 6/2001 | Tuck et al. |
| 6,267,000 B1 | | 7/2001 | Harper et al. |
| 6,276,213 B1 | * | 8/2001 | Lee et al. ...................... 73/660 |
| 6,296,066 B1 | | 10/2001 | Terry |
| 6,363,788 B1 | | 4/2002 | Gorman et al. |
| 6,389,881 B1 | | 5/2002 | Yang et al. |
| 6,401,525 B1 | | 6/2002 | Jamieson |
| 6,404,343 B1 | | 6/2002 | Andou et al. |
| 6,442,999 B1 | | 9/2002 | Baumoel |
| 6,453,247 B1 | | 9/2002 | Hunaidi |
| 6,470,749 B1 | | 10/2002 | Han et al. |
| 6,530,263 B1 | * | 3/2003 | Chana ...................... 73/40.5 R |
| 6,561,032 B1 | | 5/2003 | Hunaidi |
| 6,567,006 B1 | | 5/2003 | Lander et al. |
| 6,578,422 B2 | | 6/2003 | Lam et al. |
| 6,595,038 B2 | | 7/2003 | Williams et al. |
| 6,624,628 B1 | | 9/2003 | Kwun et al. |
| 6,647,762 B1 | | 11/2003 | Roy |
| 6,651,503 B2 | | 11/2003 | Bazarov et al. |
| 6,666,095 B2 | | 12/2003 | Thomas et al. |
| 6,667,709 B1 | | 12/2003 | Hansen et al. |
| 6,707,762 B1 | | 3/2004 | Goodman et al. |
| 6,710,600 B1 | | 3/2004 | Kopecki et al. |
| 6,725,705 B1 | | 4/2004 | Huebler et al. |
| 6,734,674 B1 | | 5/2004 | Struse |
| 6,745,136 B2 | | 6/2004 | Lam et al. |
| 6,751,560 B1 | | 6/2004 | Tingley et al. |
| 6,772,636 B2 | | 8/2004 | Lam et al. |
| 6,772,637 B2 | | 8/2004 | Bazarov et al. |
| 6,772,638 B2 | | 8/2004 | Matney et al. |
| 6,781,369 B2 | | 8/2004 | Paulson et al. |
| 6,782,751 B2 | | 8/2004 | Linares et al. |
| 6,789,427 B2 | | 9/2004 | Batzinger et al. |
| 6,791,318 B2 | | 9/2004 | Paulson et al. |
| 6,799,466 B2 | | 10/2004 | Chinn |
| 6,813,949 B2 | | 11/2004 | Masaniello et al. |
| 6,813,950 B2 | | 11/2004 | Glascock et al. |
| 6,816,072 B2 | | 11/2004 | Zoratti et al. |
| 6,820,016 B2 | | 11/2004 | Brown et al. |
| 6,822,742 B1 | | 11/2004 | Kalayeh et al. |
| 6,843,131 B2 | | 1/2005 | Graff et al. |
| 6,848,313 B2 | | 2/2005 | Krieg et al. |
| 6,851,319 B2 | | 2/2005 | Ziola et al. |
| 6,889,703 B2 | | 5/2005 | Bond |
| 6,904,818 B2 | | 6/2005 | Harthorn et al. |
| 6,912,472 B2 | | 6/2005 | Mizushina et al. |
| 6,920,792 B2 | | 7/2005 | Flora et al. |
| 6,931,931 B2 | | 8/2005 | Graff et al. |
| 6,935,178 B2 | | 8/2005 | Prause |
| 6,945,113 B2 | | 9/2005 | Siverling et al. |
| 6,957,157 B2 | | 10/2005 | Lander |
| 6,968,727 B2 | | 11/2005 | Kwun et al. |
| 6,978,832 B2 | | 12/2005 | Gardner et al. |
| 7,051,577 B2 | | 5/2006 | Komninos |
| 7,080,557 B2 | | 7/2006 | Adnan |
| 7,111,516 B2 | | 9/2006 | Bazarov et al. |
| 7,140,253 B2 | | 11/2006 | Merki et al. |
| 7,143,659 B2 | | 12/2006 | Stout et al. |
| 7,171,854 B2 | | 2/2007 | Nagashima et al. |
| 7,231,331 B2 | | 6/2007 | Davis |
| 7,234,355 B2 | | 6/2007 | Dewangan et al. |
| 7,240,574 B2 | | 7/2007 | Sapelnikov |
| 7,255,007 B2 | | 8/2007 | Messer et al. |
| 7,261,002 B1 | | 8/2007 | Gysling et al. |

(56) References Cited

U.S. PATENT DOCUMENTS

| | | | |
|---|---|---|---|
| 7,266,992 B2 | 9/2007 | Shamout et al. | |
| 7,274,996 B2 | 9/2007 | Lapinski | |
| 7,284,433 B2 | 10/2007 | Ales et al. | |
| 7,293,461 B1 | 11/2007 | Girndt | |
| 7,299,697 B2 | 11/2007 | Siddu et al. | |
| 7,310,877 B2 | 12/2007 | Cao et al. | |
| 7,328,618 B2 | 2/2008 | Hunaidi et al. | |
| 7,331,215 B2 | 2/2008 | Bond | |
| 7,356,444 B2 | 4/2008 | Blemel | |
| 7,360,462 B2 | 4/2008 | Nozaki et al. | |
| 7,373,808 B2 | 5/2008 | Zanker et al. | |
| 7,380,466 B2 | 6/2008 | Deeg | |
| 7,383,721 B2 | 6/2008 | Parsons et al. | |
| 7,392,709 B2 | 7/2008 | Echert | |
| 7,405,391 B2 | 7/2008 | Ogisu et al. | |
| 7,412,882 B2 | 8/2008 | Lazar et al. | |
| 7,412,890 B1 | 8/2008 | Johnson et al. | |
| 7,414,395 B2 | 8/2008 | Gao et al. | |
| 7,418,354 B1 | 8/2008 | Greenlee et al. | |
| 7,426,879 B2 | 9/2008 | Nozaki et al. | |
| 7,458,267 B2 | 12/2008 | McCoy | |
| 7,475,596 B2 | 1/2009 | Hunaidi et al. | |
| 7,493,817 B2 | 2/2009 | Germata | |
| 7,523,666 B2 | 4/2009 | Thompson et al. | |
| 7,526,944 B2 | 5/2009 | Sabata et al. | |
| 7,530,270 B2 | 5/2009 | Nozaki et al. | |
| 7,543,500 B2 | 6/2009 | Litzenberg et al. | |
| 7,554,345 B2 | 6/2009 | Vokey | |
| 7,564,540 B2 | 7/2009 | Paulson | |
| 7,587,942 B2 | 9/2009 | Smith et al. | |
| 7,590,496 B2 | 9/2009 | Blemel | |
| 7,596,458 B2 | 9/2009 | Lander | |
| 7,607,351 B2 | 10/2009 | Allison et al. | |
| 7,623,427 B2 | 11/2009 | Jann et al. | |
| 7,647,829 B2 | 1/2010 | Junker et al. | |
| 7,650,790 B2 | 1/2010 | Wright | |
| 7,657,403 B2 | 2/2010 | Stripf et al. | |
| 7,668,670 B2 | 2/2010 | Lander | |
| 7,680,625 B2 | 3/2010 | Trowbridge et al. | |
| 7,690,258 B2 | 4/2010 | Minagi et al. | |
| 7,694,564 B2 | 4/2010 | Brignac et al. | |
| 7,696,940 B1 | 4/2010 | MacDonald | |
| 7,711,217 B2 | 5/2010 | Takahashi et al. | |
| 7,751,989 B2 | 7/2010 | Owens et al. | |
| 7,810,378 B2 | 10/2010 | Hunaidi et al. | |
| 7,980,317 B1* | 7/2011 | Preta | A62C 37/00 169/60 |
| 8,319,508 B2 | 11/2012 | Vokey | |
| 8,620,602 B2 | 12/2013 | Alonso | |
| 8,674,830 B2 | 3/2014 | Lanham et al. | |
| 8,843,241 B2 | 9/2014 | Saberi et al. | |
| 8,931,505 B2 | 1/2015 | Hyland et al. | |
| 9,291,520 B2 | 3/2016 | Fleury, Jr. et al. | |
| 2001/0045129 A1 | 11/2001 | Williams et al. | |
| 2002/0043549 A1* | 4/2002 | Taylor et al. | 228/179.1 |
| 2002/0159584 A1 | 10/2002 | Sindalovsky et al. | |
| 2003/0107485 A1* | 6/2003 | Zoratti | A62C 31/28 340/568.1 |
| 2003/0167847 A1 | 9/2003 | Brown et al. | |
| 2005/0005680 A1 | 1/2005 | Anderson | |
| 2005/0067022 A1 | 3/2005 | Istre | |
| 2005/0072214 A1 | 4/2005 | Cooper | |
| 2005/0121880 A1 | 6/2005 | Santangelo | |
| 2005/0279169 A1 | 12/2005 | Lander | |
| 2006/0283251 A1 | 12/2006 | Hunaidi | |
| 2007/0051187 A1 | 3/2007 | McDearmon | |
| 2007/0113618 A1 | 5/2007 | Yokoi et al. | |
| 2007/0130317 A1 | 6/2007 | Lander | |
| 2008/0078567 A1* | 4/2008 | Miller et al. | 174/70 R |
| 2008/0189056 A1 | 8/2008 | Heidl et al. | |
| 2008/0281534 A1 | 11/2008 | Hurley | |
| 2008/0300803 A1 | 12/2008 | Drake et al. | |
| 2008/0307623 A1 | 12/2008 | Frukawa | |
| 2009/0044628 A1 | 2/2009 | Lotscher | |
| 2009/0058088 A1 | 3/2009 | Pitchford et al. | |
| 2009/0133887 A1 | 5/2009 | Garcia et al. | |
| 2009/0182099 A1 | 7/2009 | Noro et al. | |
| 2009/0214941 A1* | 8/2009 | Buck et al. | 429/120 |
| 2009/0216353 A1 | 8/2009 | Van Reck | |
| 2009/0278293 A1* | 11/2009 | Yoshinaka et al. | 267/140.11 |
| 2010/0077234 A1 | 3/2010 | Das | |
| 2010/0156632 A1 | 6/2010 | Hyland et al. | |
| 2010/0290201 A1 | 11/2010 | Takeuchi et al. | |
| 2010/0295672 A1 | 11/2010 | Hyland et al. | |
| 2010/0312502 A1 | 12/2010 | Alonso | |
| 2011/0066297 A1 | 3/2011 | Saberi | |
| 2011/0079402 A1 | 4/2011 | Darby et al. | |
| 2011/0308638 A1* | 12/2011 | Hyland et al. | 137/299 |
| 2012/0007743 A1* | 1/2012 | Solomon | G01M 3/243 340/605 |
| 2012/0007744 A1 | 1/2012 | Pal et al. | |
| 2012/0296580 A1 | 11/2012 | Barkay | |
| 2013/0036796 A1 | 2/2013 | Fleury et al. | |
| 2015/0082868 A1 | 3/2015 | Hyland | |
| 2016/0001114 A1 | 1/2016 | Hyland | |

FOREIGN PATENT DOCUMENTS

| | | | |
|---|---|---|---|
| CA | 2725065 | 11/2009 | |
| CA | 2634739 | 6/2015 | |
| DE | 4211038 | 10/1993 | |
| DE | 19757581 | 7/1998 | |
| EP | 1052492 | 11/2000 | |
| EP | 1077370 | 2/2001 | |
| EP | 1077371 | 2/2001 | |
| FR | 2439990 | 3/1980 | |
| FR | 2776065 | 9/1999 | |
| GB | 2250820 | 6/1992 | |
| GB | 2269900 | 2/1994 | |
| GB | 2367362 | 4/2002 | |
| GB | 2421311 | 6/2006 | |
| JP | 59170739 | 9/1984 | |
| JP | 60111132 | 6/1985 | |
| JP | 08250777 | 9/1996 | |
| JP | H10-2744 | 1/1998 | |
| JP | H11210028 | 8/1999 | |
| JP | 2000131179 | 5/2000 | |
| JP | 2002206965 A * | 7/2002 | G01H 3/00 |
| JP | 2002310840 | 10/2002 | |
| JP | 2005315663 | 11/2005 | |
| JP | 2005321935 | 11/2005 | |
| JP | 2006062414 | 3/2006 | |
| JP | 2006062716 | 3/2006 | |
| JP | 2007047139 | 3/2010 | |
| JP | 2010068017 | 12/2011 | |
| JP | 2013528732 | 7/2013 | |
| JP | H5654124 | 11/2014 | |
| WO | 9850771 | 11/1998 | |
| WO | 0151904 | 7/2001 | |
| WO | 2009057214 | 5/2009 | |
| WO | 2009067770 | 6/2009 | |
| WO | 2009143287 | 11/2009 | |
| WO | 2010135587 | 11/2010 | |
| WO | 2011021039 | 2/2011 | |
| WO | 2011058561 | 5/2011 | |
| WO | 2011159403 | 12/2011 | |
| WO | 2012000088 | 1/2012 | |
| WO | 2012153147 | 11/2012 | |
| WO | 2013025526 | 2/2013 | |
| WO | 2014066764 | 5/2014 | |

OTHER PUBLICATIONS

Non-Patent Literature "Radiodetection Water Leak Detection Products", 2008, Radiodetection Ltd.—SPX Corporation.*

Fleury, Leo W., U.S. Provisional Patent Application Entitled: Insitu Leak Detection under U.S. Appl. No. 61/523,274, filed Aug. 12, 2011; 35 pgs.

Fleury, Jr., Leo W.; U.S. Patent Application Entitled: Fire Hydrant Leak Detector under U.S. Appl. No. 13/492,790, filed Jun. 8, 2012, 69 pgs.

(56) References Cited

OTHER PUBLICATIONS

Fleury, Jr., Leo W.; U.S. Patent Application Entitled: Leak Detector and Sensor under U.S. Appl. No. 13/492,792, filed Jun. 8, 2012, 68 pgs.
Fleury, Jr., Leo W.; U.S. Patent Application Entitled: Leak Detector under U.S. Appl. No. 13/492,794, filed Jun. 8, 2012, 69 pgs.
Fleury, Jr., Leo W.; PCT Application Entitled: Fire Hydrant Leak Detector under U.S. Appl. No. PCT/US12/50390, filed Aug. 10, 2012, 80 pgs.
Fleury, Leo W.; International Search Report and Written Opinion for serial No. PCT/US12/50390 filed Aug. 10, 2012, mailed Dec. 17, 2012, 18 pgs.
Fleury, Jr., Leo W.; Non-Final Office Action for U.S. Appl. No. 13/492,790, filed Jun. 8, 2012, mailed Sep. 12, 2013; 37 pgs.
Richarz, Werner Guenther; Restriction Requirement for U.S. Appl. No. 13/492,792, filed Jun. 8, 2012, mailed Sep. 27, 2013; 5 pgs.
Richarz, Werner Guenther; Non-Final Office Action for U.S. Appl. No. 13/492,792, filed Jun. 8, 2012, mailed Nov. 6, 2013, 39 pgs.
Richarz, Werner Guenther; Non-Final Office Action for U.S. Appl. No. 13/492,792, filed Jun. 8, 2012, mailed Jun. 4, 2014, 24 pgs.
Fleury, Jr., Leo W.; Advisory Action for U.S. Appl. No. 13/492,790, filed Jun. 8, 2012, mailed Jul. 9, 2014, 3 pgs.
Fleury, Leo W.; International Preliminary Report on Patentability for serial No. PCT/US12/50390 filed Aug. 10, 2012, mailed Feb. 18, 2014, 14 pgs.
Fleury, Jr., Leo W.; Final Office Action for U.S. Appl. No. 13/492,790, filed Jun. 8, 2012, mailed Mar. 12, 2014; 19 pgs.
Richarz, Werner Guenther; Final Office Action for U.S. Appl. No. 13/492,792, filed Jun. 18, 2012, mailed Oct. 20, 2014, 17 pgs.
Zusman, George V.; U.S. Patent Application entitled: Piezoelectric Vibration Sensor for Fluid Leak Detection, having U.S. Appl. No. 14/503,951, filed Oct. 1, 2014, 32 pgs.
Fleury Jr., Leo W.; Non-Final Office Action for U.S. Appl. No. 13/492,790, filed Jun. 8, 2012, mailed Nov. 5, 2014, 30 pgs.
Dintakurti, Ganapathi Deva Varma; Non-Final Office Action for U.S. Appl. No. 13/492,794, filed Jun. 8, 2012, mailed Jan. 16, 2015, 60 pgs.
Fleury Jr., Leo W.; European Search Report for serial No. 12823594, filed Aug. 10, 2012, mailed Jun. 8, 2015, 11 pgs.
Richarz, Werner Guenther; Non-Final Office Action for U.S. Appl. No. 13/492,792, filed Jun. 8, 2012, mailed Feb. 27, 2015, 15 pgs.
Fleury, et al.; Supplemental European Search Report for application No. 12823594.2, filed Aug. 20, 2012, mailed Feb. 18, 2015, 6 pgs.
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.
Fleury, Jr., Leo W.; Notice of Allowance for U.S. Appl. No. 13/492,790, filed Jun. 8, 2012, mailed May 12, 2015, 9 pgs.
Fleury, Jr., Leo W.; Notice of Allowance for U.S. Appl. No. 13/492,790, filed Jun. 8, 2012, mailed Sep. 23, 2015, 11 pgs.
Richarz, Werner Guenther; Final Office Action for U.S. Appl. No. 13/492,792, filed Jun. 8, 2012, mailed Sep. 10, 2015, 20 pgs.
Bracken, Marc; U.S. Patent Application entitled: Detecting Leaks in a Fluid Distribution System, having U.S. Appl. No. 14/063,334, filed Oct. 25, 2013, 34 pgs.
Hunaidi, Osama; Issue Notification for U.S. Appl. No. 11/766,288, filed Jun. 21, 2007, mailed Sep. 22, 2010, 1 pg.
Hunaidi, Osama; Non-Final Office Action for U.S. Appl. No. 11/766,288, filed Jun. 21, 2007, mailed Jan. 20, 2010, 50 pgs.
Hunaidi, Osama; Notice of Allowance for U.S. Appl. No. 11/766,288, filed Jun. 21, 2007, mailed Jun. 24, 2010, 8 pgs.
Hunaidi, Osama; U.S. Patent Application entitled: Monitoring of Leakage in Wastewater Force Mains and Other Pipes Carrying Fluid under Pressure, having U.S. Appl. No. 11/766,288, filed Jun. 21, 2007, 33 pgs.
Fleury, Leo W.; U.S. Continuation Application entitled: Leak Detector having U.S. Appl. No. 14/870,070, filed Sep. 30, 2015, 80 pgs.
Bracken, Mark; International Preliminary Report on Patentability for serial No. PCT/US2013/066817, filed Oct. 25, 2013, mailed Apr. 28, 2015, 8 pgs.

Bracken, Mark; International Search Report and Written Opinion for serial No. PCT/US2013/066817, filed Oct. 25, 2013, mailed Mar. 18, 2014, 9 pgs.
Bracken, Mark; PCT Application entitled: Detecting Leaks in a Fluid Distribution System, having serial No. PCT/US13/66817, filed Oct. 25, 2013, 33 pgs.
Bracken, Marc; U.S. Provisional Application entitled: Detecting Leaks in Water Pipes, having U.S. Appl. No. 61/719,320, filed Oct. 26, 2012, 33 pgs.
Fleury, Jr., Leo W.; Issue Notification for U.S. Appl. No. 13/492,790, filed Jun. 8, 2012, mailed Mar. 2, 2016, 1 pg.
Fleury, Jr., Leo W.; Notice of Allowance for U.S. Appl. No. 13/492,790, filed Jun. 8, 2012, mailed Feb. 2, 2016, 9 pgs.
Bracken, Marc; Written Opinion for Singapore application No. 11201503041s, filed Oct. 25, 2013, mailed Jan. 5, 2016, 7 pgs.
Richarz, Werner Guenther; Non-Final Office Action for U.S. Appl. No. 13/492,792, filed Jun. 8, 2012, mailed Mar. 8, 2016, 27 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Non-Final Office Action for U.S. Appl. No. 13/492,794, filed Jun. 8, 2012, mailed May 17, 2016, 48 pgs.
Bracken, Marc; Partial Supplementary European Search Report for European application No. 13849336.6, filed Oct. 15, 2013, mailed Mar. 11, 2016, 7 pgs.
Zusman, George V.; Extended European Search Report for serial No. 15188004.4, filed Oct. 1, 2015, mailed Feb. 22, 2016, 9 pgs.
Non-Patent Literature Bimorph (entitled "Bimoprh actuators"), accessed at http://web.archive.org/web/20080122050424/http://www.elpapiezo.ru/eng/curve_e.shtml, archived on Jan. 22, 2008.
Non-Patent Literature Murata (entitled "Piezoelectric Sounds Components"), accessed at http://web.archive.org/web/20030806141815/http://www.murata.com/catalog/p37e17.pdf, archived on Aug. 6, 2003.
Non-Patent Literature NerdKits, accessed at http://web.archive.org/web/20090510051850/http://www.nerdkits.com/videos/sound_meter/, archived on May 10, 2009.
Hyland, Gregory E., Non-Final Office Action for U.S. Appl. No. 13/101,235, filed May 5, 2011, mailed Jul. 31, 2013; 57 pgs.
Hyland, Gregory E.; Final Office Action for U.S. Appl. No. 13/101,235, filed May 5, 2011, mailed Feb. 20, 2014; 29 pgs.
Hyland, Gregory E.; Issue Notification for U.S. Appl. No. 13/101,235, filed May 5, 2011, mailed Dec. 23, 2014, 1 pg.
Hyland, Gregory E.; Non-Final Office Action for U.S. Appl. No. 13/101,235, filed May 5, 2011, mailed Jun. 5, 2014, 29 pgs.
Hyland, Gregory E.; Notice of Allowance for U.S. Appl. No. 13/101,235, filed May 5, 2011, mailed Sep. 11, 2014, 11 pgs.
Hyland, Gregory E.; Supplemental Notice of Allowability for U.S. Appl. No. 13/101,235, filed May 5, 2011, mailed Nov. 25, 2014, 5 pgs.
Antenna. Merriam-Webster Dictionary, 2014 [retrieved on Jun. 1, 2014]. Retrieved from the Internet: <URL: www.merriam-webster.com/dictionary/antenna>, 1 pg.
Hyland, Gregory E.; Final Office Action for U.S. Appl. No. 14/557,754, filed Dec. 2, 2014, mailed Jun. 30, 2016, 24 pgs.
Hyland, Gregory E.; Non-Final Office Action for U.S. Appl. No. 14/557,754, filed Dec. 2, 2014, mailed Jan. 19, 2016, 101 pgs.
Richarz, Werner Guenther; Final Office Action for U.S. Appl. No. 13/492,792, filed Jun. 8, 2012, mailed Sep. 8, 2016, 36 pgs.
Hyland, Gregory E.; Final Office Action for U.S. Appl. No. 14/848,676, filed Sep. 9, 2015, mailed Aug. 19, 2016; 20 pgs.
Hyland, Gregory; Non-Final Office Action for U.S. Appl. No. 14/848,676, filed Sep. 9, 2015, mailed Mar. 4, 2016, 94 pgs.
Gibson, Daryl Lee; U.S Patent Application entitled: Nozzle Cap Multi-band Antenna Assembly, having U.S. Appl. No. 15/255,795, filed Sep. 2, 2016.
Hyland; International Preliminary Report on Patentability for serial No. PCT/US2011/035374, filed May 5, 2011, mailed Dec. 19, 2012; 5 pgs.
Hyland; International Search Report and Written Opinion for serial No. PCT/US2011/035374, filed May 5, 2011, mailed Sep. 13, 2011; 7 pgs.

(56) References Cited

OTHER PUBLICATIONS

Gibson, Daryl Lee; U.S. Provisional Application entitled: Nozzle Cap Multi-Band Antenna Assembly having U.S. Appl. No. 62/294,973, filed Feb. 12, 2016.

Hyland, Gregory E.; Mexico Office Action for serial No. MX/a/2012/000347, filed May 5, 2011, mailed May 30, 2016, 4 pgs.

Hyland, Gregory E.; Australian Patent Examination Report for serial No. 2011265675, filed Jan. 21, 2012, mailed Oct. 1, 2014, 3 pgs.

Hyland, Gregory E.; Japanese Office Action for serial No. 2013515338, filed Jan. 30, 2012, mailed Jun. 10, 2014, 8 pgs.

Hyland, Gregory E.; Japanese Office Action for serial No. 2014-234642, filed May 5, 2011, mailed Nov. 4, 2015, 9 pgs.

Hyland, Gregory E.; Japanese Office Action for serial No. 2014-234642, filed May 5, 2011, mailed Jul. 7, 2015, 9 pgs.

Hyland, Gregory E.; Australian Examination Report for serial No. 2015202550, filed May 5, 2011, mailed Aug. 12, 2016, 4 pgs.

Hyland; U.S. Provisional Patent Application entitled: Infrastructure Monitoring Devices, Systems, and Methods, having U.S. Appl. No. 61/355,468, filed Jun. 16, 2010.

Ortiz, Jorge Isaac; U.S. Patent Application entitled: Nozzle Cap Multi-Band Antenna Assembly having U.S. Appl. No. 15/043,057, filed Feb. 12, 2016.

Hyland, Gregory E.; Non-Final Office Action for U.S. Appl. No. 14/557,754, filed Dec. 21, 2014, mailed Nov. 8, 2016, 48 pgs.

Hyland, Gregory E.; Notice of Decision from Post-Prosecution Pilot Program (P3) Conference for U.S. Appl. No. 14/557,754, filed Dec. 2, 2014, mailed Sep. 14, 2016, 4 pgs.

Dintakurti, Ganapathi Deva Varma; Final Office Action for U.S. Appl. No. 13/492,794, filed Jun. 8, 2012, mailed Nov. 8, 2016, 31 pgs.

Hyland, Gregory E.; Mexico Office Action for serial No. MX/a/2012/000347, filed May 5, 2011, mailed Aug. 31, 2016, 4 pgs.

Hyland, Gregory E.; Non-Final Office Action for U.S. Appl. No. 14/848,676, filed Sep. 9, 2015, mailed Dec. 13, 2016, 52 pgs.

Hyland, Gregory; Extended European Search Report for serial No. 11796120.1, filed May 5, 2011, mailed Nov. 4, 2016, 8 pgs.

* cited by examiner

ENCLOSURE FOR LEAK DETECTOR

CROSS-REFERENCE TO RELATED APPLICATIONS

This application claims the benefit of U.S. Provisional Application 61/523,274, filed on Aug. 12, 2011, which is hereby incorporated herein in its entirety by reference.

FIELD

This disclosure relates to pipeline leak detection, and more particularly relates to detecting leaks in water distribution systems.

BACKGROUND

Water utility companies provide water to customers through a network of water pipes. The size of pipes may vary depending on the volume of water that is designed to flow through a particular section of pipe. For example, large water mains may provide water distribution in areas close to the source of the water and the size of pipes may decrease as the distance from the source increases. One concern for water utility companies is the loss of water through leaks in the pipes. Not only do leaks waste clean potable water, but sometimes contaminants may be introduced into the water supply from outside the pipes.

Due to the rapidly escalating costs of potable water, the scarcity of fresh water supplies, and the increasing costs for water treatment and distribution, minimizing leaks in water distribution systems is a goal of both public and private water distribution utilities. If a leak is not particularly conspicuous, it may go undetected for months at a time without repair. It is therefore important to be able to detect leaks early. One technique for detecting leaks is to measure pressure. However, a leak in a piping system may not necessarily produce a head pressure that appears as a change from normal pressures. The presence of "silent leaks" (undetected leaks) diminishes the value of a system that detects leaks based on head pressure since reducing leaks is the reason water companies install the system in the first place. In addition to allowing leaks to go undetected, another issue with existing leak detection systems is the high rate of false alarms. A false alarm, for instance, may cause extraneous and costly maintenance activity or it may diminish the effectiveness of the detection system since operators may start to ignore leak warnings. There is therefore a need for a leak detection system that accurately detects leaks in a network of water pipes.

SUMMARY

The present disclosure describes systems, methods, and devices for detecting leaks in a pipe. According to an embodiment of the present disclosure, a leak detector is disclosed, wherein the leak detector comprises a sensor assembly that includes at least one sensor configured to sense acoustic signals. The leak detector also includes at least one printed circuit board coupled to the sensor assembly. The printed circuit board is configured to support a processing device, which includes at least a microcontroller unit and a digital signal processor. The microcontroller unit is configured to continually receive acoustic signals from the sensor assembly and the digital signal processor is configured to remain in a sleep mode except when the microcontroller unit wakes the digital signal processor from the sleep mode at predetermined times.

According to another embodiment of the present disclosure, a method is disclosed. The method includes the steps of placing a digital signal processor in a sleep mode, wherein the digital signal processor is incorporated in a leak detector. The method also includes determining whether a request is received from a host to awaken the digital signal processor and awakening the digital signal processor when the request is received. In addition, the method includes the step of determining whether an urgent event related to a leak in a water main has been detected by a microcontroller unit and awakening the digital signal processor when the urgent event is detected, and then enabling the digital signal processor to analyze acoustic signals when awakened.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
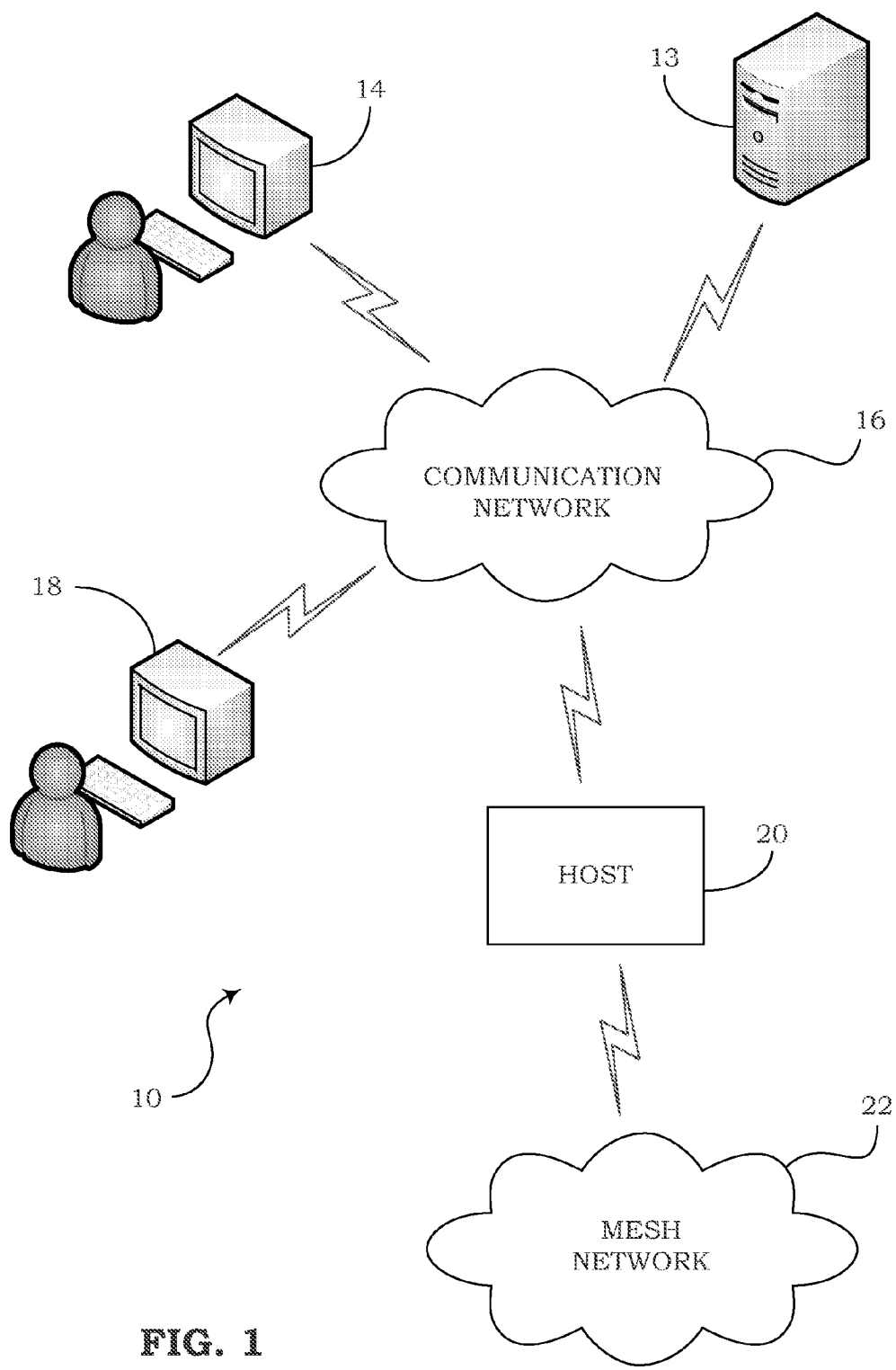
FIG. 1 is a block diagram illustrating a leak detection system according to various implementations of the present disclosure.

The present disclosure describes systems and methods for detecting leaks in a water distribution system. In the present disclosure, a distinction may be made between different sizes of water mains, for example, those having a larger diameter and those having a smaller diameter. Using acoustic data and pressure data that is sensed by various types of sensors in contact with the water pipes, leaks can be detected. The leak detection information can be communicated to the utility provider for further analysis. Depending on the type of leak, maintenance personnel may be deployed to repair or replace leaky pipes in the water distribution system.

Minimizing leaks in the water distribution system is recognized as a critical success factor for water distribution utilities, especially due to the scarcity of fresh water supplies, the cost of water treatment, and the costs for water distribution. The present disclosure provides an autonomous leak detection system that overcomes the limited effectiveness of existing leak detection systems with attendant high false alarm rates (dry hole) and undetected leaks. The water leak detection systems and methods disclosed herein provide continuous leak detection so that water utilities may be automatically alerted to pipe breaks in their system, allowing them to rapidly dispatch repair crews to minimize customer service disruption and simultaneously minimize sub-surface damage.

Many municipal piping systems hold pressures in excess of several hundred pounds per square inch (psi or $lb/in^2$). When a leak forms in a piping member, the leaking water produces vibrations as it passes from inside the piping member to outside. Under the pressure of the municipal piping system, vibrations in the piping member can be of frequencies in the audible range and be of detectable amplitude. Most vibrations range from 0 Hz to 3000 Hz.

The leak detection systems of the present disclosure are compatible with all distribution pipe types, including PVC pipes and PVC repair sleeves. The present systems have the ability to detect leaks as small as 1 gallon per minute and can localize a leak to within several meters. Also, the present systems have a high accuracy rate as measured by the percentage of leaks identified and a minimal percentage of false alarms. Another advantage of the present systems is the ability to provide continuous monitoring for burst pipes or large leaks, which may require immediate attention.

In some embodiments, the systems and methods of the present disclosure may provide surveillance of fire hydrants, which are attached to the water distribution system, to alert the utilities of hydrant damage (e.g., from a vehicle accident) and hydrant tampering (e.g., unauthorized water flow or water theft). The hydrant monitoring may also include determining if hydrant caps are stolen or if hydrants are opened to introduce foreign substances, sending immediate alerts when hydrants are opened, detecting the closing of hydrants, sending updated status alerts, providing a map of hydrant openings similar to OMS outages, etc.

Included below are embodiments of a device, a system, and a method for, among other functions, detecting leaks in pipelines. The system utilizes vibration sensors to detect leaks. In some embodiments, the vibration sensors may be placed inside a housing. In some embodiments, the housing may be a watertight housing. The system may be configured for use in both wet and dry barrel hydrants in various embodiments. In some embodiments, vibration sensors may be placed inside a nozzle cap of the fire hydrant. In various embodiments, vibration sensors may be placed inside a bonnet of the fire hydrant.

This disclosure describes various embodiments of a device, method, and system for detecting leaks in piping members by sensing the previously-described vibrations in piping systems. The present disclosure describes sensing such vibrations using vibration sensors disposed in a fire hydrant.

FIG. 1 is a block diagram illustrating an embodiment of a leak detection system 10. The leak detection system 10 comprises a server 13, an operator system 14, a communication network 16, a client system 18, a host 20, and a mesh network 22. The host 20 is configured to communicate with a plurality of "nodes" of the mesh network 22. The nodes may include leak detectors, and in some embodiments may also include customer meter devices, relay devices, system status detecting devices, and other communication devices. The nodes are configured for communicating leak detection information and/or utility information from the nodes or meter to the host 20.

According to various implementations of the present disclosure, the host 20 may be configured to receive information from leak detectors, which are connected within the mesh network, pertaining to the status of various water pipes in a water distribution system of a water utility company. The leak detectors may be configured to provide information related to various measurements, such as acoustic, pressure, or vibration measurements. This information may be stored by the host 20 for historic purposes for determining a baseline waveform indicative of a properly operating water distribution system. When later signals are received that indicate excessive acoustic or vibration activity, the host 20 may be configured to determine that a leak has been detected.

Also shown in FIG. 1 is a server 13 that may be configured to provide much of the leak detection analysis to assist the host 20. The server 13 may be part of the utility company (e.g., water utility company) and provide communication with other users via the communication network 16. In some embodiments, the server 13 may be part of a company responsible for managing the utility measurement data or for providing monitoring services for communicating issues (e.g., leaky pipes) in the utility infrastructure to the various utility companies. The communication network 16 in these embodiments may be a local area network (LAN), wide area network (WAN), such as the Internet, or any other suitable data communication networks. The communication network 16 may also include other types of networks, such as plain old telephone service (POTS), cellular systems, satellite systems, etc.

The operator system 14 shown in FIG. 1 may represent a computer system that is operated by personnel of a company managing the leak detection systems and utility measurement devices within the mesh network 22. In some respects, the operator system 14 may include an administrator for the leak detection system 10. In some circumstances, as described in more detail below, the user of the operator system 14 may be provided with information indicating that an event has occurred that requires immediate response. For example, if a large leak, or burst event, has occurred in one of the water mains, resulting in a large amount of water escaping from the mains, the user of the operator system 14 may need to deploy maintenance or repair personnel to resolve the burst issues. The server 13 and/or host 20 may detect extreme events, such as a burst in a pipe, and provide an alarm to the operator system 14. The alarm may be in the form of an automated e-mail, a pop-up window, an interrupt signal or indication on a computer of the operator system 14, or other suitable message signifying an urgent event.

The client system 18 may include a computer system used by the utility provider. In this respect, the client system 18 may be a client of the administration company that manages the utility measurement data and/or provides monitoring services regarding the status of the utility infrastructure. The client system 18, therefore, may be able to receive and to review status updates regarding the infrastructure. Alarms may be provided to the client system 18, which may then be acknowledged and confirmed. The client system 18 may also receive historic data and manage the customer's accounts and usage information. In some embodiments, information may be provided to the client system 18 in a read-only manner.

Figure 2:
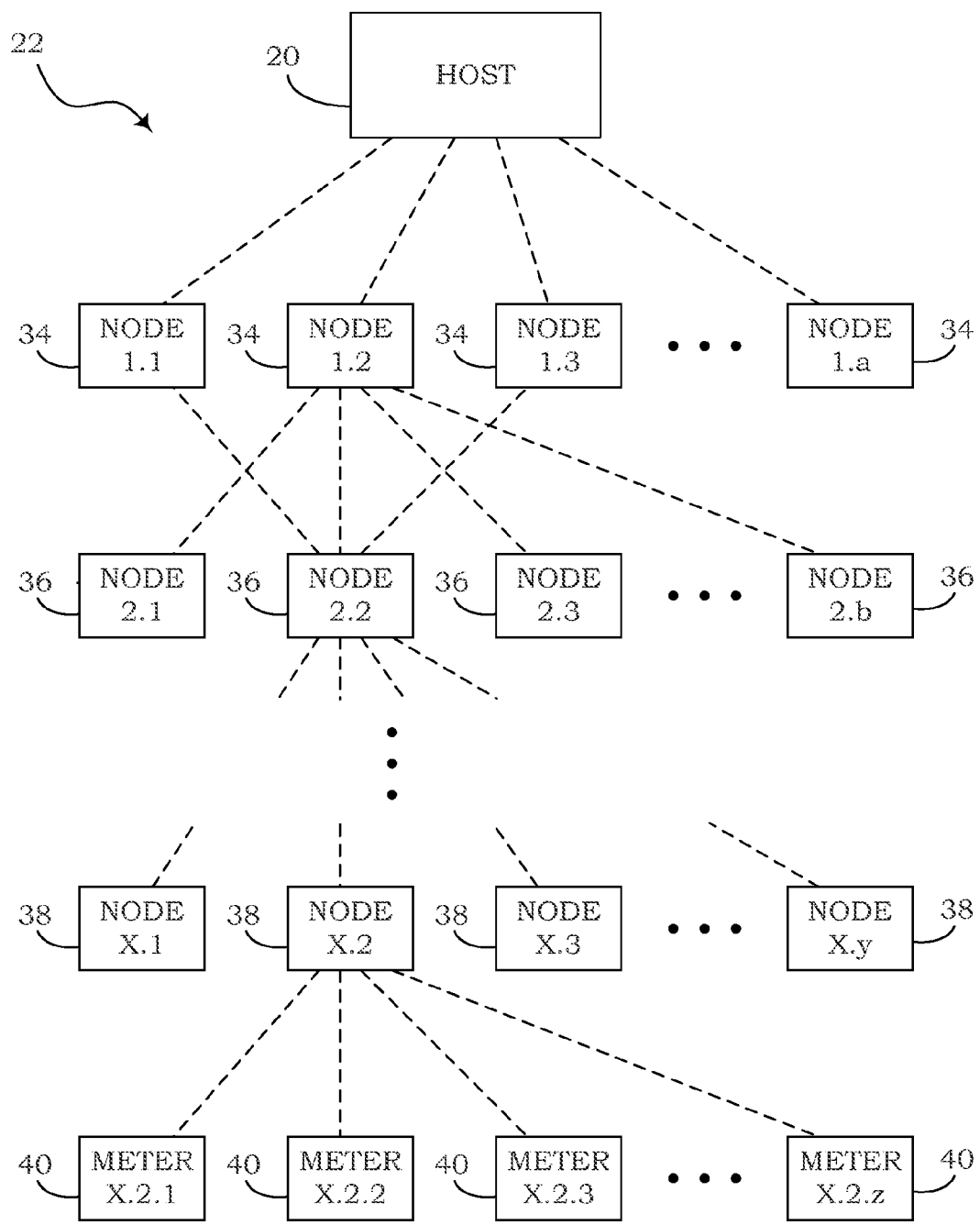
FIG. 2 is a block diagram illustrating a mesh network according to various implementations of the present disclosure.

FIG. 2 is a block diagram showing an embodiment of the mesh network 22 of FIG. 1, shown in a hierarchical configuration. Although the mesh network 22 may typically be distributed throughout a geographical region, the block diagram of FIG. 2 shows a hierarchy to emphasize the parent/child relationships among the various components. As illustrated, the mesh network 22 includes the host 20, a first level of intermediate nodes 34, a second level of intermediate nodes 36, a lowest level of intermediate nodes 38, and meters 40. In some embodiments, the intermediate nodes 34, 36, 38 may include leak detectors for detecting leaks, where communication with the host 20 may include forwarding information up the hierarchy via other intermediate nodes 34, 36, 38 which may be on the same level or a different level. The intermediate nodes 34, 36, 38 may be configured as stand-alone devices for assisting in the transfer of data between the host 20 and leak detectors (or meters 40). The intermediate nodes 34, 36, 38 may also include a combination of leak detectors and stand-alone devices. The mesh network 22 may include any number of levels X of intermediate nodes between the host 20 and the meters 40.

The host 20, intermediate nodes 34, 36, 38, and meters 40, according to various implementations, may comprise circuitry and functionality to enable radio frequency (RF) communication among the various components. The dashed lines shown in FIG. 2 may therefore represent RF communication channels between the different components. In other embodiments, the devices may communicate with the host 20 by a cellular service, via cellular towers and/or satellites. The wireless communication between the devices 20, 34, 36, 38, and 40 may be active during some periods of time (when two respective devices are linked) and may be inactive during other periods of time (when the devices are not linked and/or are in sleep mode). Alternatively, any of the nodes may be connected together through wired connections.

Figure 3:
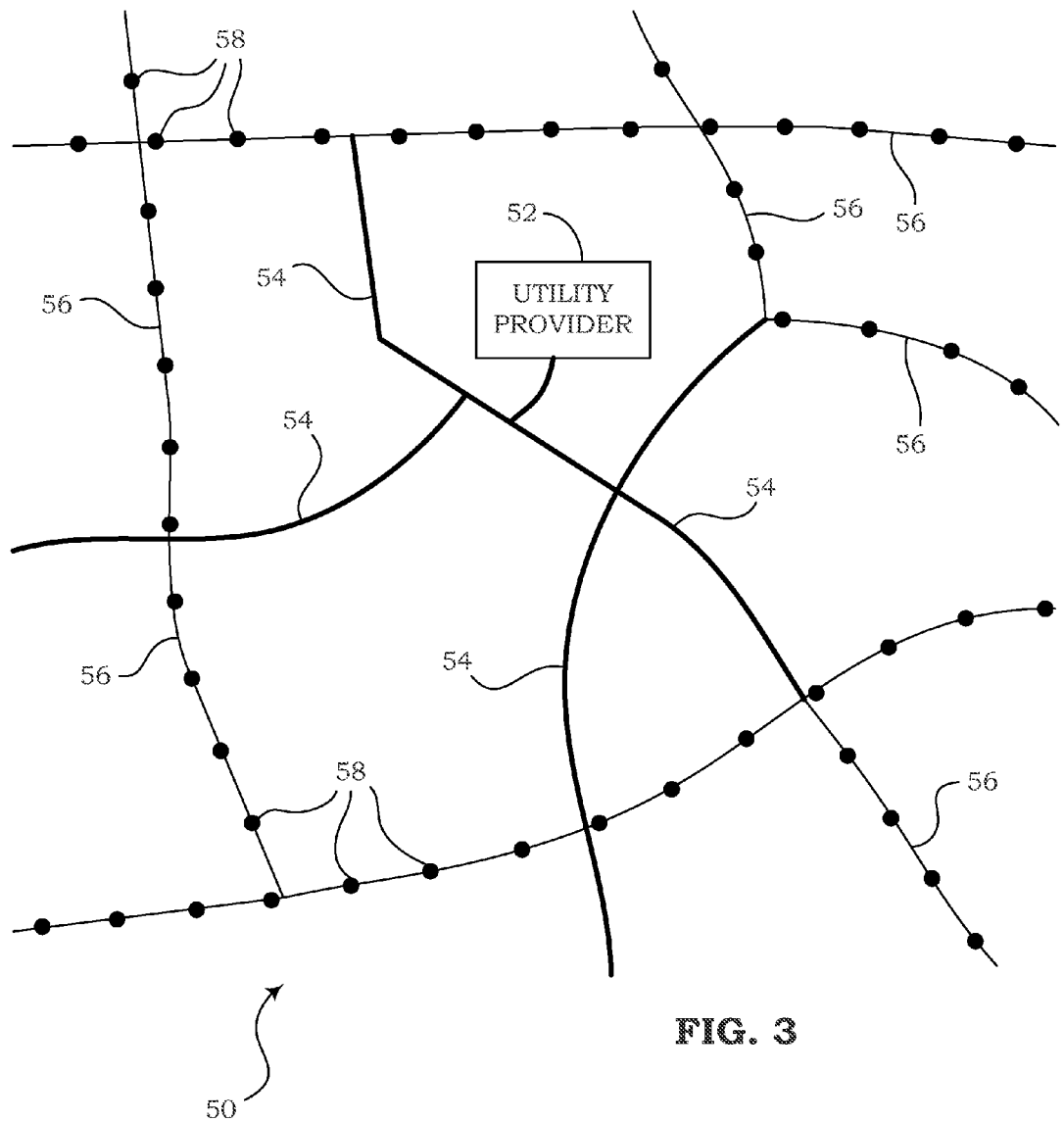
FIG. 3 is a diagram illustrating an example of a water distribution system.

FIG. 3 is a diagram illustrating an example of a portion of a water distribution system 50. It should be understood that the portion of the water distribution system 50 is shown merely as an example and does not necessarily depict a specific water utility. The water distribution system 50 in this example includes a utility provider 52, such as a water utility company, and various water mains. The water mains include transmission mains 54 (shown by thicker lines), which may include water pipes having an inside diameter of at least twelve inches. The water mains also include distribution mains 56, which may include smaller pipes having an inside diameter of less than twelve inches. The transmission mains 54, having a greater size, may be configured to allow a greater amount of water flow in comparison with the distribution mains 56. The transmission mains 54 may be located nearer to the utility source (e.g., utility provider 52) and the distribution mains 56 may be located farther from the utility provider 52. In some systems, distribution mains 56 may be located along secondary roads or residential roads. The water distribution system 50 also includes a number of fire hydrants 58 (shown as dots), which are spaced along the distribution mains 56. Although not shown, the fire hydrants 58 may also be tapped into the larger transmission mains 54. In some embodiments, the fire hydrants 58 may be spaced up to a distance of about 1,500 feet from each other.

Figure 4:
FIG. 4 is a diagram illustrating an example of leak in a main of a water distribution system.

According to various embodiments of the present disclosure, leak detection devices may be attached to the fire hydrants 58. In some embodiments, leak detection devices may be attached to each hydrant 58 while other embodiments may include attachment with about every other one of the hydrants 58. In FIG. 4, two adjacent fire hydrants 58 are shown, connected to the mains 54/56 for detecting a leak, such as leak 60. Because of the nature of a water leak, such as leak 60, acoustic signals or vibration signals can be detected on the components (e.g., mains 54 or 56, fire hydrants 58, etc.) of the water distribution system 50. Particularly, leak detectors may be mounted on the mains 54/56 themselves or may be mounted on the hydrants 58. When two adjacent leak detectors, such as sensors mounted on hydrants 58 nearest to the leak 60, are able to pick up acoustic signals with sufficient strength, the signals may be used to detect the presence of a leak.

Figure 5:
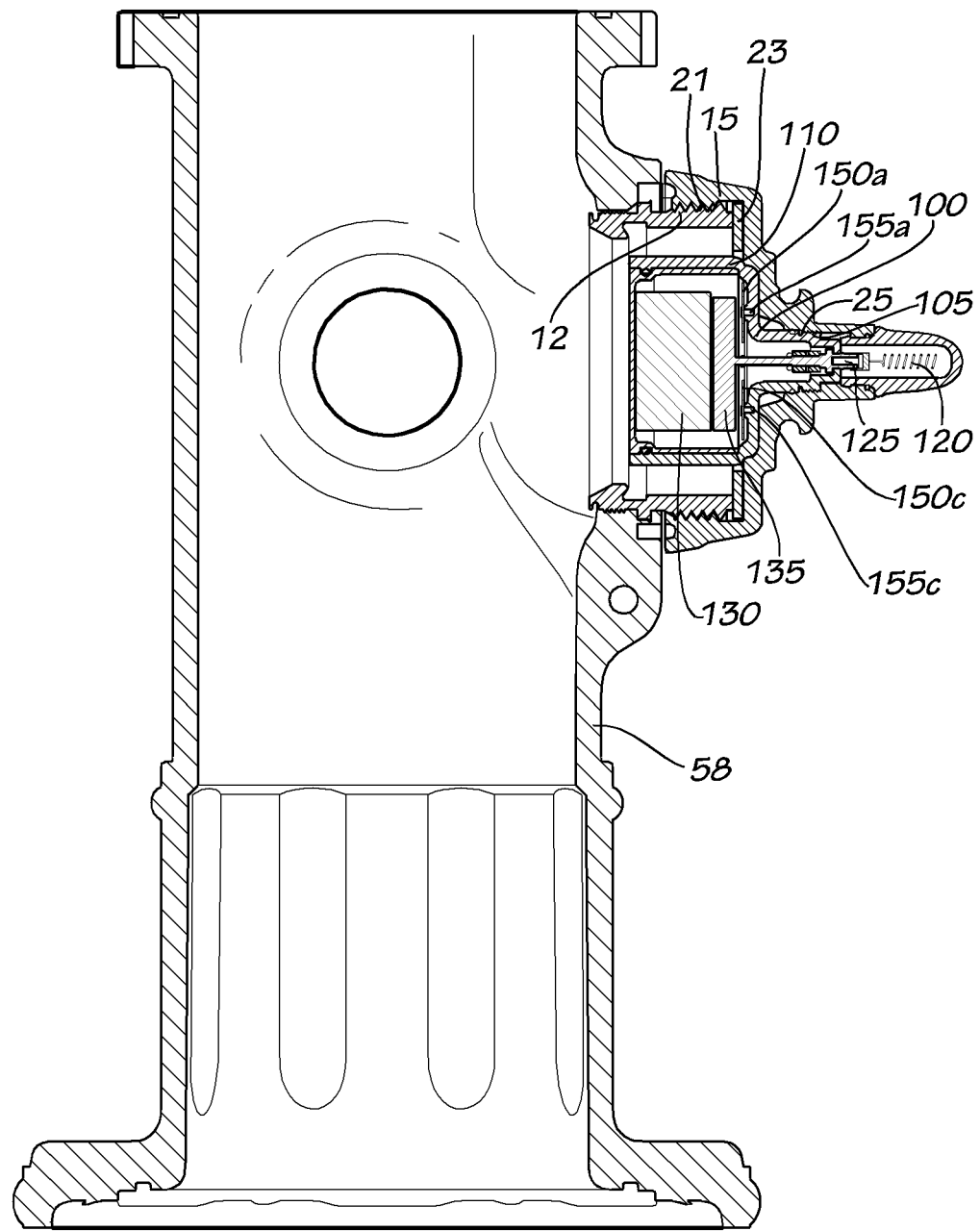
FIG. 5 is a cross-sectional view of a leak detector of the current disclosure disposed in a nozzle cap of a fire hydrant in accord with one embodiment of this disclosure.

FIG. 5 shows a fire hydrant 58 with one embodiment of a leak detector 100 of the current disclosure attached thereto. A nozzle cap 15 is shown attached by threading 21 to the hydrant threading 12 of the fire hydrant 58. A nozzle cap gasket 23 helps seal the connection between the nozzle cap 15 and the fire hydrant 58. In some embodiments, the leak detector 100 and the nozzle cap 15 will be included together as one system or may be integrally formed in some implementations. Enclosure threading 25 of the nozzle cap 15 allows connection of attachment threading 105 of the leak detector 100. The leak detector 100 includes an enclosure 110, an antenna 120, an antenna cable 125, a battery 130, a circuit board 135, and at least one vibration sensor 150a,c (150b shown in other figures., 150d referenced in other figures) attached to the enclosure by at least one bolt 155a,c (155b,d shown in other figures). In various embodiments, a washer (not shown) may be inserted between the bolt 155 and the vibration sensor 150. In some embodiments, the washer is made of nylon or other nonconductive material to avoid contact of a metal bolt 155 with electrical circuitry. In other embodiments, the bolt 155 may be made of nonconductive material. In various embodiments, a washer (not shown) may be placed between each vibration sensor 150 and the enclosure 110 to prevent contact with electrical circuitry.

The circuit board 135 includes preamplifiers for the vibration sensors 150, audio codec processing, signal processing, and memory (including RAM, ROM, programming memory, and storable media). Two circuit boards 135 may be used in some embodiments. In some embodiments, one circuit board 135 may be used for digital signal processing while another circuit board 135 may be used for radio frequency communications.

Any number of vibration sensors 150a,b,c,d may be used in the leak detector 100. Four vibration sensors 150a,b,c,d are present in the current embodiment. An eight vibration sensor 150 configuration has also been tested. Any number of bolts 155a,b,c,d may be used in various embodiments, although four bolts 155a,b,c,d—one per vibration sensor 150a,b,c,d—are present in the current embodiment. Also, other attachment mechanisms are considered included within this disclosure. In various embodiments, the vibration sensors 150 will be coated in damping material although such material is not required. Sensor damping material is chosen to dampen frequencies outside of a desired frequency range within which leak detection is expected.

Figure 31:
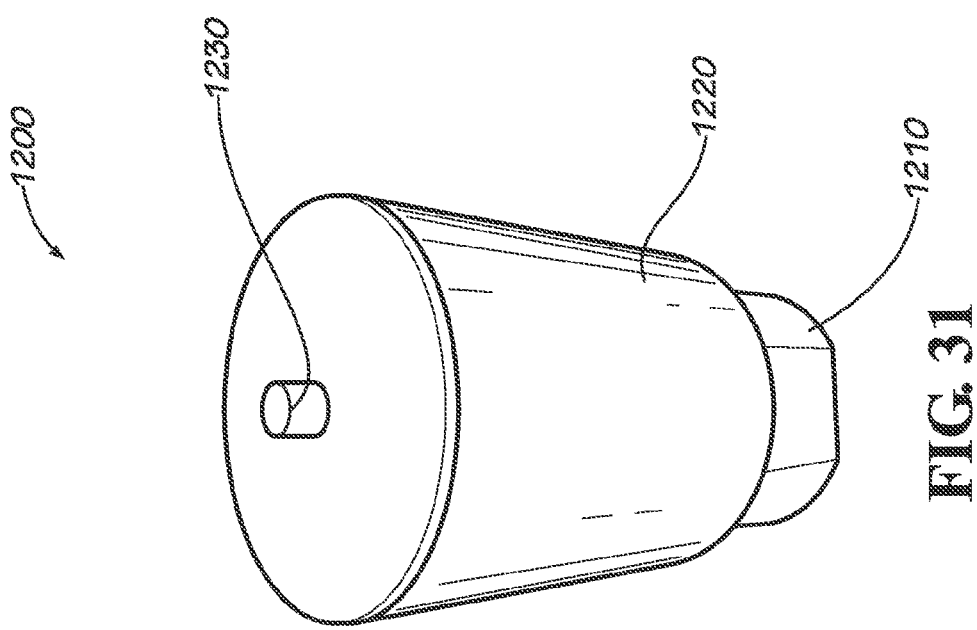
FIG. 31 is a perspective view of a jig for punching mounting holes in accord with one embodiment of the current disclosure.

In order to repurpose the sensors 150a,b,c,d, a predictable response must be generated. Piezoelectric material is highly responsive to alterations. As such, mounting holes 158 (shown in FIG. 7) in the sensors 150a,b,c,d are repeatably positioned precisely in the center of each sensor 150a,b,c,d. A jig 1200 (shown in FIG. 31) has been created to effect a repeatable mounting hole 158 by punching through the vibration sensor 150, as described elsewhere in this disclosure.

The enclosure 110 may be made of plastic, metal, or other generally rigid materials. Because the leak detector 100 of the current embodiment includes an antenna 120 and, thereby, is intended to transmit wireless signals, the enclosure 110 may be made of non-ferrous materials including brass, plastic, bronze, and aluminum, among others. However, the antenna 120 protrudes from the enclosure 110, and, as such, interference by the enclosure 110 may be minimal in some embodiments.

Figure 6:
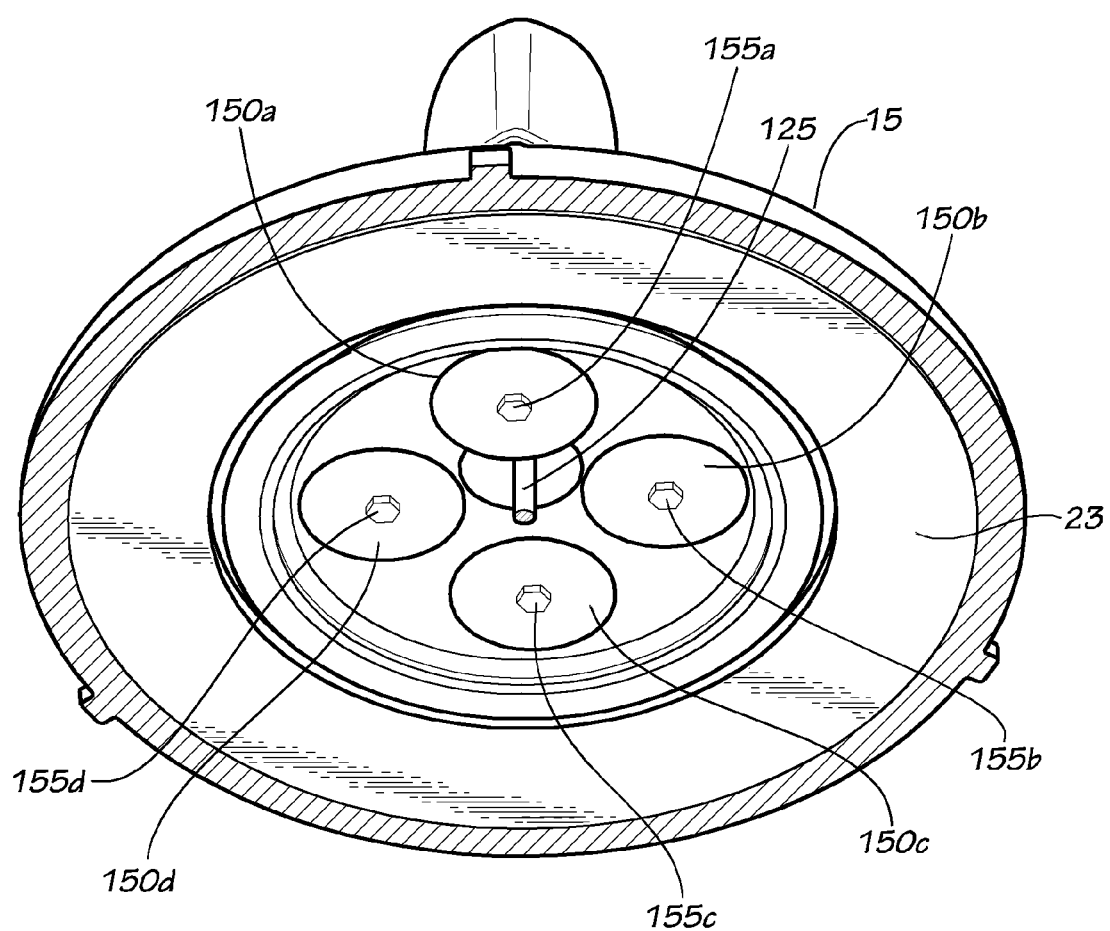
FIG. 6 is a cross-sectional perspective view of the leak detector of FIG. 5 in a nozzle cap, viewed from inside the hydrant.

As seen in FIG. 6, each vibration sensor 150a,b,c,d in the current embodiment is bolted onto the nozzle cap 15 using one bolt 155a,b,c,d, respectively. Each vibration sensor 150a,b,c,d includes piezoelectric material. Piezoelectric material generates an electric current in response to bending. With vibration, piezoelectric material generates a current in response to the vibration. In some embodiments, each vibration sensor 150a,b,c,d has a resonance frequency that is tuned to an anticipated frequency of vibrations generated by an anticipated leak in a piping member. The resonance frequency may be tuned in some embodiments and may not be tuned in others.

Figure 7:
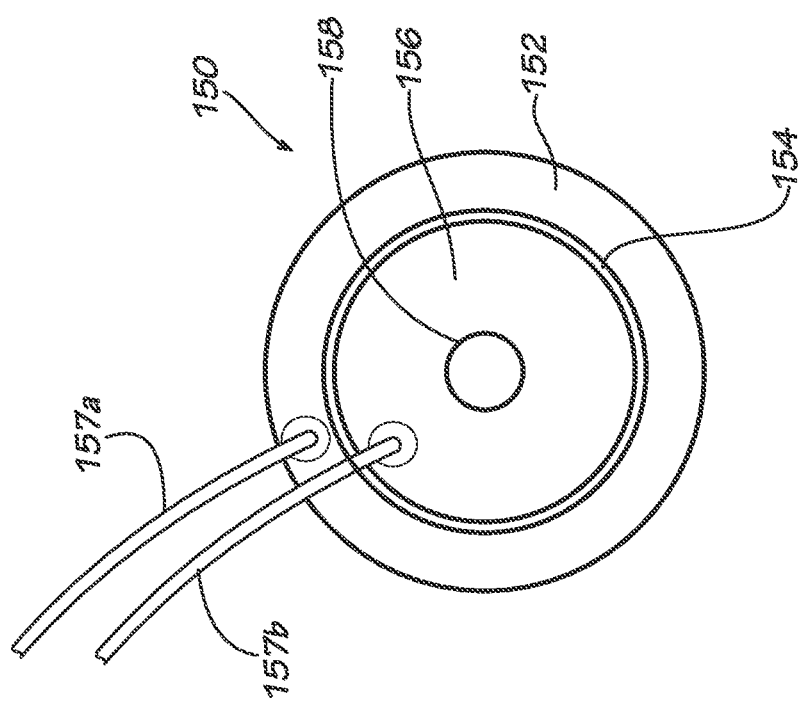
FIG. 7 is a top view of a vibration sensor of the leak detector of FIG. 5 in accord with one embodiment of the current disclosure.

As seen with reference to FIG. 7, one embodiment of the vibration sensor 150 of the current embodiment is shown. The vibration sensor 150 includes three components. A base 152 provides a substrate for deposition of other components of the vibration sensor 150. In the current embodiment, the base 152 is a disc and is made of brass; however, various materials and shapes may be used in various embodiments. Deposited onto the base 152 is a piezoelectric layer 154 that is composed of piezoelectric crystals. Deposited above the piezoelectric layer 154 is a conduction layer 156 that is made of a conductive material deposited on the surface of the piezoelectric layer 154. Although the piezoelectric layer 154 appears as a ring from the view of the current FIG. 7, the piezoelectric layer 154 extends fully below the conduction layer 156.

As stated elsewhere in this disclosure, the piezoelectric material produces electrical charge in response to bending, and a waveform of charge may be produced when the piezoelectric material is exposed to vibration. As such, a charge differential between the conduction layer 156 and the base 152 upon bending of the piezoelectric material may be used to sense the vibrations to which the piezoelectric layer 154 has been exposed. Therefore, leads 157a,b are soldered to the base 152 and the conduction layer 156, respectively. The leads 157a,b allow connection to a processing device or another electrical device so that the charge differential may be handled electronically, which may include recordation, amplification, summation, digital processing, and a number of other electrical features, described elsewhere in this disclosure. A mounting hole 158 is seen in the vibration sensor 150 and is produced as referenced elsewhere in this disclosure. In the current embodiment, the piezoelectric layer 154 and the conduction layer 156 are found on only one side of the base 152. However, other configurations may be seen in various embodiments.

Figure 8:
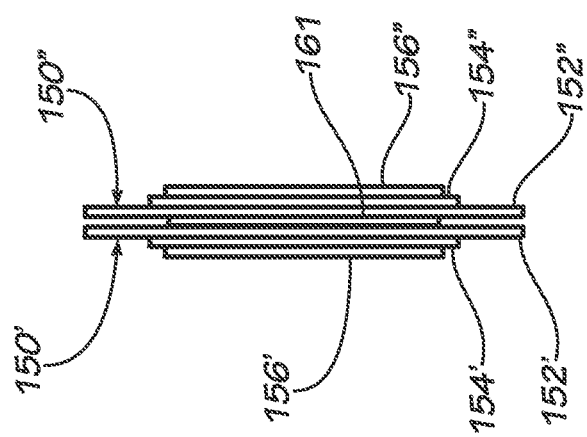
FIG. 8 is a side view of two vibration sensors, as disclosed and shown with reference to FIG. 7, connected together using adhesive, in accord with one embodiment of the current disclosure.

FIG. 8 shows a side view of two vibration sensors 150' and 150" connected together in back-to-back arrangement in accord with one embodiment of the current disclosure. The profile of each vibration sensor 150',150" can be seen. Each vibration sensor 150',150" includes the base 152',152", the piezoelectric layer 154',154", and the conduction layer 156', 156". The thickness of any layer as shown in the current embodiment is for exemplary purposes only and should not be considered to scale or in any way limit the scope of this disclosure. In the current embodiment, a strip of adhesive 161 is seen between the two vibration sensors 150',150". In various embodiments, the adhesive 161 may be double-sided tape, various glues, various coatings including elastomeric and silicon coatings among others, and pure adhesives. In some embodiments, an adhesive layer may not be included. In such embodiments, a non-conducting spacer may be used, such as a nylon or rubber spacer.

Figure 9:
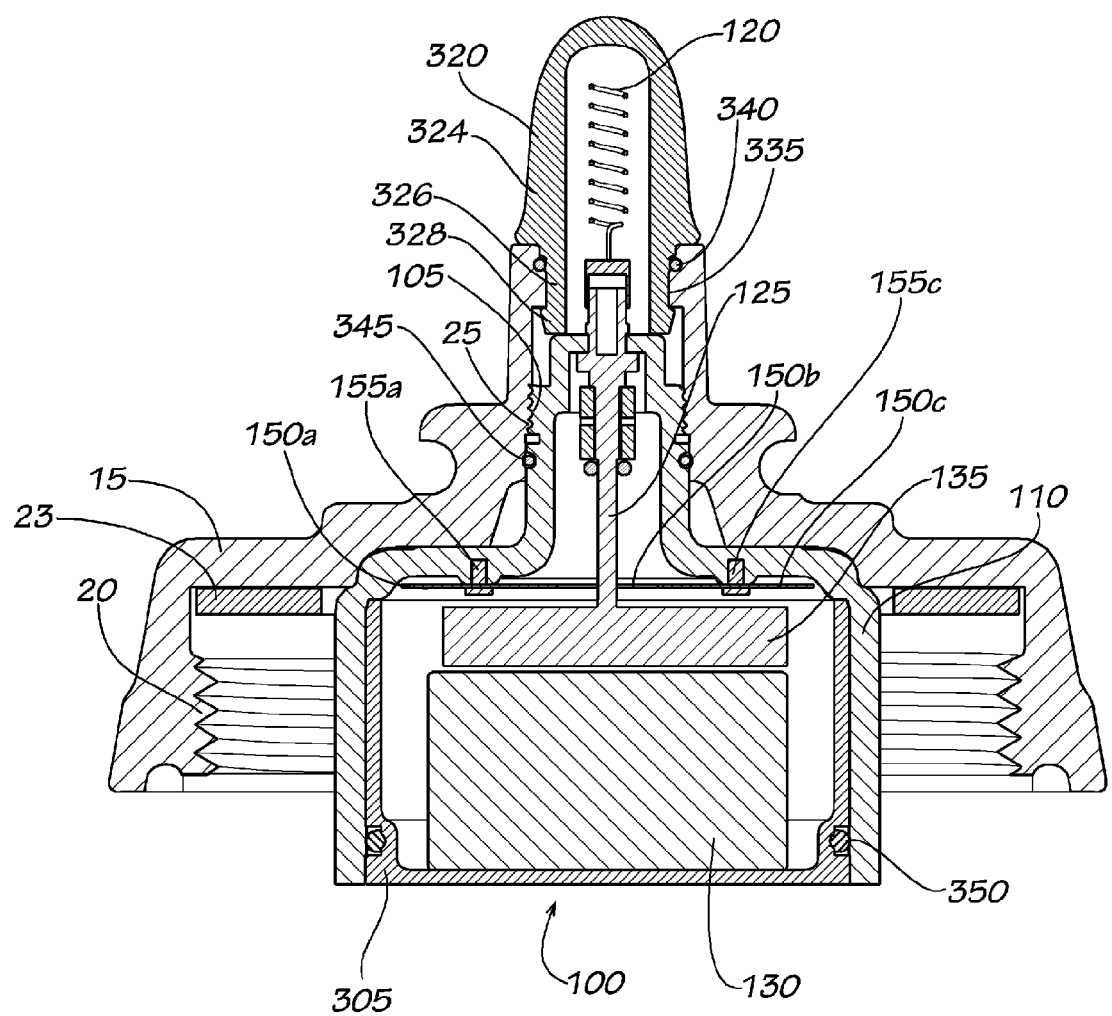
FIG. 9 is a cross-sectional view of a nozzle cap including the leak detector of FIG. 5.

Turning to FIG. 9, electrical connections (such as leads 157a,b in FIG. 7) connect each vibration sensor 150a,b,c,d with the circuit board 135. Wires form the electrical connections in the current embodiment. A partition 410 (not shown) may be included within the enclosure 110 to separate the vibration sensors 150a,b,c,d from the battery 130 and the circuit board 135. A mating enclosure 305 is included to house the battery 130 and the circuit board 135. The mating enclosure 305 may be connected to the enclosure 110 in several ways, including an integrated construction, plastic welding, threading, snap-fit, and key/fit arrangements, among others. A mating gasket 350 helps seal the connection of the enclosure 110 and the mating enclosure 305.

The battery 130 and the circuit board 135 may be encased in waterproof or water-resistant material—also known as "potting"—such as epoxy, resin, sealant, or RTV, among others. This potting provides several advantages, among them providing a water barrier and providing structural integrity in what may be an extremely high pressure environment—as previously noted, more than several hundred psi. The battery 130 and circuit board 135 may be encased individually in some embodiments. In other embodiments, the mating enclosure 305 will include a pot of waterproof or water-resistant material put inside the mating enclosure 305 after the battery 130 and the circuit board 135 are placed inside. However, the vibration sensors 150a,b,c,d are not restrained from vibration and are not encased within such material, as such material may provide unwanted dampening of vibrations. As such, the partition 410 (not shown) serves to separate the items to be encased in waterproof or water-resistant material from the vibration sensors 150a,b,c,d. If the partition 410 is included, it will include at least one hole (not shown) to allow wires to form the electrical connections. The antenna cable 125 also connects to the circuit board 135. In some embodiments, the battery 130 and circuit board 135 are encased in waterproof material before the mating enclosure 305 is connected to the enclosure 110.

As can be seen in FIG. 9, in the current embodiment, the enclosure 110 does not enclose all of the features of the leak detector 100. An antenna enclosure 320 is placed over the antenna 120 in the current embodiment. The antenna enclosure 320 is separate from the enclosure 110 in the current embodiment. The antenna 120 protrudes out of the nozzle cap 15. This protrusion aides in allowing the antenna 120 to communicate wireless signals without interference from the nozzle cap 15, the enclosure 110, or other features of the fire hydrant 58 while still protecting the antenna 120 from tampering or from environmental factors. Typically the nozzle cap 15 is made of cast iron, which may interfere with wireless signal transmission. The antenna enclosure 320 is made of a material that does not interfere with wireless signals, including non-ferrous materials such as brass, bronze, or plastic, among others. In the current embodiment, the antenna enclosure 320 is made of plastic. The antenna enclosure 320 includes a bell portion 324, a shaft portion 326, and a retention ring 328. To place the antenna enclosure 320 into the assembly of the leak detector 100 and nozzle cap 15, the antenna enclosure 320 is press-fit into the nozzle cap 15. The nozzle cap 15 includes a joining portion 335. The joining portion 335 in the current embodiment is a shelf inset to the inside of the nozzle cap 15. When the antenna enclosure 320 is pressed into the nozzle cap 15, resilience of the plastic allows the shaft portion 326 and retention ring 328 to bend inwardly with respect to the bell 324. Once the retention ring 328 passes the joining portion 335, the resilience of the plastic allows the antenna enclosure 320 to snap back to its original shape, thereby allowing the retention ring 328 to prevent the antenna enclosure 320 from being pulled out. An antenna enclosure gasket 340 seals the connection between the antenna enclosure 320 and the nozzle cap 15. Other connection interfaces are included in this disclosure, including threading, welding, and sealing with plastic cement, RTV, or similar materials, among others.

Enclosure threading 25 of the nozzle cap 15 interacts with attachment threading 105 to secure the enclosure 110 to the nozzle cap 15. An enclosure gasket 345 helps seal the connection between the enclosure 110 and the nozzle cap 15.

The leak detector 100 operates by sensing vibration in the piping system. The piping system translates vibrations produced by leaks throughout piping members in the system. Moreover, the ground may conduct some vibrations as well. The vibrations are translated through the piping system, particularly through the rigid materials making up the system, including cast iron piping. This translated vibration travels through the piping system to the fire hydrant 58, into the nozzle cap 15 through its connection with the fire hydrant 58, into the enclosure 110 through its connection with the nozzle cap 15, into the bolts 155a,b,c,d through their connections with the enclosure 110, and into the vibration sensors 150a,b,c,d through their connections to the bolts 155a,b,c,d. Although the mechanical translation of vibrations described above provides sufficient vibration for detection of leaks, the piping system may also translate acoustic vibration which may be sufficient of itself to allow detection by the vibration sensors 150 as well.

When vibration is translated into the vibration sensors 150a,b,c,d, the piezoelectric material generates an electronic current. The current is transmitted to the circuit board 135 where it is processed as the detection of a leak. The detection of a leak can then be communicated to a remotely located communicator or host by the system. In various embodiments, sensors 150a,b,c,d may be all aligned in a stacked arrangement on one bolt 155' (not shown) and mounted to one point on enclosure 110. This stacked arrangement may have a different response from other orientations. Various other orientations may be used as well.

In operation, the leak detector 100 may be configured to operate and to detect leaks at all times. However, to preserve battery life, the leak detector 100 may also be configured to awaken on timed intervals to monitor whether vibrations are present in the system. For example, the leak detector 100 may awaken on 5-minute intervals in some embodiments or on 10-minute intervals in other embodiments. In some embodiments, the leak detector 100 will be configured to awaken only at night, or only when background noises are at a minimum. The leak detector 100 may then return to sleep state, which may include all or a portion of the circuitry to be completely or partially unpowered or in a low power state. The timing of the interval may be determined by programming. If the leak detector 100 determines that a leak is present in the system, the leak detector 100 may be configured to send a distress signal to a remotely located communicator or host and/or to store such leak detection data for later transmission.

Elimination of noise is effected by amplification of sensor data because noise is random and not cumulative, whereas harmonic oscillation is cumulative and additive. Thus, when sensor output is added together for the four-sensor arrangement, noise does not amplify but harmonic oscillation does. The result is that the multiple-sensor arrangement effectively cancels noise from the amplification or renders the amplitude of noise so small as compared to harmonic oscillation in the system that such noise is negligible.

The leak detector 100 has a relatively high signal-to-noise ratio. The high value of signal-to-noise ratio comes from two sources. First, noise is random and does not add, as described above. Second, because the leak detector 100 includes amplification, it is capable of detecting a lower threshold because a higher amplitude requires less amplification for a quality signal. As such, noise is not amplified because higher amplitude vibrations are detected more easily.

With piezoelectric transducers, output generated by the piezoelectric material is relative to the "quality" of the piezoelectric material, which is affected by the size of the crystal making up the material. Large responses are typically seen from higher quality transducers. Although the leak detector 100 can function with high-quality piezoelectrics, vibration sensors 150a,b,c,d in the current embodiment are relatively low-cost piezoelectric transducers. In the current embodiment, vibration sensors 150a,b,c,d are repurposed output transducers, not input transducers. The vibration sensors 150a,b,c,d and array are chosen to provide a low-cost alternative to sensors that may require higher-quality, more expensive transducers. The vibration sensors 150a,b,c,d of the current embodiment can be mass-produced at a lower cost leading to a lower cost end product. Although piezoelectric transducers are used in the current embodiment, other types of transducers may be used in various embodiments to convert mechanical vibration into electrical signals, including electromagnetic transducers (such as solenoids and speaker technology), laser measurement of vibration of a surface, microelectromechanical systems (MEMS), and others.

The leak detector 100 may be in communication with a mesh network or other communications network to send and to receive wireless communication of data. Such systems are described in more detail elsewhere in this disclosure. The leak detector 100 may also have the capability to store or to log leak detection data until the leak detector 100 is able to be checked, either manually or electronically. In one embodiment, the leak detector 100 may log over one month's worth of leak detection data which may then be downloaded and analyzed manually or via a wireless communication device by a person responsible for inspecting pipelines. To store the leak detection data, in various embodiments the leak detector 100 may include internal memory configured to store the leak detection data for download at a later time. Internal memory may include a hard drive, flash memory, or other various data storage devices or systems.

As previously disclosed, an array of leak detectors 100 may be used throughout a piping system. For example, a leak detector 100 may be used on each fire hydrant 58 in the piping system (as, for example, in FIGS. 3 and 4). Such a configuration may address leaks on piping members that are geographically remote to a particular vibration sensor 150. Also, such a configuration would allow maintenance workers to isolate a region of piping in which a leak is most likely present by determining which leak detectors 100 in the network have the largest amplitude of vibrations.

Testing was performed comparing the response of plastic and metal enclosures 110. Acetyl plastic was used for testing. The response of the vibration sensors 150 was relatively similar for both metal and plastic enclosures 110. In some cases the low frequency response (below 10 Hz) of the vibration sensors 150 in the plastic case was lower in magnitude or amplitude than that of the metal case, but this response is not consistent.

Figure 10:
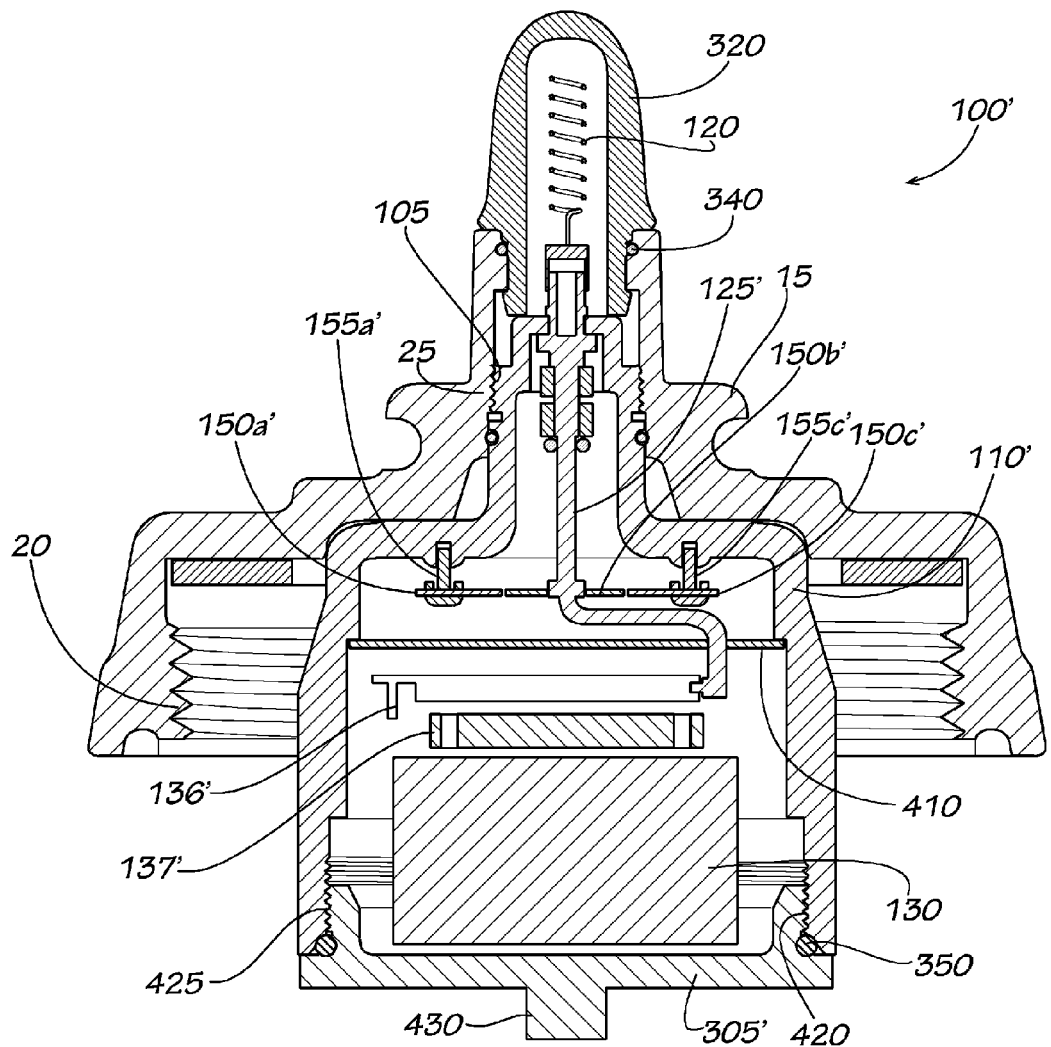
FIG. 10 is a cross-sectional view of a leak detector of the current disclosure disposed in a nozzle cap in accord with one embodiment of this disclosure.

FIG. 10 shows another embodiment of a leak detector 100'. The current embodiment includes vibration sensors 150a',b',c',d' (150d' not shown) disposed on bolts 155a',b',c',d' (155b',d' not shown) which are screwed into an enclosure 110'. In the current embodiment, the bolts 155a',b',c',d' allow the vibration sensors 150a',b',c',d' to float in space as opposed to bolting down. A mating enclosure 305' includes threading 420 which allows a connection with threading 425 on the enclosure 110'. The connection is sealed by the mating gasket 350. The mating enclosure 305' includes a connection nut 430 that allows tightening of the mating enclosure 305' into the enclosure 110' using a wrench or other tool.

The leak detector 100' includes two circuit boards: a radio frequency (RF) board 136' and a digital signal processing (DSP) board 137'. Electronics on the RF board 136' and the DSP board 137' will be similar to the electronics contained on circuit board 135 in the leak detector 100. The partition 410 can be seen in the view of the current embodiment. An antenna cable 125' connects the antenna 120 to the RF board 136'. Although not shown, the battery 130 is connected to both the RF board 136' and the DSP board 137'. In some embodiments, the battery 130 may be connected to one of the RF board 136' and the DSP board 137' which then connects the power from the battery 130 in series to the other board.

Figure 11:
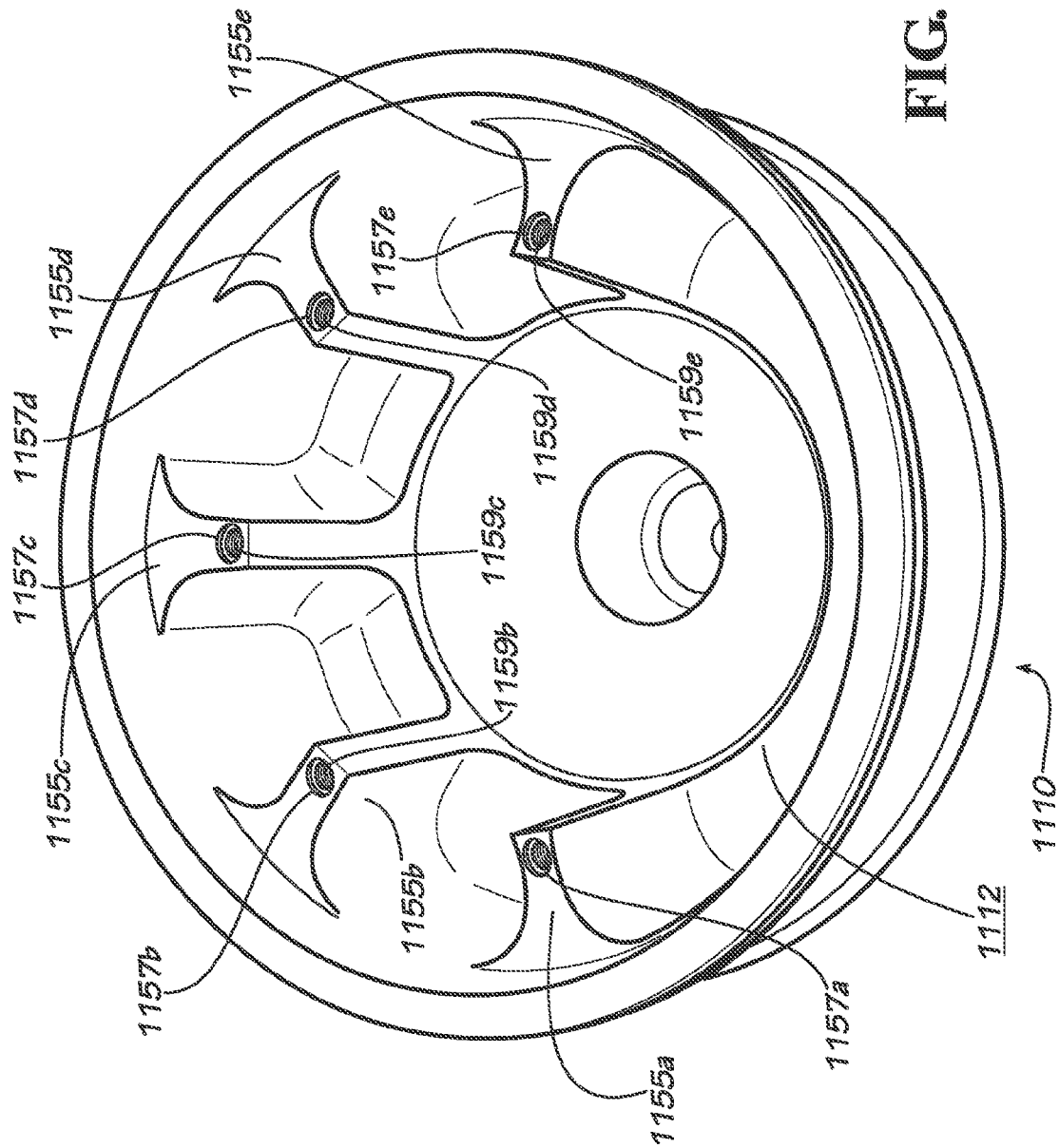
FIG. 11 is a perspective view of the inside of an enclosure in accord with one embodiment of the current disclosure.

Another embodiment of an enclosure 1110 is seen in FIG. 11. The enclosure 1110 includes five posts 1155a,b,c,d,e protruding from an inner surface 1112 of the enclosure 1110. The posts 1155a,b,c,d,e of the current embodiment are spaced a consistent distance apart but are not equally distributed about a circumference of the inner surface 1112. Instead, the posts 1155a,b,c,d,e of the current embodiment are spaced so that more posts 1155a,b,c,d,e are on one half of the enclosure 1110 than on the other. In other embodiments, equidistant spacing may be used. In various embodiments, more or fewer posts 1155 may be used.

The posts 1155 provide some rigidity to the enclosure 1110 that aids in several ways. Among other benefits, the posts 1155 provide added strength to the enclosure 1110 in what may be an ultra-high pressure environment (exceeding several hundred psi, as previously noted). Additionally, the posts 1155 provide a structural restraint against resonance of the enclosure 1110 so that resonance frequencies seen in the enclosure 1110 do not distort leak data observed by vibration sensors 150.

The posts 1155 also serve as mounting locations for the vibration sensors 150. In the current embodiment, each post 1155a,b,c,d,e includes a retaining ring 1157a,b,c,d,e and mounting bore 1159a,b,c,d,e that is threaded. The retaining ring 1157a,b,c,d,e is a countersink channel into which a nylon washer (not shown) can be placed. The nylon washer allows the vibration sensors 150 to be mounted without allowing electrical conductivity between the enclosure 1110 and each vibration sensor 150. Although the current embodiment displays a retaining ring 1157a,b,c,d,e on each post 1155a,b,c,d,e, various embodiments include various configurations and may omit the retaining ring 1157a,b,c,d,e from some or all of the posts 1155a,b,c,d,e. Additionally, although five posts 1155a,b,c,d,e are shown in the current embodiment onto which a vibration sensor 150 may be mounted, various configurations may be made for mounting vibration sensors 150. For example, in some embodiments, more than one vibration sensor 150 may be mounted on one post 1155 while another post 1155 may include no vibration sensor 150 mounted.

Figure 12:
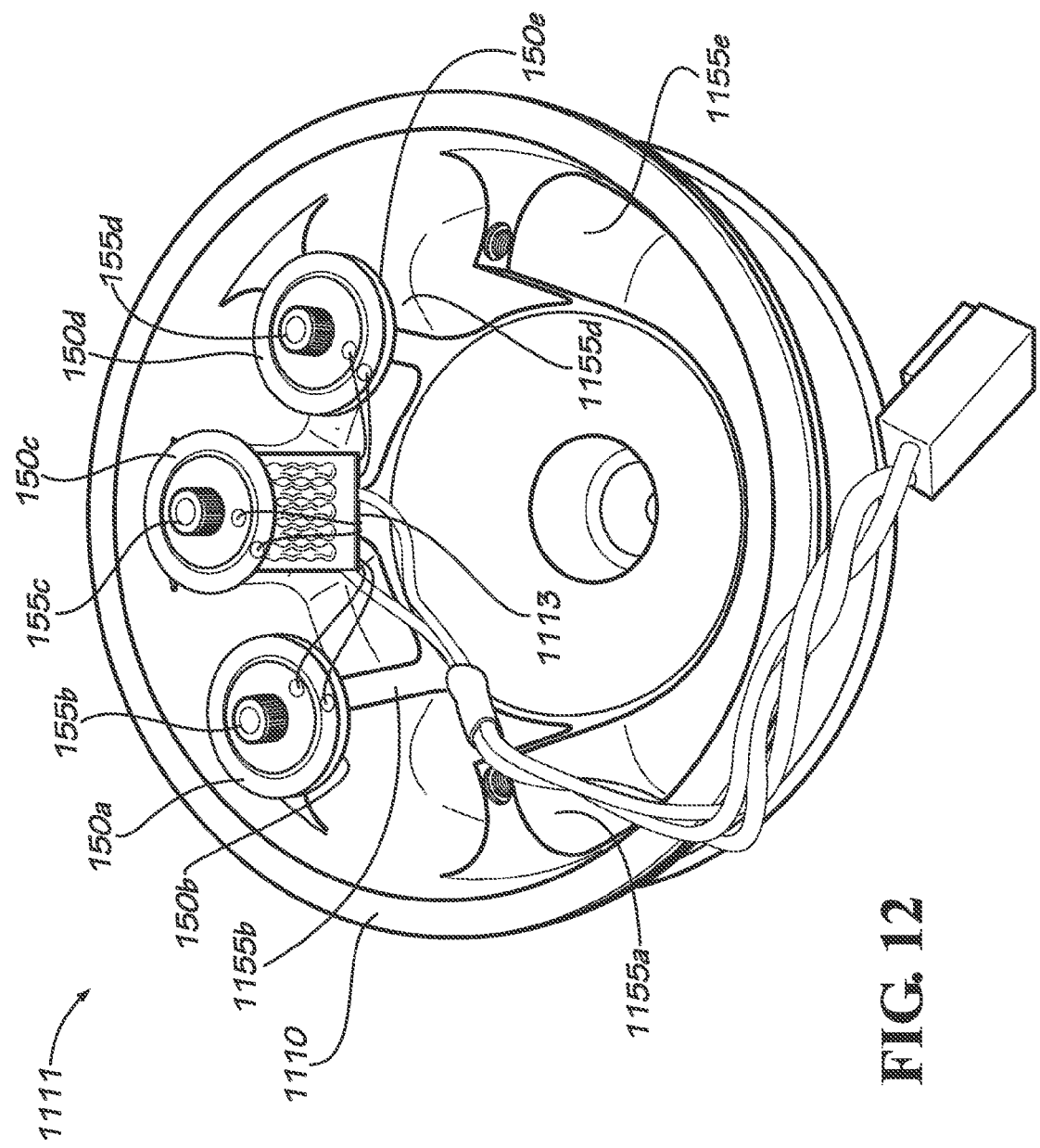
FIG. 12 is a perspective view of the inside of a leak detection subassembly in accord with one embodiment of the current disclosure.

A leak detection subassembly 1111 is shown in FIG. 12. The configuration shown represents only one embodiment of the current disclosure among many. The leak detection subassembly 1111 shows the interrelationship of several parts in one embodiment of the disclosure. The leak detection subassembly 1111 of the current embodiment includes five vibration sensors 150a,b,c,d,e. As can be seen, vibration sensors 150a and 150b are connected by bolt 155b of the current embodiment. In the current embodiment, the bolt 155b is made of nylon. Both vibration sensors 150a,b are connected along one post 1155b. Vibration sensors 150a,b are connected together using adhesive 161 (seen in FIG. 8) between them, as previously described with reference to FIG. 8, although the vibration sensors 150a,b, of the current embodiment may be arranged back-to-back (as seen in FIG. 8) or face-to-back. In various embodiments, the adhesive 161 may be double-sided tape, various glues, various coatings including elastomeric and silicon coatings among others, and pure adhesives. In some embodiments, an adhesive 161 may not be included. In such embodiments, a non-conducting spacer may be used, such as a nylon or rubber spacer. In other embodiments, conduction may not be a concern if the base 152a,b of each vibration sensor 150a,b were connected to the same ground. However, the use of an adhesive 161 may provide damping of the vibration sensors 150 to prevent resonance along the natural frequency of each base 152 or, if different, of each vibration sensor 150. As such, the configuration of the currently described embodiment allows some damping of resonance between the vibration sensors 150a,b because they are mechanically restrained by the adhesive 161. In some embodiment, individual vibration sensors 150 may be coated with a vibration damping layer that may be composed of various substances, including silicone, elastomer, various polymers, various resins, various rubbers and synthetic rubbers, various vapor depositions, and various coatings. In one embodiment, Loctite RTV 5140 has been used as a coating with success. Loctite 5150 adhesive sealant has also been used with success.

The leak detection subassembly 1111 displays but one possible embodiment through which the vibration sensors 150 may be arranged in the enclosure 1110. In various embodiments, the arrangement of the various components may change as may be included elsewhere in this disclosure. Moreover, the leak detection subassembly 1111 does not include other parts of various leak detectors (i.e., 100,100', 3100). However, the leak detection subassembly 1111 may be included in various forms within the various embodiments as disclosed herein.

Vibration sensors 150d,e are connected together along post 1155d using bolt 155d with the same or a similar configuration to vibration sensors 150a,b. However, vibration sensor 150c is connected alone to post 1155c (not seen in FIG. 12, but seen with respect to FIG. 11) using bolt 155c. Vibration sensor 150c in some embodiments is a burst or tamper sensor. As described elsewhere in this disclosure, leak detectors of the current disclosure may be configured to monitor for leak detection continuously, may be configured to monitor on a wake/sleep basis, or may be configured to do both. When vibration sensor 150c is used as a burst or tamper sensor, it is continuously monitored to detect a pipe burst or a tamper event even if other vibration sensors 150a,b,d,e are monitored on a sleep/wake schedule. The vibration sensor 150c, as a continuously-monitoring sensor, is capable of detecting a pipe burst or tamper event, thereby causing other sensors 150a,b,d,e to wake up (if necessary) and allowing communicating of the pipe burst or tamper event to a remote host.

In the current embodiment, a summation board 1113 is seen mounted under the vibration sensor 150c. The summation board 1113 allows manual summation of the piezoelectric current generated from the vibration sensors 150a,b,c,d,e or, in another embodiment, of vibration sensors 150a,b,d,e. Each vibration sensor 150a,b,c,d,e is connected to the summation board 1113 which provides a passive, manual summation of the vibration sensors 150a,b,c,d,e. In various embodiments, the signals of each vibration sensor 150a,b,c,d,e may be individually communicated to a remote host that performs the summation function.

Summation of vibration sensors 150a,b,c,d,e may include an electronic amplifier in some embodiments. However, in some embodiments, electronic amplification may not be necessary. Since piezoelectric material may provide a positive current when deflected in one direction and a negative current when deflected in the opposite direction, it becomes important to know which deflection causes positive charge and which deflection causes negative charge. When two sets of piezoelectric material produce the same charge (either positive or negative, but not necessarily the same amplitude) with the same deflection, they are said be "in-phase." When two sets of piezoelectric material produce opposite charges with the same deflection, they are said to be "out of phase." The manual summation referenced above is achieved by connecting the vibration sensors 150a,b,c,d,e in such a way that the output waveforms created by the piezoelectric material are in phase and positive charge is added to positive charge while negative charge is added to negative charge. Thus, it becomes important to know whether the vibration sensors 150a,b,c,d,e are in-phase or out of phase with each other. If the vibration sensors 150a,b,c,d,e are connected as in-phase but are out of phase, vibration sensors 150a,b,c,d,e will cause a cancellation of at least some of the charge generated by other vibration sensors 150a,b,c,d,e with which they are out of phase. As such, for manual summation, the vibration sensors 150a,b,c,d,e must be connected so that positive charge is amplified by the addition of other vibration sensors 150a,b,c,d,e in the circuit rather than being cancelled.

Figure 13:
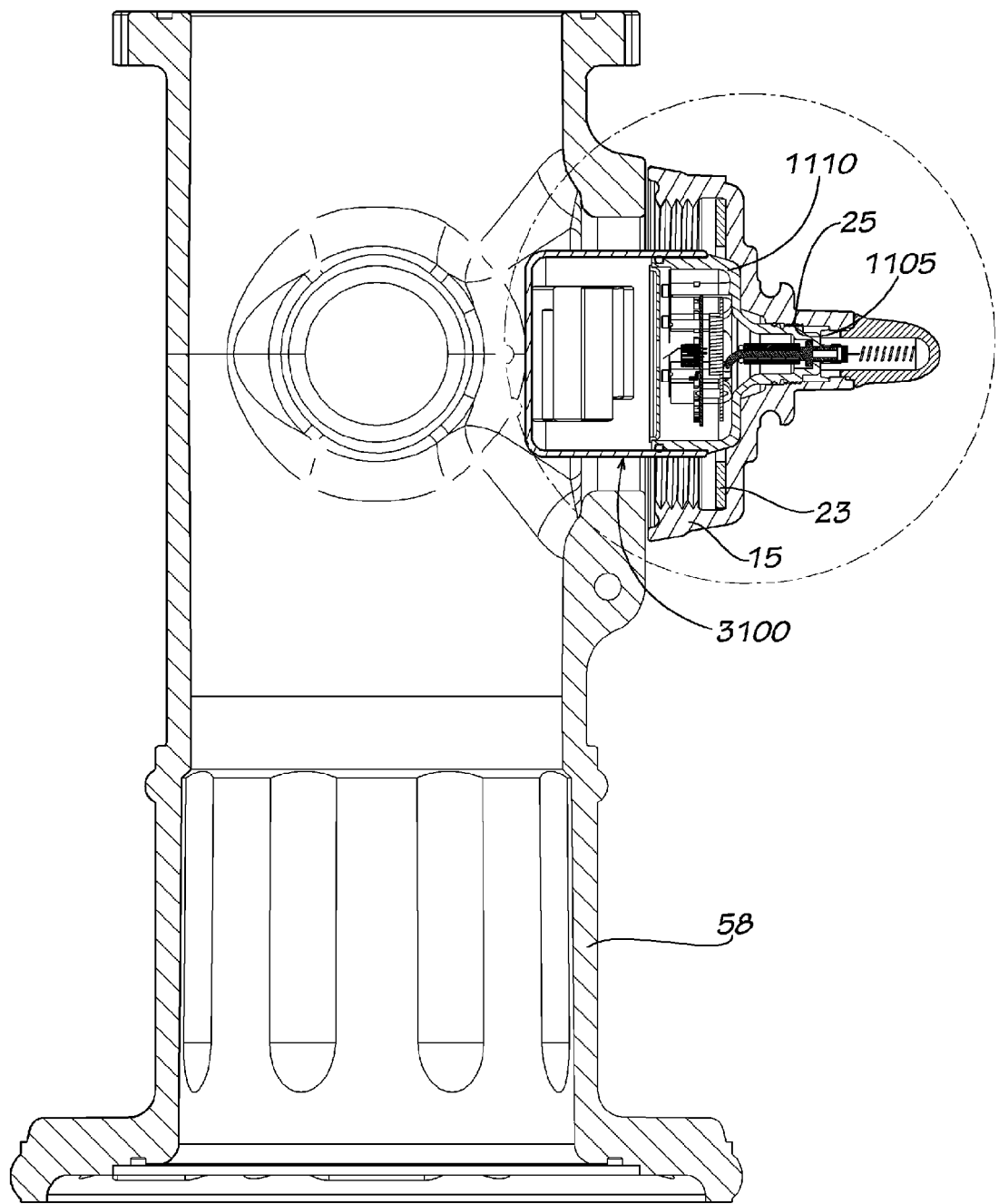
FIG. 13 is a cross-sectional view of a leak detector in accord with one embodiment of the current disclosure connected to a fire hydrant.

One embodiment of a leak detector 3100 is shown in FIG. 13 connected to the nozzle cap 15, which is then connected to the fire hydrant 58. The enclosure 1110 is shown connected by threading 1105 to the enclosure threading 25 of the nozzle cap 15, although other fastening elements would be known to one of skill in the art.

Figure 14:
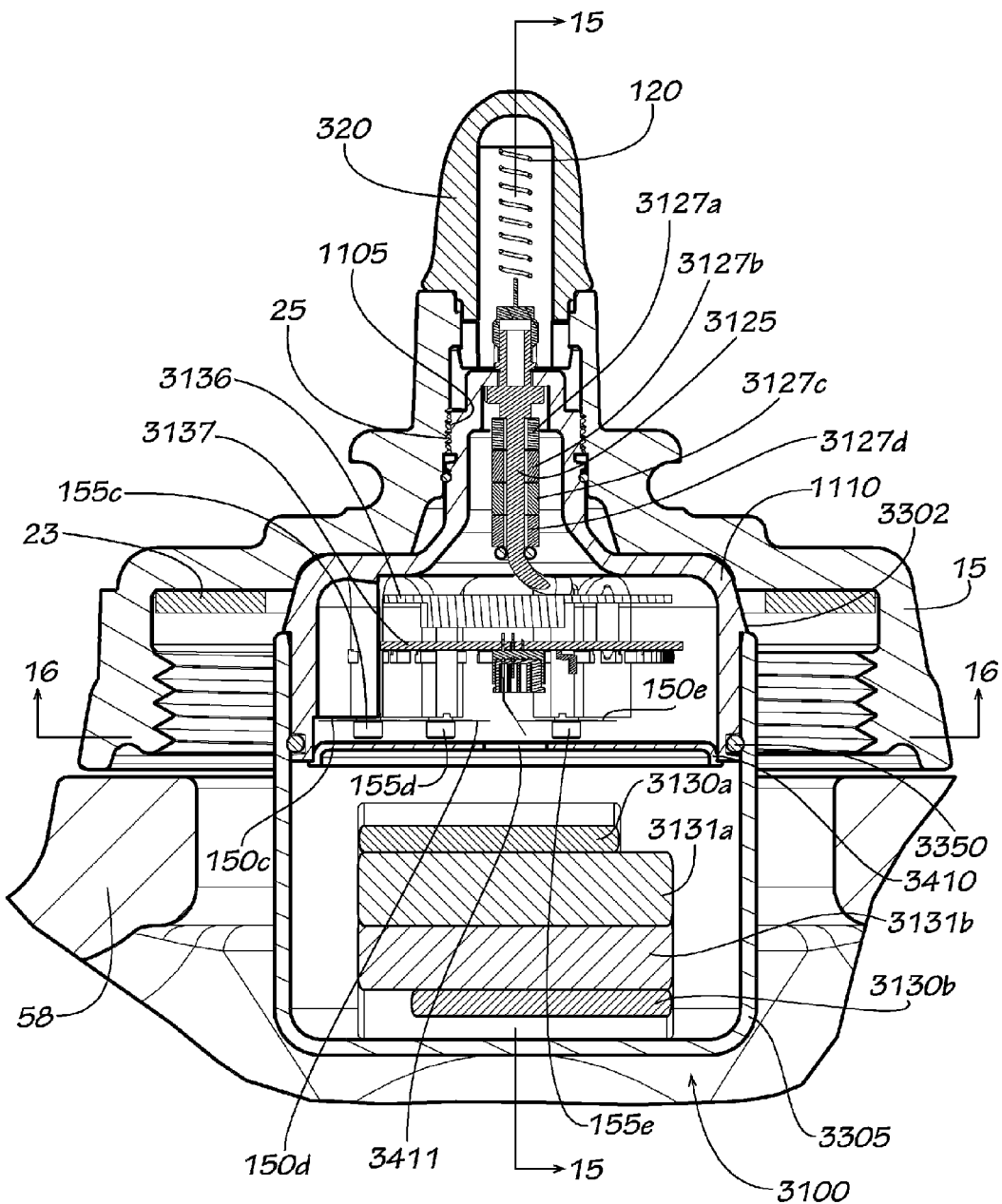
FIG. 14 is a close-up cross-sectional view of the leak detector of FIG. 13.

The interaction of components of the leak detector 3100 can be seen in closer detail in FIG. 14. A mating enclosure 3305 is fit around the outside of the enclosure 1110 and rests against an annular shoulder 3302 of the enclosure 1110. A gasket 3350 provides a seal between the mating enclosure 3305 and the enclosure 1110. In some embodiments, the mating enclosure 3305 will have a very tight fit with the enclosure 1110 thereby providing some leakage resistance as well.

The antenna 120 and antenna enclosure 320 can also be seen. An antenna cable 3125 is seen and is similar to antenna cable 125. Four ferrite beads 3127a,b,c,d can be seen surrounding the antenna cable 3125.

The leak detector 3100 of the current embodiment includes two circuit boards. One circuit board is a RF board 3136 (similar to RF board 136') and another circuit board is a DSP board 3137 (similar to DSP board 137'). In various embodiments, the RF boards 136',3136 may be called communication boards and the DSP boards 137',3137 may be called logger boards, as various functionality may be included. Although two circuit boards are shown in the current embodiment, components of the RF board 3136 may be combined with components of the DSP board 3137 in various embodiments, and the components may be combined on any number of boards from one to many in various embodiments.

As can be seen, the antenna cable 3125 is connected to the antenna 120 on one end and to the RF board 3136 on the other end. The DSP board 3137 is connected to the RF board 3136, and the two circuit boards are mounted to the enclosure 1110 in proximity with one another. Although not shown in the current embodiment, in many embodiments, the DSP board 3137 and RF board 3136 are encased in potting to prevent electrical shorting in the aqueous environment of the inside of the fire hydrant 58. Vibration sensors 150c,d,e can be seen in the current view of the current embodiment (vibration sensors 150a,b seen in other FIGs). In the current embodiment, vibration sensors 150a,b,c,d,e may not be encased in potting material, as such potting material may prevent deflection that allows the generation of a current by the piezoelectric material of the vibration sensors 150a,b,c,d,e. In some embodiments, the vibration sensors 150a,b,c,d,e may be encased in potting material. Additionally, batteries 3130a,b and 3131a,b can be seen in cross-sectional view. Bolts 155c,d,e can be seen fastening vibration sensors 150c,d,e, respectively, to the enclosure 1110 (bolts 155a,b and vibration sensors 150a,b not seen in the current view).

A partition 3410 separates the batteries 3130a,b,3131a,b from the electronic components such as the DSP board 3137, the RF board 3136, and the vibration sensors 150a,b,c,d,e. Wire leads (not shown) connect the batteries 3130a,b, 3131a,b to the DSP board 3137 and the RF board 3136. The wire leads feed through a hole 3411 defined in the center of the partition 3410. In various embodiments, a connection mechanism (not shown) is included and provides a quick connect between the batteries 3130a,b,3131a,b and the electronic components. As such, the batteries 3130a,b, 3131a,b may be replaced if they become defective without the need to replace the leak detector 3100 in its entirety. As noted elsewhere in this disclosure, the power source for the leak detector 3100 of the current embodiment may include batteries, ac power, dc power, solar, or various other power sources known in the art. In some embodiments, kinetic energy of water in the piping system may be used as a source of power generation.

Figure 15:
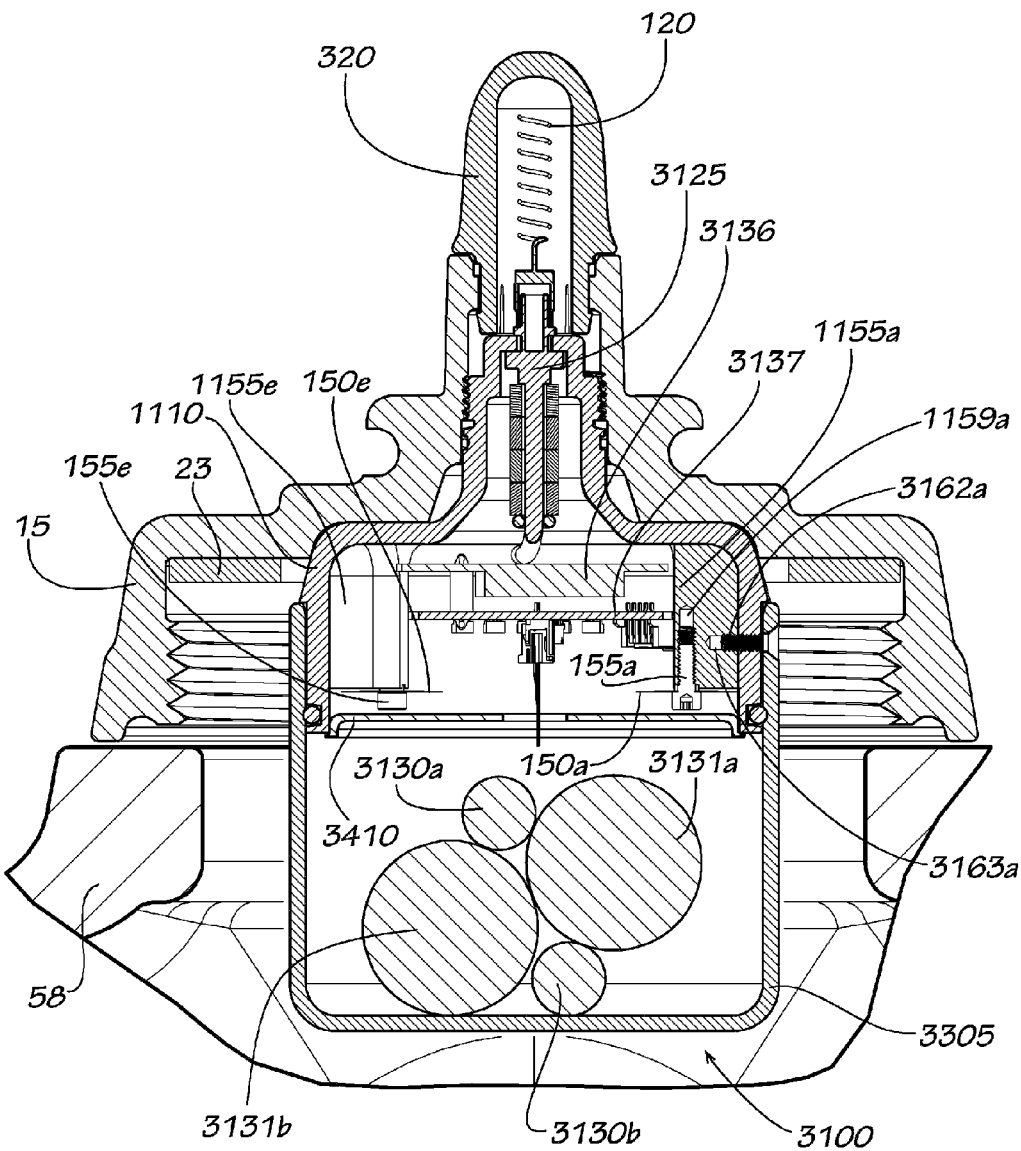
FIG. 15 is a close-up cross-sectional view of the leak detector of FIG. 13 taken along the plane indicated by line 15 in FIG. 14.

Another cross-sectional view of the leak detector 3100 can be seen in FIG. 15. In this view, vibration sensors 150a and 150e can be seen. The bolt 155a can be seen fastening the vibration sensor 150a into the bore 1159a in the current embodiment. The five-sensor array of the current embodiment includes one vibration sensor 150a,b,c,d,e connected to each post 1155a,b,c,d,e, each by one bolt 155a,b,c,d,e.

Figure 16:
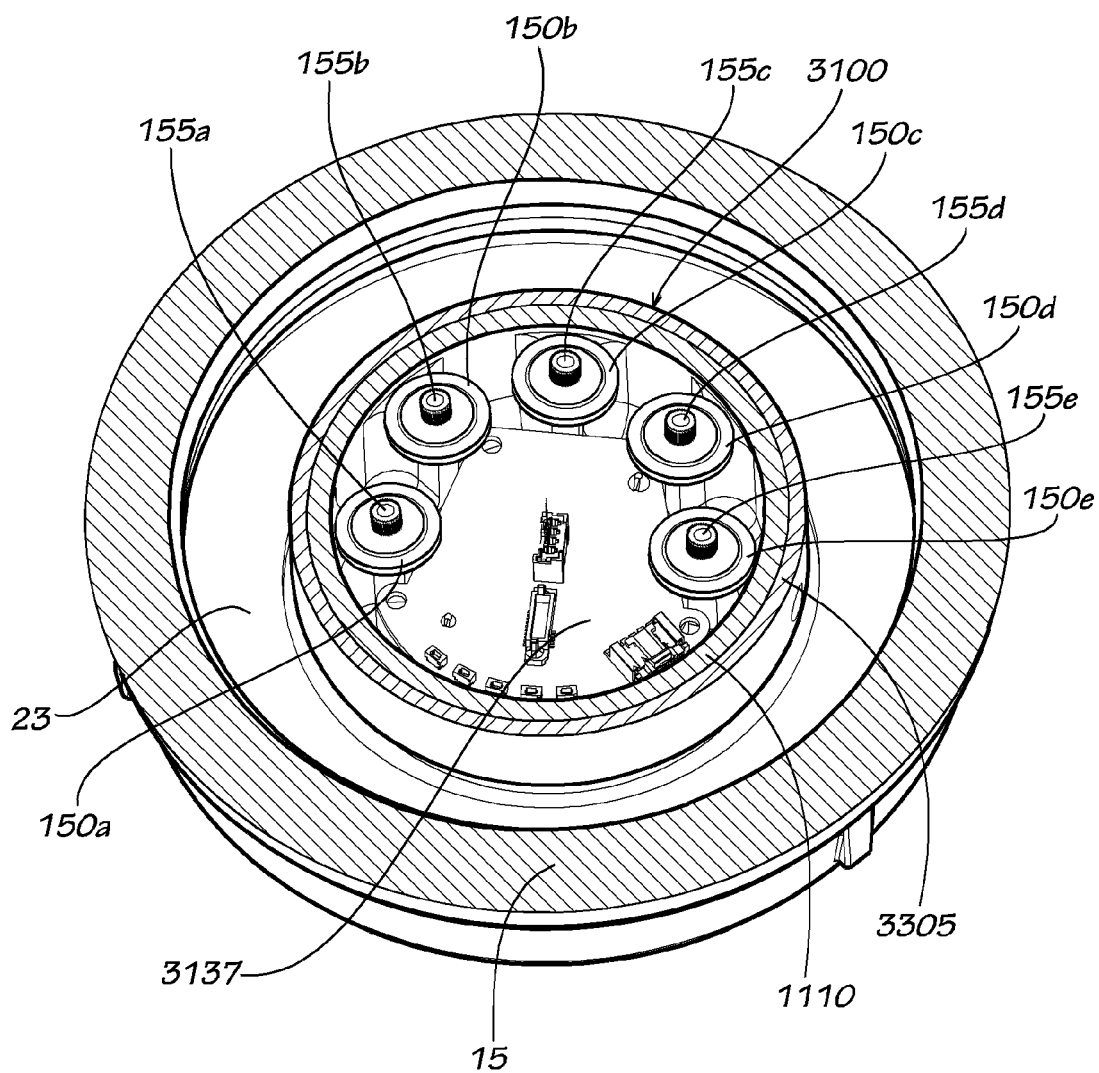
FIG. 16 is a cross-sectional view of the leak detector of FIG. 13 taken along the plane indicated by line 16 in FIG. 14.

Also seen in cross-sectional view, an enclosure fastener 3162a (3162b,c not seen in the current view) is seen fastened into a connection bore 3163a (3163b,c not seen in the current view) of the enclosure 1110 to connect the mating enclosure 3305 with the enclosure 1110. A variety of fasteners may be used and would be understood by one of skill in the art, including gluing, welding, sealing with a sealant, or providing mating threading on the enclosure 1110 and mating enclosure 3305, among other solutions. The arrangement can be seen more clearly in the cross-sectional view of FIG. 16. Note, leads from the vibration sensors 150a,b,c,d,e have been omitted from view for clarity.

Figure 17:
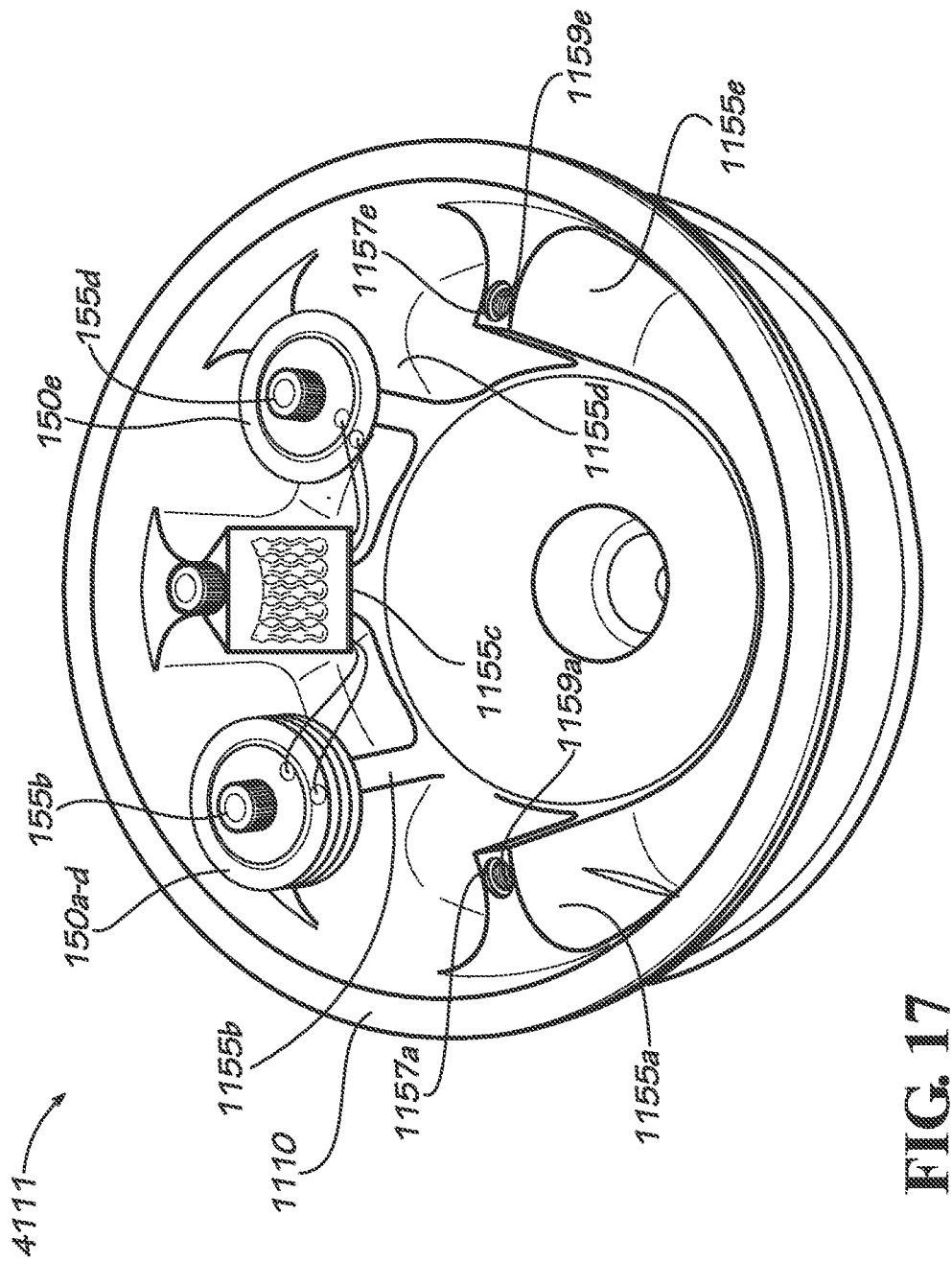
FIG. 17 is a perspective view of the inside of a leak detection subassembly in accord with one embodiment of the current disclosure.

Another embodiment of a leak detection subassembly 4111 is seen in FIG. 17. In this embodiment, the vibration sensors 150a,b,c,d are stacked in a quartet arrangement such that all four vibration sensors 150a,b,c,d are mounted on one post 1155b. Also included, vibration sensor 150e acts as a burst or tamper sensor (as described elsewhere in this disclosure) and is mounted alone on post 1155d.

In various embodiments of the current disclosure, the teachings of the disclosure and various systems as shown may be implemented in various configurations throughout the fire hydrant 58 or various other components of the piping system. In various embodiments, vibration sensors 150 may be included in various locations within and around the fire hydrant 58 or various other components of the piping system. For example, in some embodiments, vibration sensors 150 may be included in the bonnet of the fire hydrant. In various embodiments, various components may be included in various locations. For example, vibration sensors 150 may be included in the bonnet while a power supply such as batteries 130, 3130a,b, 3131a,b may be placed in an enclosure connected to the nozzle cap 15 or in another removable location such as the outer surface of the fire hydrant 58.

In addition, various embodiments of the current disclosure may include integration with a mesh network or other wireless system. As such, the methods, systems, and apparatus of the current disclosure may include a wireless repeater or other wireless integration technology.

Leak detectors 100,100',3100 may include further ability to sense additional physical attributes of the system. For example, the leak detectors 100,100',3100 may include a pressure sensor, a chlorine sensor, other chemical sensors, gas sensors, nuclear sensors and other potential inputs. Such inputs may include lines or bores into the enclosure 110, 110',1110 to connect to the circuit board 135, the RF board 136', the DSP board 137', the RF board 3136, the DSP board 3137, or another circuit board or electronic device or system.

Figure 18:
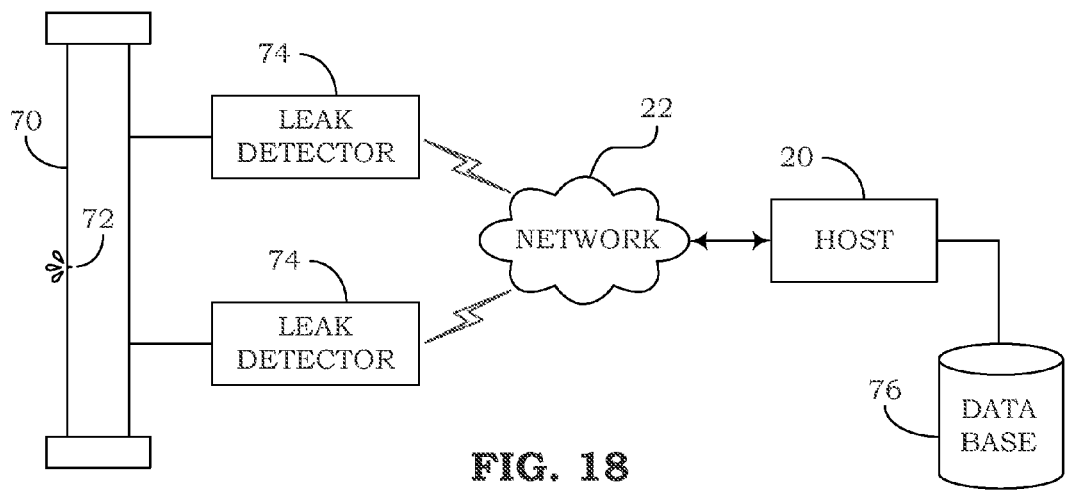
FIG. 18 is a block diagram illustrating a leak detection system according to various implementations of the present disclosure.

FIG. 18 is a block diagram illustrating an embodiment of a portion of a leak detection system according to various implementations of the current disclosure. As illustrated, the leak detection system of FIG. 18 includes a section of pipe 70, which has a leak 72. The system also includes leak detectors 74, which happen to be positioned nearest to the leak 72. Although the leak detectors 74 are shown as being attached to or in contact with the section of pipe 70, it should be understood that the leaks detectors 74 may also be connected to an inside surface of the pipe 70 and in contact with the water flowing in the pipe. In other embodiments, the leak detectors 74 may be connected to an outside surface of the pipe 70, on an inside or outside portion of a fire hydrant 58, or attached to another portion of a water distribution system. Leak detectors 74 may be one of leak detectors 100,100',3100 in various embodiments or may be leak detection devices in accord with another embodiment of the current disclosure as described herein or in accord with the general scope and purpose of the current disclosure. The leak detectors 74 communicate sensed signals (e.g., acoustic signals, pressure signals, etc.) to the host 20 via the mesh network 22. For example, the network 22 may include relay devices (e.g., using ISM frequency transmission) for relaying radio signals from the leak detectors 74 to the host 20. The network 22 in some embodiments may also include a cellular network, a radio network, a LAN, a WAN, or any other suitable network. The host 20 may be configured to store signals from the leak detectors 74 in a database 76.

The leak detectors 74 may be configured to send acoustic data to the host 20 on a periodic basis. For example, the leak detectors 74 may be configured to provide the acoustic information collected over a two-hour period every day at a certain time. The leak detectors 74 may also be configured to communicate urgent events, such as an indication of a large leak or burst. Alarms may be communicated to the host 20 when a burst is detected. Therefore, the leak detectors 74 may be configured to detect both small leaks and large leaks. During the periodic acoustic measurement times, any indication of a leak may be seen as an inconsistency with historic data. However, any large amount of acoustic activity detected at any time may give rise to an alarm signal for indicating a burst. Since small leaks do not necessarily require immediate attention, the reporting of the small leaks can be delayed until a designated reporting time. However, a detected burst usually requires a quick response in order that the burst can be attended to rapidly.

Figure 19:
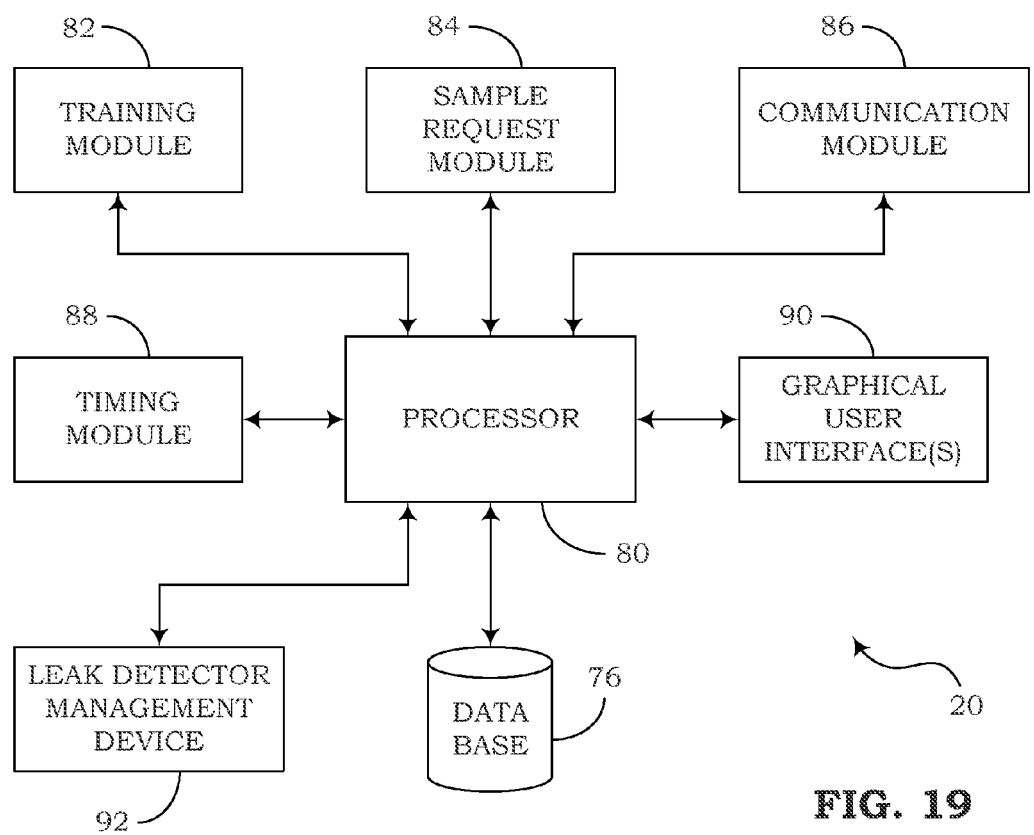
FIG. 19 is a block diagram illustrating the host shown in FIG. 1 according to various implementations.

FIG. 19 is a block diagram illustrating an embodiment of the host 20, shown for example in FIGS. 1, 2, and 18. In this embodiment, the host 20 comprises a processor 80 configured to manage the data and signal processing functions of the host 20. The host 20 also includes a training module 82, a sample request module 84, a communication module 86, a timing module 88, graphical user interface(s) 90 (or GUIs), a leak detector management device 92, and the database 76 shown also in FIG. 18. The host 20 may include any combination of software, hardware, and/or firmware. For example, a portion of the training module 82, sample request module 84, communication module 86, timing module 88, GUIs 90, and leak detector management device 92 may be configured entirely or partially in software and stored in a suitable memory device (not shown).

The training module 82 may be configured to conduct a training session during a period of time when the leak detectors are first installed and ready to be initialized. The leak detectors may "listen" for acoustic signals for a 24-hour period to determine the quietest 2-hour window during the day. For instance, external noise from street traffic or other activities may create large amounts of acoustic signals that might be sensed by the leak detectors. In fact, some noise may appear to be a leak when sensed. Therefore, quiet times during the day (or night) can be determined as being adequate times to clearly detect leak activity without excessive interferences. The training module 82 may analyze the acoustic information from the plurality of leak detectors 74 disbursed throughout the system to determine specific wake-up times for each of the leak detectors 74. The leak detectors 74 may then be awakened at their designated times. The sample request module 84 may be configured to send a signal to the leak detectors 74 at their designated reporting time to awaken them from a sleep mode. Upon waking the respective leak detectors 74, the sample request module 84 may then request that the leak detectors 74 detect acoustic signals during the respective 2-hour period and then transmit the results to the host 20. It will be understood by one of skill in the art that the 2-hour period referenced herein is for exemplary purposes only and is not intended to limit the disclosure in any way. Time periods may range from thousandths of a second to many hours, including continuous monitoring, in various embodiments.

The communication module 86 may be configured to communicate with the leak detectors 74 via radio communications, cellular communications, or other suitable types of communication. The timing module 88 may be configured to provide synchronization with the various leak detectors, maintain timing for the processor 80, and maintain time/day information.

The GUIs 90 of the host 20 may be configured to display information regarding leakage information to the user of the host device 20. For example, the GUIs 90 may include color-coded displays to indicate the health status of various mains 54/56 of the water distribution system. The GUIs 90 or other similar types of GUIs may also be incorporated with operator system 14 and/or client system 18 shown in FIG. 1.

The leak detector management device 92 may be coordinated with software in the server 13 to share, monitor, and store leakage information from the leak detector nodes within the mesh network 22. The leak detector management device 92 may receive signals regarding the health status of the actual leak detectors themselves as well as receive acoustic signal information from the leak detectors. The leak detector management device 92 may also be configured to determine the probability of leaks based on the received acoustic information. For example, if the received acoustic information is significantly different from the historic data received by the same leak detector over the past several days, then the leak detector management device 92 may determine with greater probability that a leak has occurred. Otherwise, if the acoustic information is only slightly different from the historic data, a lower probability of a leak can be determined. In this respect, the leak detector management device 92 may provide an indication of the probability of a leak. This indication might be presented as a "high probability," "medium probability," "low probability," or "no probability" of a leak. In other embodiments, the indication of probability may be provided as a percentage. For example, it may be determined that according to received information, the probability of a leak might be 35%.

The database 76 may include a repository for acoustic measurements, such as acoustic waveforms for each of the various leak detector nodes. The database 76 may also store information regarding the configuration of leak detectors 74 within the water distribution system to be able to determine which leak detectors 74 are considered to be adjacent. Therefore, when two adjacent detectors sense similar acoustic activity, the host 20 may be able to determine the general location of a potential leak.

Figure 20:
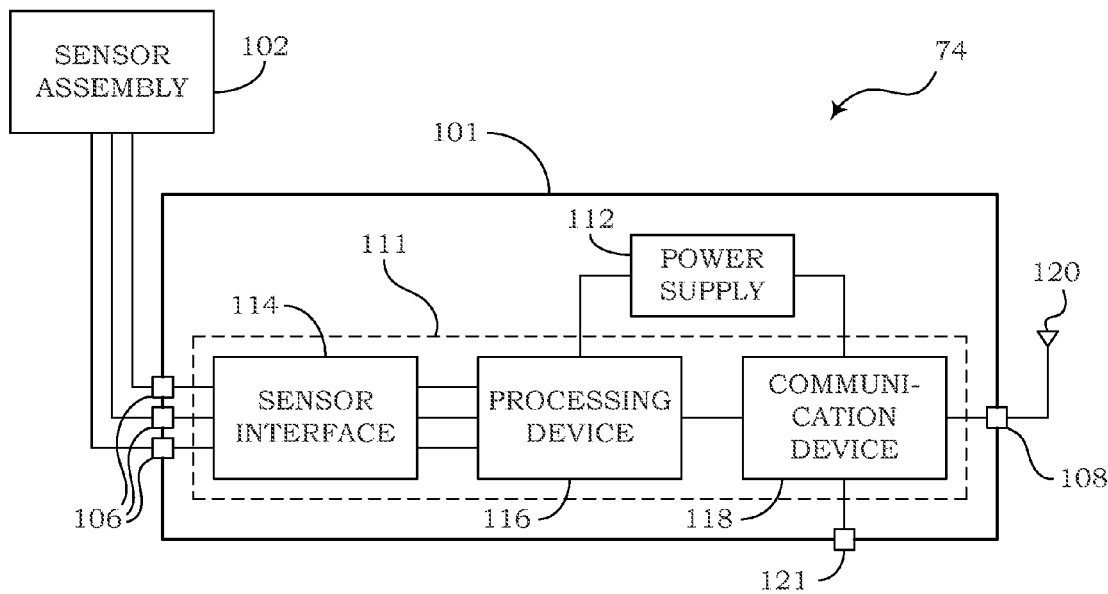
FIG. 20 is a block diagram illustrating a leak detector according to various implementations of the present disclosure.

FIG. 20 is a block diagram illustrating an embodiment of the leak detector 74 shown in FIG. 18, according to various implementations. As shown, the leak detector 74 comprises an enclosure 101, a sensor assembly 102, and antenna 120. The enclosure 101 may include any suitable structure for protecting electrical components mounted inside the enclosure 101 from water and other elements. In various embodiments, the enclosure 101 may be enclosure 110, enclosure 110', enclosure 1110, or various other configurations in accord with the current disclosure. Although antenna 120 is disclosed, any suitable antenna may be used in accord with the current disclosure. Sensor assembly 102 may include vibration sensors 150 as described elsewhere in this disclosure or may include various other embodiments of sensors in accord with the current disclosure. According to some implementations, the enclosure 101 may contain a housing that meets IP68 standards. The enclosure 101 includes sensor connectors 106 and an antenna connector 108. In some embodiments, these connectors may be contained on a circuit board and in some embodiments these connectors may be included on walls of the enclosure 101. Electrical components mounted inside the enclosure 101 and protected by the walls of the enclosure 101 are a carrier assembly 111 and a power supply 112. In some embodiments, the carrier assembly 111 includes a sensor interface 114, a processing device 116 (in some embodiments, DSP board 137' or DSP board 3137), and a communication device 118. The enclosure 101 also includes a diagnostic port 121 that allows the communication device 118 to have direct contact and communication with another device, such as a portable computer or handheld device. The other device in this respect may be used for monitoring the integrity of the leak detector 74 in the field and for running diagnostic tests on the leak detector 74.

In some embodiments, the carrier assembly 111 is a single printed circuit board with the components of the sensor interface 114, processing device 116, and communication device 118 incorporated on the printed circuit board (such as circuit board 135 in the embodiment of FIG. 5). In other embodiments, the carrier assembly 111 may include multiple printed circuit boards with the components of the sensor interface 114, processing device 116, and communication device 118 incorporated on the boards in any suitable configuration (such as RF board 136' and DSP board 137' in the embodiment of FIG. 10 and such as RF board 3136 and DSP board 3137 of the embodiment of FIGS. 13 and 14). When the electrical components are disposed on multiple boards, standoffs may be used as needed. Connectors may be used to couple the processing device 116 with the sensor interface 114 and communication device 118.

The sensor assembly 102 may include any combination of sensors for detecting various parameters that may be analyzed to detect the presence of a leak or large burst. For example, the sensor assembly 102 may include one or more piezoelectric sensors (such as vibration sensors 150), acoustic sensors, acoustic transducers, hydrophones, pressure sensors, pressure transducers, temperature sensors, accelerometers, or other types of sensors. According to some embodiments, the sensor assembly 102 includes five sensors, where four sensors are configured to detect small leaks and the fifth sensor is configured to detect a burst. The fifth sensor for detecting bursts may be configured as multiple sensors in some embodiments. According to various implementations, the sensor assembly 102 may include three sensors (i.e., an acoustic sensor, a pressure sensor, and a temperature sensor) and may provide the three measurements, respectively, via the sensor connectors 106 to the sensor interface 114.

The power supply 112 may contain one or more batteries, solar-powered devices, electrical power line couplers, capacitors, or other power sources or components. When external power is received, additional connectors or ports may be added through the walls of the enclosure 101. When batteries are used, the power supply 112 may also include a battery capacity detection module for detecting the capacity of the one or more batteries.

The sensor interface 114 acquires the acoustic, pressure, and/or temperature data from the sensor assembly 102. In addition, the sensor interface 114 may include amplification circuitry for amplifying the sensed signals. The sensor interface 114 may also include summing devices, low pass filters, high pass filters, and other circuitry for preparing the signals for the processing device 116.

The processing device 116, as described in more detail below with respect to FIGS. 21 and 22A-22C, is configured to process the sensed signals and determine whether a leak exists or whether the probability of a leak exists. The processing device 116 is also configured to log the acoustic information and save it until a designated time when the host 20 requests the data.

The communication device 118 may include a modem, such as a cellular or ISM-enabled modem to provide network access to the communication device 118. Also, the communication device 118 may include a tuning module, such as a GPS timing receiver, for providing an accurate timing reference for the leak detector 74 and for synchronizing timing signals with other elements of the leak detection system 10. The communication device 118 may be configured to transmit and receive RF signals (e.g., ISM frequency signals), cellular signals, GPS signals, etc., via the antenna 120. In addition, the communication device 118 may send and receive diagnostic testing signals with an external device (e.g., handheld device) via the diagnostic port 121.

Figure 21:
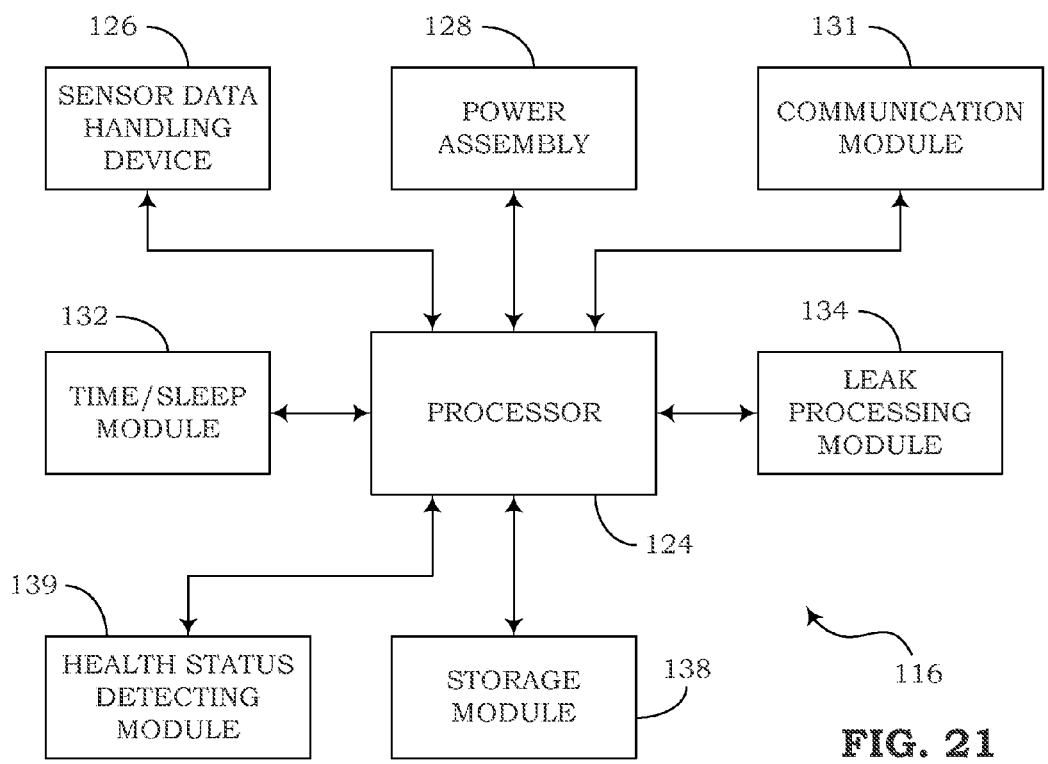
FIG. 21 is a block diagram illustrating the processing device shown in FIG. 20 according to various implementations of the present disclosure.

FIG. 21 is a block diagram showing an embodiment of the processing device 116 shown in FIG. 20. The processing device 116, which may also be referred to as a "logger" device, is configured to detect the presence of a nearby leak in a section of pipe. As illustrated, the embodiment of the processing device 116 includes a processor 124, a sensor data handling device 126, a power assembly 128, a communication module 131, a time/sleep module 132, a leak processing module 134, a health status detecting module 139, and a storage module 138. The processor 124 may comprise one or more of a microcontroller unit (MCU), a digital signal processor (DSP), and other processing elements.

The sensor data handling device 126 connects with the sensor interface 114 and handles the sensor data to allow processing of the signals by the processor 124. The power assembly 128 may comprise a power source, which may be separate from the power supply 112. In some embodiments, however, the power assembly 128 may be connected to the power supply 112. The power assembly 128 may also be configured to control the voltage and current levels to provide constant power to the processor 124. In some embodiments, the processor 124 may be provided with about 3.0 volts DC. The communication module 131 connects with the communication device 118 and receives and/or sends signals for communication through the communication device 118.

The processing device 116 also includes a time/sleep module 132 for providing timing signal to the processor 124 and may include a crystal oscillator. The time/sleep module 132 also controls sleep modes in order to minimize battery usage when the leak detector 74 is not in use. For example, the processor 124 may include an MCU that operates continually and a DSP that sleeps when not in use. Since the DSP normally uses more power, it is allowed to sleep in order to conserve battery power.

The time/sleep module 132 may be configured to wake various components of the processor 124 at designated times in order that sensor data stored during a previous time may be transmitted to the host 20. In some embodiments, the time/sleep module 132 may wake the leak detector 74 at a certain time during the day, enable the sensor assembly 102 to analyze and record an acoustic waveform for approximately ten seconds, return to a sleep mode for about ten minutes, and repeat the analysis every ten minutes or so for about two hours. After these waveforms are sensed, the leak detector 74 sends the data to the host 20 and the time/sleep module 132 returns the device to a sleep mode until the designated time on the next day. Separate from the regular sensing schedule, the time/sleep module 132 may be configured to wake up the processor 124 in the event that a large leak, or burst, has been detected.

The leak processing module 134 may be configured to perform the analysis of the acoustic waveforms and other sensed parameters to determine if a leak has been sensed. The leak processing module 134 can also determine the probability or likelihood that the sensed data is indicative of a leak. The leak processing module 134 may also be configured to constantly monitor for a burst, in which case an alarm will be sent. In addition to sensing small leaks and bursts, the leak processing module 134 may also be configured to detect unauthorized tampering with a fire hydrant 58 associated with the leak detector 74. Regarding tamper sensing, the leak processing module 134 may be configured to determine if a person is tampering with a pumper nozzle of the hydrant 58, if there is an unauthorized flow of water from the hydrant 58, or if the hydrant 58 has been damaged, such as from impact by a vehicle. In some respects, detecting for tampering may use similar methodology as is used for sensing bursts, in that the acoustic waveform may display a quick and pronounced plateau above the normal baseline waveform.

At times, the health status detecting module 139 may be configured to operate to determine the health or integrity of the leak detector 74 using various diagnostic tests. For example, the status may be detected every time the leak detector 74 wakes up from a sleep mode, which may be repeated several times throughout a two-hour sensing stage. The health status detecting module 139 may detect the sensor functionality and the functionality of other hardware devices to determine if there are any issues. The health status detecting module 139 can also monitor an MCU and/or DSP of the processor 124, memory of the storage module 138, etc. When issues are discovered during the diagnostic tests, the health status detecting module 139 may set flags to indicate the status of the various components of the leak detector 74. These flags may be communicated to the host 20 at designated times.

The storage module 138 may include flash memory, read-only memory (ROM), random access memory (RAM), or other types of memory. The storage module 138 may comprise a database for storing acoustic waveforms. The database may include frequency bins for storing current acoustic data as well as historic data collected over several days. The processor 124 is configured to utilize the stored waveforms to detect the presence or probability of leaks, bursts, or tampering activity.

Figure 22A:
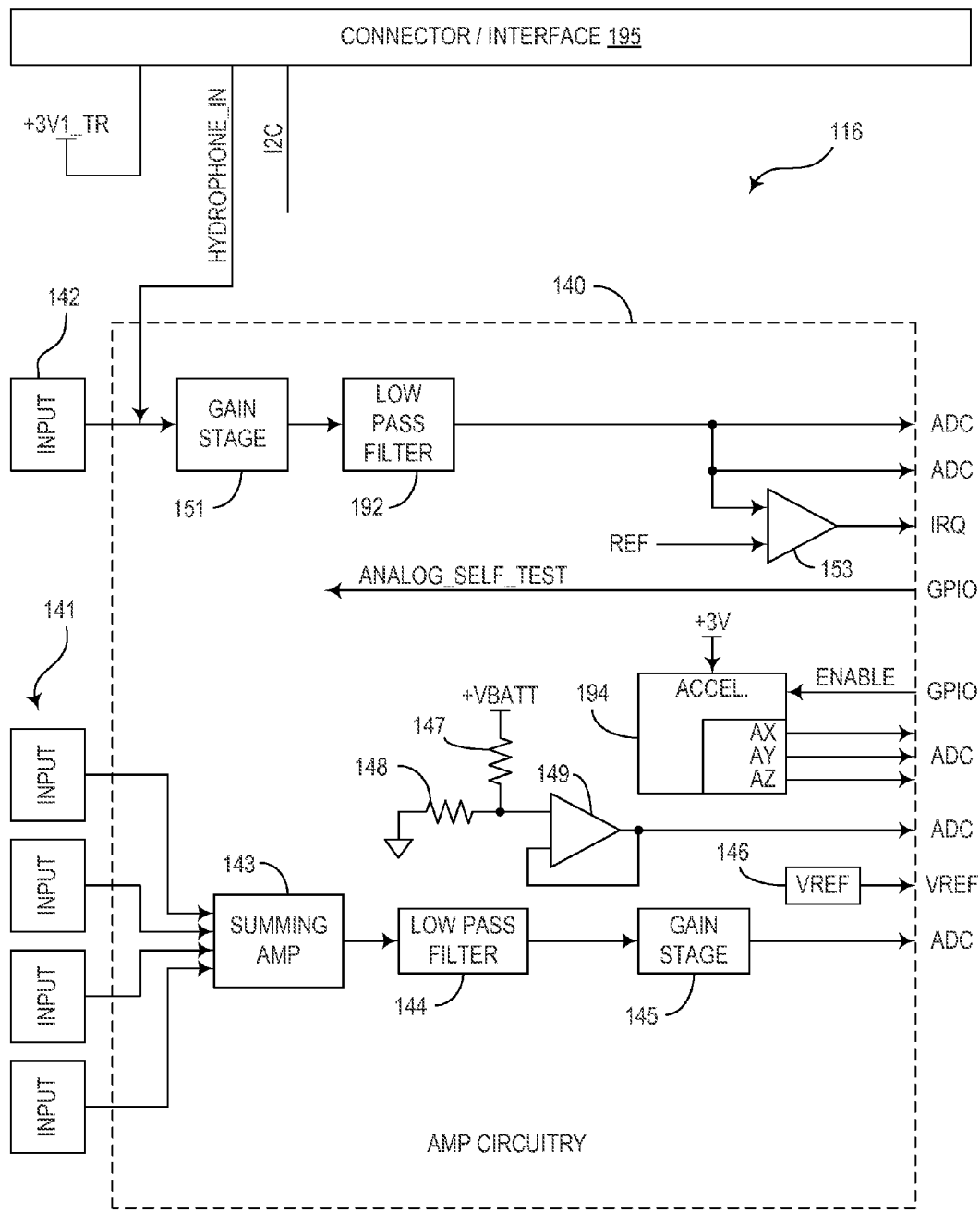
FIGS. 22A, 22B, and 22C are schematic diagrams illustrating the processing device shown in FIG. 20 according to various implementations of the present disclosure.
Figure 22B:
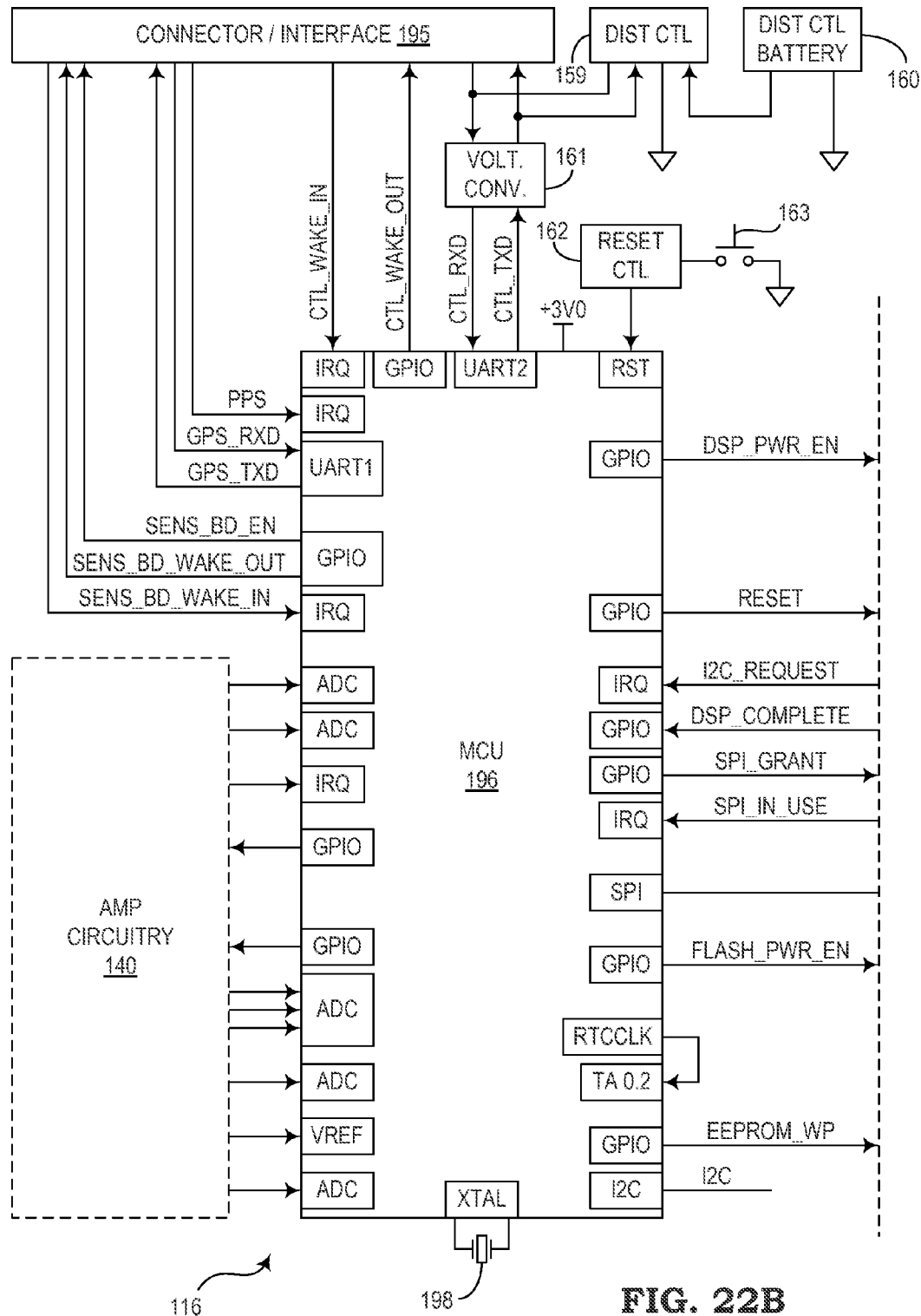
Figure 22C:
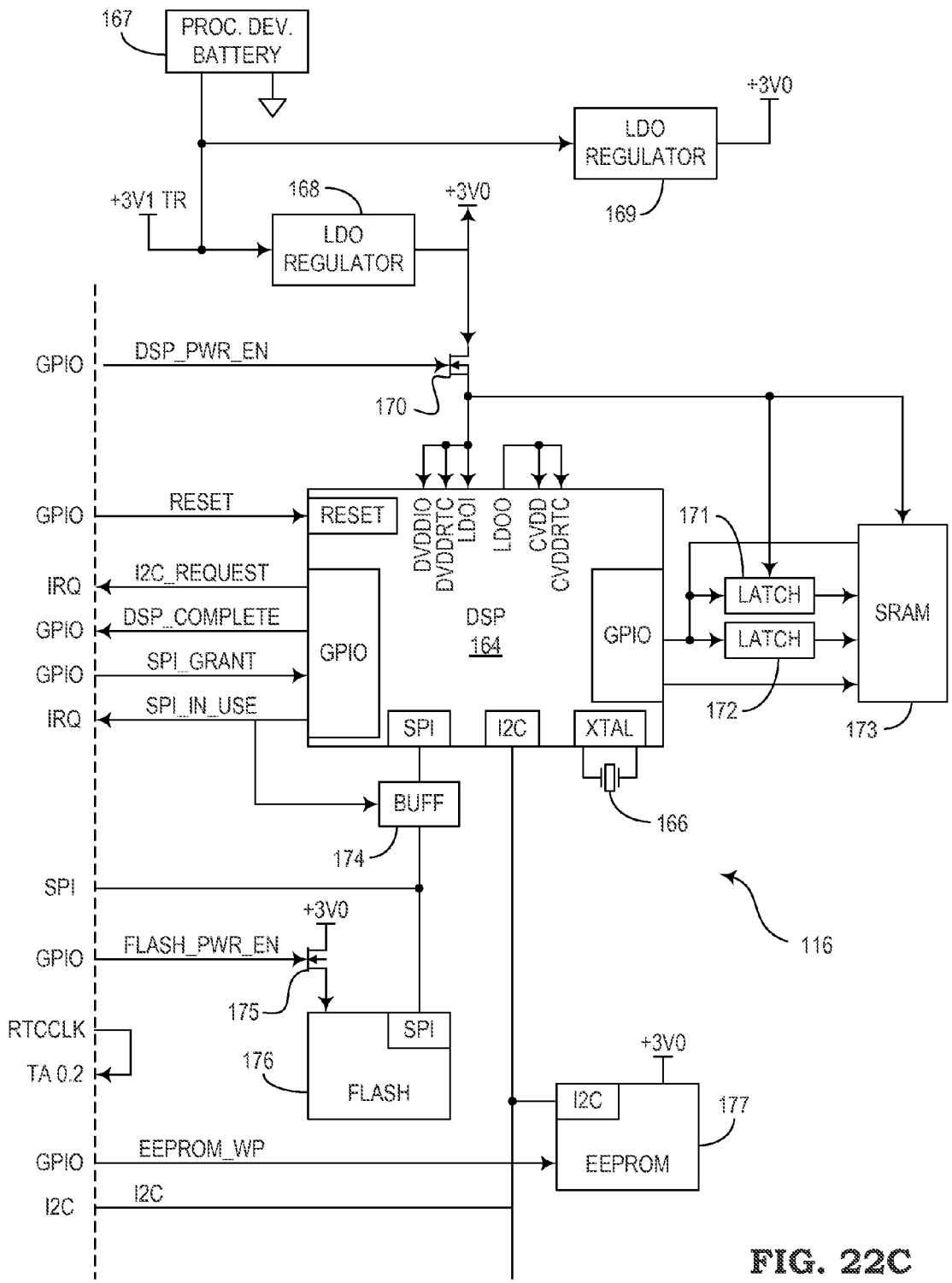

FIGS. 22A-22C, in combination, form a schematic diagram showing an embodiment of the processing device 116 shown in FIG. 20 and described in detail with respect to FIG. 21. As illustrated in FIG. 22A, the processing device 116 comprises amplification circuitry 140 that receives input from the sensor assembly 102. For example, inputs 141 are received from sensors that may normally be off, but may be enabled during a regular, intermittent sensing period for detecting small leaks. Input 142 is received from a sensor for detecting an urgent event, such as a burst or tampering. In this respect, the sensors associated with the inputs 141 may be normally off, but awakened during a reporting period and the sensor associated with the input 142 may be normally on to continuously monitor for bursts or other urgent events.

The four inputs 141 are summed in a summing amplifier 143, passed through a low pass filter 144, and amplified in a gain stage 145 before being provided to a microcontroller unit (MCU) 196, shown in more detail in FIG. 22B. The one input 142 passes through a gain stage 151 and low pass filter 192 and is provided to the MCU 196. A reference voltage VREF 146 is also provided to the MCU 196. Resistors 147 and 148 form a voltage divider for providing a battery voltage (+VBATT) to one input of an operational amplifier 149. An output from the operational amplifier 149 is connected to a non-inverting input of the op amp 149 and is provided to an analog to digital input (ADC) of the MCU 196. The amp circuitry 140 may also include an accelerometer 194 for providing additional sensing signals to the MCU 196. A hydrophone input (HYDROPHONE_IN) is provided from a connector or interface 195 of the processing device 116. In this case, the hydrophone input is provided to the gain stage 151.

As shown in FIG. 22B, the MCU 196 receives sensed signals from the amplification circuitry 140. The MCU 196 is also connected to a carrier board connector or interface 195 for communicating with a sensor board or, sensor interface 114, and/or communication device 118. For example, the MCU 196 may communicate sleep/wake and enable signals with the sensor board via IRQ and GPIO ports. Also, GPS receiving and transmitting signals may also be communicated via the connector/interface 195. The MCU 196 may therefore control sleep and wake times for the sensors. A 3.0 voltage is provided to the MCU 196 to allow the MCU 196 to operate continuously. The MCU 196 is connected to a crystal oscillator (XTAL) 198 for providing clock signals. The processing device 116 also includes a serial bus (I2C) for communication. The processing device 116, according to some embodiments, also includes a distribution control interface 159 for communicating control signals with the communication device 118 and a distribution control battery interface 160 for communicating battery control signals. A voltage converter 161 communicates transmit and receive signals with a UART of the MCU 196. A reset control circuit 162 may be used to reset the MCU 196 using a control switch 163. The MCU 196 includes various connections via GPIO, IRQ, and SPI outputs with various components shown in FIG. 22C.

As shown in FIG. 22C, an enable signal (DSP_PWR_EN) is provided from the MCU 196 to a switch 170 (e.g., field effect transistor), which controls an on/off status of a digital signal processor (DSP) 164. When the MCU 196 receives an indication of an urgent event, the MCU 196 turns on the DSP for processing the sensed signals. Power is provided by a battery via interface 167 for powering the components of the processing device 116. The processing device 116 includes voltage regulators 168 and 169 for regulating the power to the DSP 164. A separate crystal oscillator (XTAL) 166 provides clock signals to the DSP 164. A reset signal from the MCU 196 may be provided to the DSP 164 via the RESET line to reset the DSP 164. A I2C_REQUEST line from the DSP 164 to the MCU 196 communicates a request regarding the I2C serial bus and the DSP_COMPLETE line indicates that the DSP 164 is finished with its processing and storing of sensed signals. The processing device 116 also includes memory devices, such as SRAM, flash, and EEPROM for storing sensor data, software and/or firmware, etc. Latches 171 and 172 are used for storing information in an SRAM 173. When a signal along FLASH_PWR_EN is provided from the MCU 196, the switch 175 is closed to enable powering of the flash memory device 176 through a buffer 174. Also, a EEPROM 177 is connected to the I2C line and receives data from the MCU 196 for storage.

Figure 23:
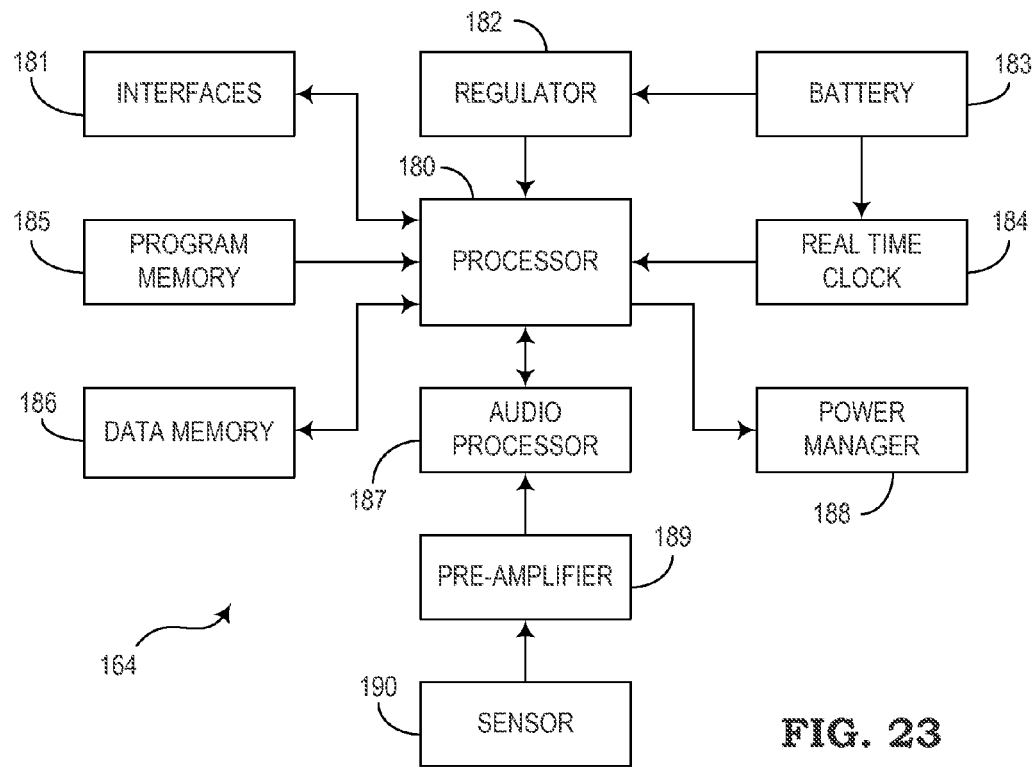
FIG. 23 is a block diagram illustrating the digital signal processor (DSP) shown in FIG. 22C according to various implementations of the present disclosure.

FIG. 23 is a block diagram illustrating an embodiment of the DSP 164 shown in FIG. 22C. In this embodiment, the DSP 164 includes a processor 180, interfaces 181, regulator 182, battery 183, real time clock 184, program memory 185, data memory 186, audio processor 187, power manager 188, pre-amplifier 189, and sensor 190. Each sensor 190 is connected to the preamplifier 189 which amplifies the signal into audio processor 187. In the current embodiment, sensor 190 may be vibration sensor 150 or may be another sensor of various types as disclosed herein.

Vibration signals from leak detection are processed in a similar way to audio signals. As such, the audio processor 187 performs many functions needed to process the leak detection data. The signal from the audio processor 187 is then fed into the processor 180. Program memory 185 drives the DSP's programming. The DSP 164 may store processed signal information in data memory 186. The battery 183 is regulated by a regulator 182 to power the processor 180. The battery 183 also powers a real-time clock (RTC) 184 whose data is also fed to the processor 180. The processor 180 controls a power manager 188 which itself controls whether the DSP 164 goes into a sleep mode. The processor 180 also includes a connection to various interfaces 181. In some embodiments, the interfaces 181 include four analog inputs. However, in other embodiments, many configurations of the interfaces 181 may be used. The processor 180 may also be connected by both a data line and a control line to the communication device 118 shown in FIG. 20. The processor 180 includes analog to digital conversion capabilities. The audio processor 187 includes analog to digital processing, filter and clipping capabilities, and a codec. In some embodiments, a global positioning system (GPS) receiver may be included with the leak detector 74 and may be utilized to keep accurate time. The GPS receiver may be included with the DSP 164, the communication device 118, or on its own in various embodiments.

Figure 24:
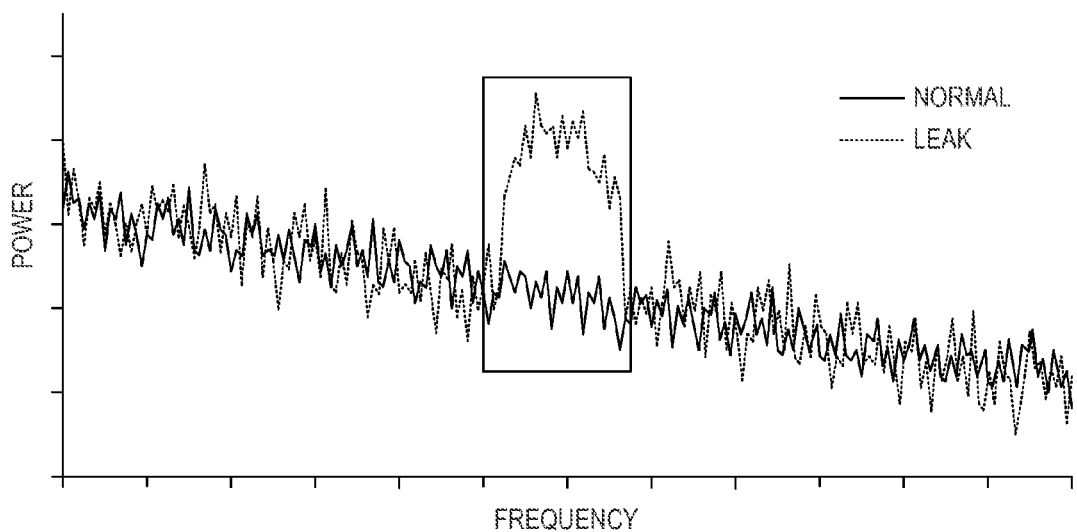
FIG. 24 is a graph illustrating an example of signals detected by the sensor assembly shown in FIG. 20.

FIG. 24 is a graph illustrating a sample of exemplary acoustic data received by the processing device 116. This data can be used to help identify a leak, wherein a leak is determined by the deviation between the baseline (or "normal" line) and the tested line (or "leak" line). An example of a possible leak is highlighted in FIG. 24 within a box, wherein the voltage levels within a certain frequency range are considerably higher than normal levels. Since the voltage levels appear much higher than normal, the probability that a leak has been detected is fairly good.

Figure 25:
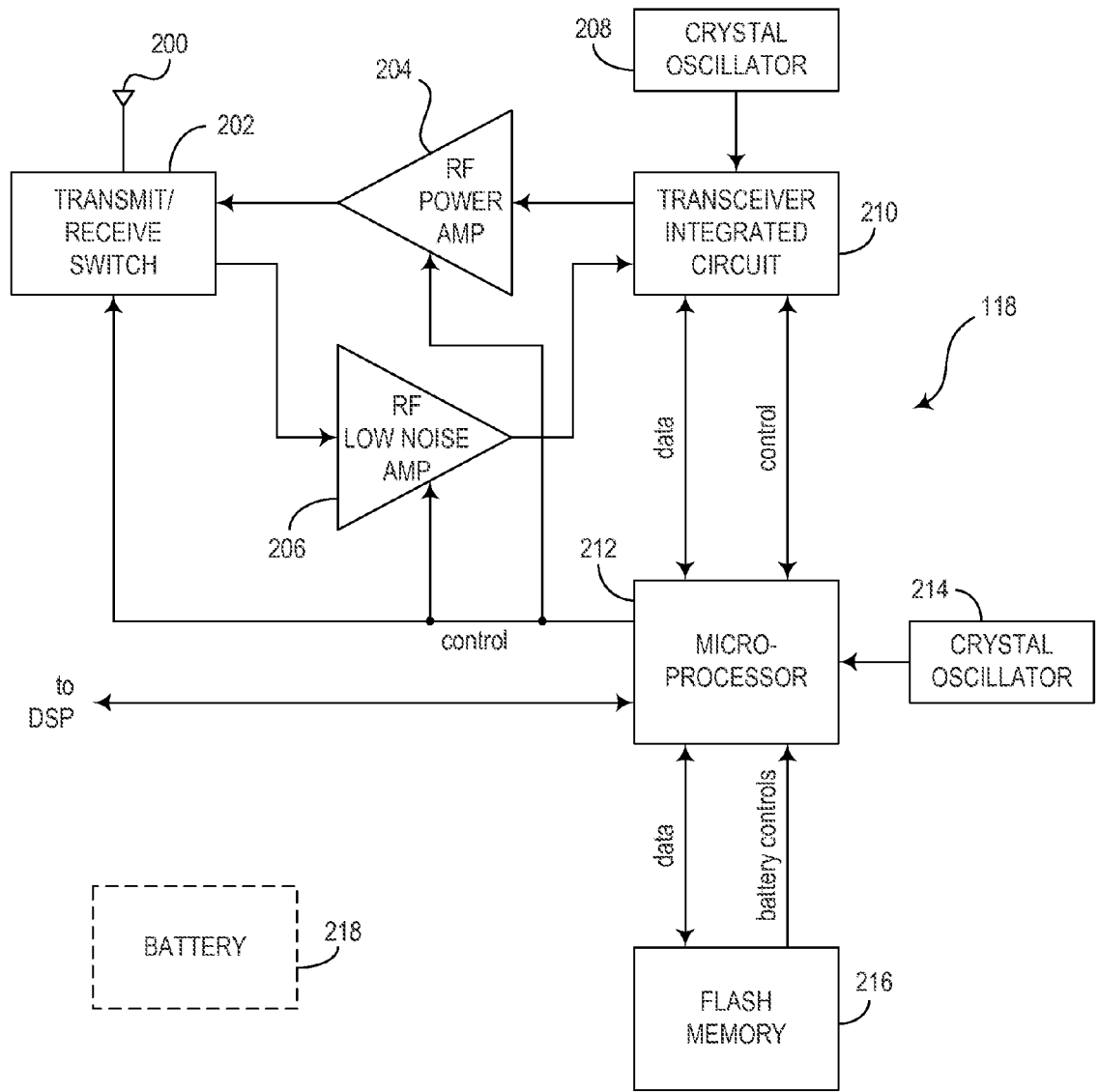
FIG. 25 is a block diagram illustrating the communication device shown in FIG. 20 according to various implementations of the present disclosure.

FIG. 25 is a block diagram showing an embodiment of the communication device 118 shown in FIG. 20. The communication device 118 may be configured on a printed circuit board, for example. According to the illustrated embodiment, the communication device 118 comprises an antenna 200 (which may include antenna 120), a transmit/receive switch 202, an RF power amplifier 204, an RF low noise amplifier 206, a crystal oscillator 208, a transceiver integrated circuit (IC) 210, a microprocessor 212, a second crystal oscillator 214, and flash memory 216. A battery 218 is configured to power many of the components of the communication device 118, including the transceiver IC 210, the microprocessor 212, the RF power amplifier 204, the RF low noise amplifier 206, and flash memory 216. The battery 218 may be one or more of batteries 130,3130,3131, or another battery suitable for use. In various embodiments, power sources other than batteries may be used in various circuitry as disclosed elsewhere herein and known to one of skill in the art. Crystal oscillators 208 and 214 are connected to the transceiver IC 210 and the microprocessor 212, respectively. Although flash memory 216 is specified, any type of memory may be used with the communication device 118.

A data line connects the antenna 200 to the transmit/receive switch 202. RF received data from the antenna 200 is fed into the RF low noise amplifier 206 and then to the transceiver IC 210. The transceiver IC 210 is connected to the microprocessor 212 and to the RF power amplifier 204. If RF transmission data is to be sent to the antenna 200 and, thereby, to the host or another remotely located communicator, it is transmitted to the RF power amplifier 204 where it is amplified and transmitted to the transmit/receive switch 202 and on to the antenna 200 for communication.

The microprocessor 212 and transceiver IC 210 include both a two-way data and a two-way control line. The microprocessor 212 include a control line to each of the RF power amplifier 204, RF low noise amplifier 206, and the transmit/receive switch 202. The microprocessor 212 is also connected to the flash memory 216 by both a two-way data line and by a battery status line, the battery line included so that the flash memory 216 may notify the microprocessor 212 of its power and battery status. Finally, the microprocessor 212 is connected to the DSP 164 shown in FIG. 23.

The communication device 118 may be configured on various radio topologies in various embodiments, including point to point, point to multipoint, mesh networking, and star, among others. The communication device 118 may be configured to communicate in multiple topologies or in one of multiple topologies.

Figure 26:
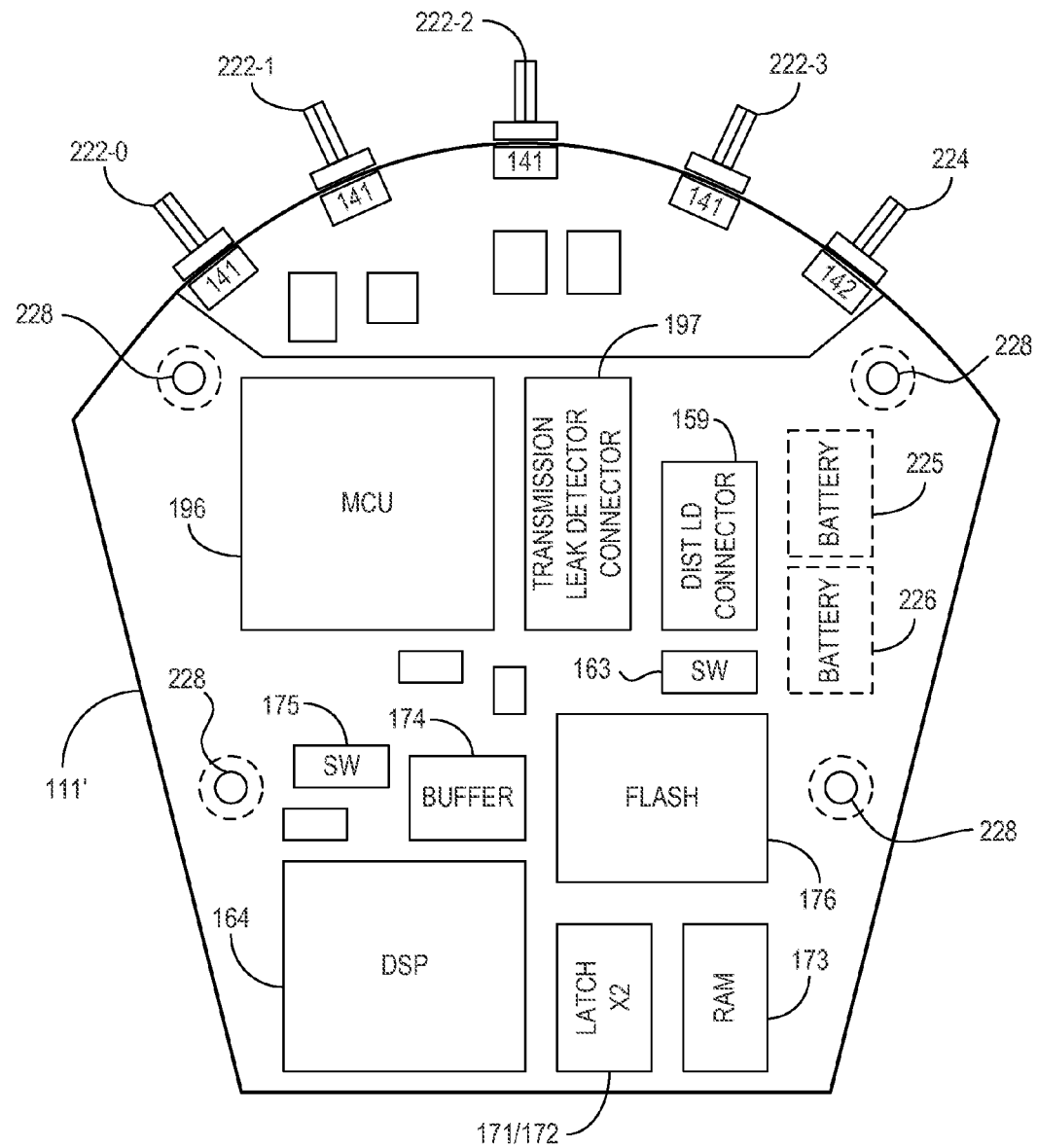
FIG. 26 is a diagram illustrating a carrier board in accord with one embodiment of the current disclosure.

FIG. 26 is a diagram illustrating an embodiment of the carrier board 111 shown in FIG. 20. The carrier board 111 is implemented as a printed circuit board with the components of the processing device incorporated thereon, and in some embodiments may also include the sensor interface 114 and/or communication device 118 incorporate thereon. In this embodiment, the carrier board 111 is designed to specifically fit under nozzle cap 15 of fire hydrant 58. The printed circuit board thus has a keystone or muffin shape for fitting within the hydrant cap enclosure. The surface area, according to some implementations, may be about 4.21 square inches.

Sensors 222-0, 222-1, 222-2, and 222-3 represent the four normally-off sensors of the sensor assembly 102 that provide inputs 141 to the processing device 116. Sensor 224 represents the single normally-on sensor that provides input 142 to the processing device 116. The MCU 196, transmission leak detector connector 197, distribution lead detector connector 159, switches 163 and 175, buffer 174, flash 176, DSP 164, latches 171, 172, and RAM 173, shown in FIGS. 22A-22C may be arranged as illustrated in FIG. 26. It should be understood that other minor modifications to the positioning of the elements may be made without departing from the spirit and scope of the present disclosure. The elements mounted on the printed circuit board are powered by batteries 225 and 226, although connection to external batteries such as battery 130,3130,3131 may be possible in various embodiments. The carrier board 111 also includes four through-holes 228 for enabling the carrier board to be mounted within the valve cap of the hydrant 58 and/or to standoffs for connection to other printed circuit boards, such as boards that support the sensor interface 114 and/or communication device 118 if not already incorporated in the carrier board 111.

Figure 27:
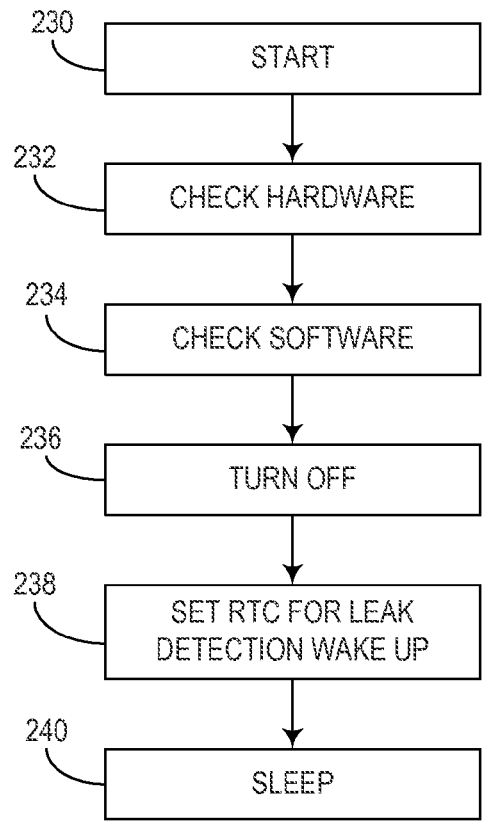
FIG. 27 is a flow chart of an initiation method in accord with one embodiment of the current disclosure.

FIG. 27 is a flow diagram illustrating a method of the leak detector 74 at its startup. At installation, the leak detector 74 starts, or powers up, as shown in block 230. The leak detector goes through diagnostic tests to check hardware as shown in block 232. For example, the hardware may include the batteries (or other power sources), RTC 184, regulator 182, communication device 118, sensor assembly 102, audio processor 187, various memory devices (including flash memory 216, program memory 185, and data memory 186), and various processors 180, 212. Other hardware may also be checked in other embodiments.

The method of FIG. 27 then proceeds to check software as shown in block 234, the software including data I/O, memory storage, programming and program flow, and event trigger testing. The leak detector 74 then turns off peripherals as shown in block 236, thereafter setting the RTC 184 for leak detection wake up as shown in block 238 and sleeping as shown in block 240. The RTC 184 may set the leak detector 74 to awake for leak detection 2% of the time in the current embodiment. However, other wakeup intervals may be chosen. Moreover, a 2% leak detection interval may include 2% of any time interval. For example, in some embodiments, the leak detector 74 will awaken for a span of 28.8 minutes once every twenty-four hours. In other embodiments, the leak detector 74 will awaken for a span of six seconds once every five minutes. In both example embodiments, the leak detector 74 is awake for only 2% of the total time. Various other embodiments may also be used.

Although not shown in FIG. 27, an indicator light may be included in some embodiments to provide visual affirmation to the installer that the leak detector 74 has been activated and installed and that all hardware and software has been checked and verified to be in working order. In some embodiments, the indicator light will be a green LED set to blink several times before the leak detector 74 goes to sleep (step 240).

Figure 28:
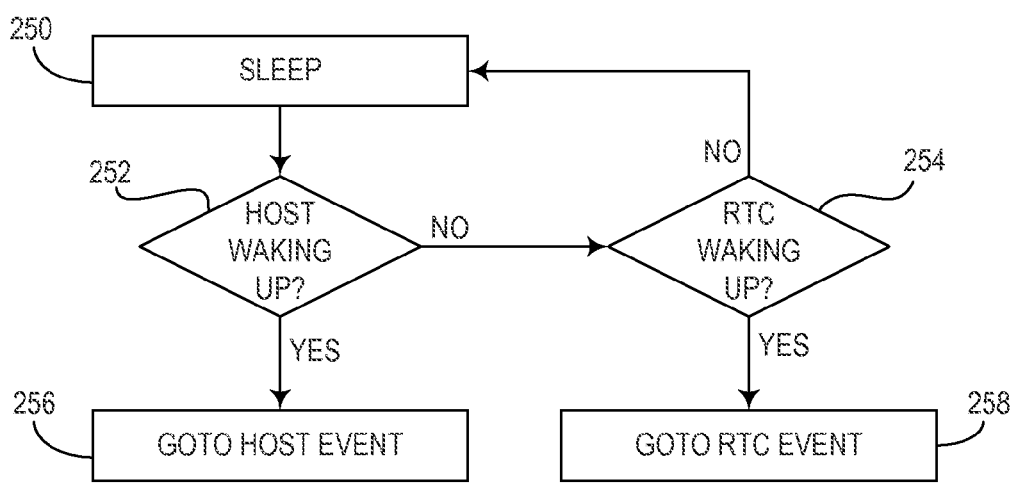
FIG. 28 is a flow chart of a monitoring method in accord with one embodiment of the current disclosure.

FIG. 28 is a flow diagram illustrating a method that follows an initiation stage (e.g., after FIG. 27). The method of FIG. 28 may be used during the life of the leak detector 74. Starting in sleep mode as shown in block 250, the method first determines whether the host is waking up the leak detector 74 from sleep. If yes, the method proceeds to the host event (e.g., FIG. 29), as shown by block 256. If no, the method proceeds to block 254 to determine if the RTC 178 is waking up the leak detector 74. If no, the method returns to block 250 and the leak detector 74 goes to sleep. If yes, the method proceeds to the RTC event (FIG. 30), as shown in block 258.

Other modes are also possible, although not shown in the method of the current embodiment. In some embodiments, user testing may be performed. In some embodiments, user activated programming may occur. These are typically performed locally either by wire or by short range radio, although such functions may be performed from a host as well.

Figure 29:
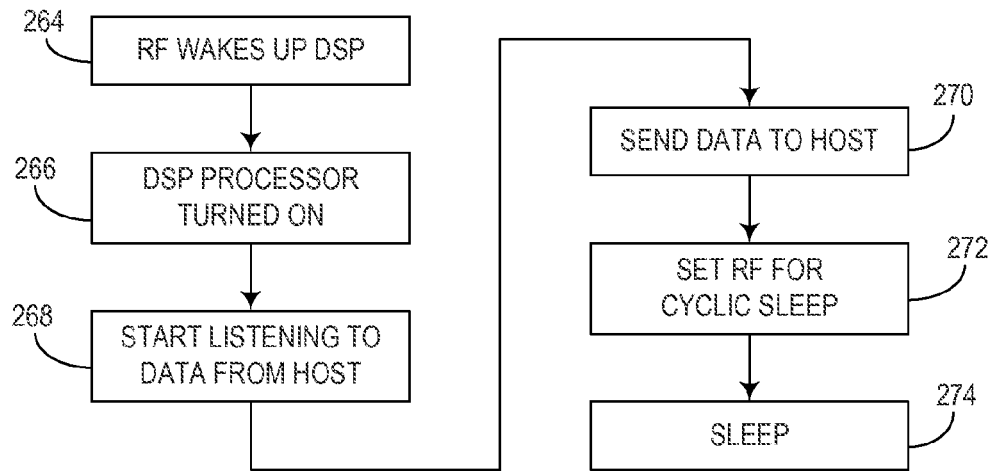
FIG. 29 is a flow chart of a monitoring method in accord with one embodiment of the current disclosure.

FIG. 29 is a flow diagram illustrating a method for a host event, which occurs when the host places a call for (i.e., wakes up) the leak detector 74 to operate. In this method, the first step occurs when the RF circuit (e.g., communication device 118) wakes the DSP 164 as shown in block 264. This may occur when the RF circuit receives a call from the host 20 to wake the DSP 164. The processor of the DSP 164 is turned on as shown in block 266. The DSP 164 receives data from host 20 as shown in block 268. This data may be received by transmission through the RF circuit as denoted above. Some of the data received may include a unit ID, location (which may include GPS data or simply a location code), RTC data (for synchronizing the RTC 184), time of wake up, time of data record, length of data record, frame time, frame frequency, total time, sampling frequency, analog to digital resolution, piping information, environment, and frequency data, among others. The DSP 164 then may send data to the host 20 as shown in block 270. This data may include any of the data above or any of the following: leak profile identification data, leak profile, raw signal, manufacturer id, leak history, leak status, leak probability, and system hardware and software diagnostic data, among others. The method then proceeds to set the RF circuit for cyclic sleep, as shown in block 272, and then sleep, as shown in block 274.

Figure 30:
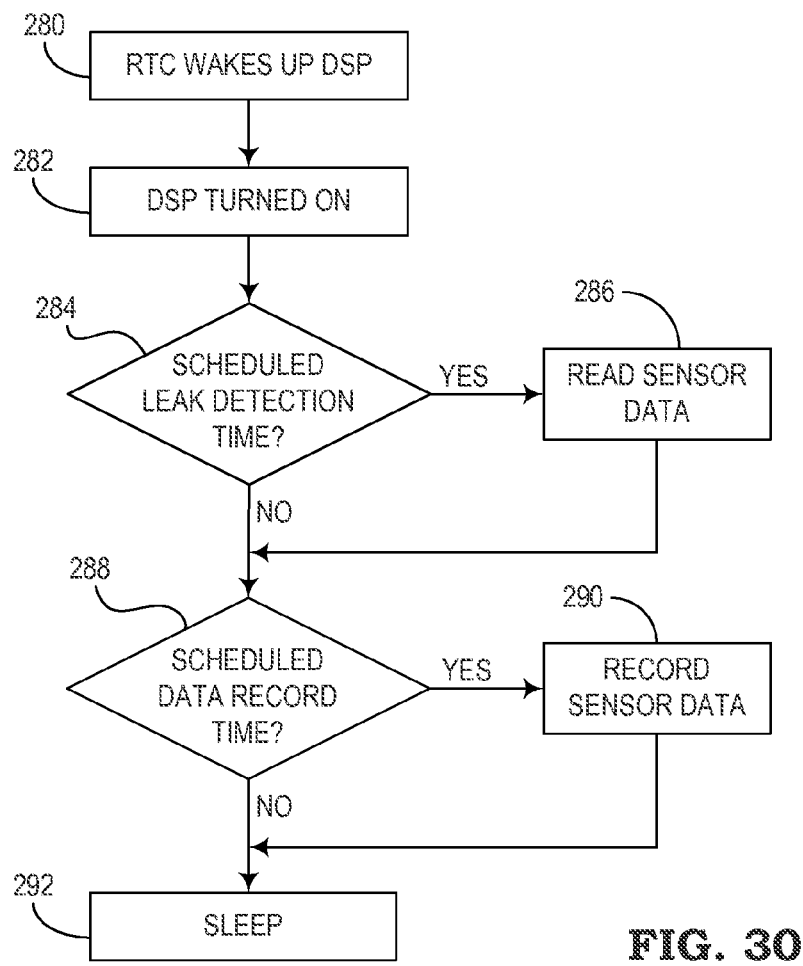
FIG. 30 is a flow diagram illustrating a method regarding sleep/wake times of components of a processing device shown in FIG. 20 according to various implementations of the present disclosure.

FIG. 30 is a flow diagram illustrating another method. Referring back to FIG. 28, if the RTC 184 calls for the DSP 164 to wake up, the method proceeds to the method of FIG. 29. In this method, the RTC 184 wakes up the DSP 164 as shown in block 280. The DSP 164 is turned on as shown in block 282. The method then proceeds to block 284 to determine if it is the scheduled leak detection time. If yes, the method reads sensor data as shown by block 286, after which the method proceeds to block 288. If no, the method skips block 286 and proceeds to block 288. Block 288 represents the decision of whether it is the scheduled time to record data. If yes, the method proceeds to block 290 to record sensor data, after which the DSP 164 sleeps as shown by block 292. If no, the method skips block 290 and proceeds directly to block 292 to sleep the DSP 164. Recording sensor data as shown by block 290 of FIG. 29 may include any or all of the following: turning the sensor and codec on, sending codec settings (including filter settings and sampling frequency), retrieving data for data recording time, compressing and gathering clipped data, and storing data in memory, among others.

Reading sensor data as shown by block 286 may include any or all of the following: turning the sensors and codec on, sending codec settings (including filter settings and sampling frequency), performing a Fourier transformation or FFT, determining whether leak data is found, estimating noise, comparing current noise and signal profiles with prior saved profiles, determining if any significant changes have occurred and flagging significant changes as leaks, determining a probability of a leak, and repeating for the allotted time, among others.

According to various implementations of the present disclosure, leak detectors and systems and methods for detecting leaks are provided. In some embodiments, a leak detector may comprise a sensor assembly including at least one sensor configured to sense acoustic signals and at least one printed circuit board coupled to the sensor assembly. The printed circuit board may be configured to support a processing device that includes at least a microcontroller unit (MCU) and a digital signal processor (DSP). The MCU may be configured to continually receive acoustic signals from the sensor assembly and the DSP may be configured to remain in a sleep mode except when the MCU wakes the DSP from the sleep mode at predetermined times.

During the predetermined times, the DSP is configured to process the sensed acoustic signals. The DSP may be configured to compare the strength of the sensed acoustic signals with a baseline waveform and then determine a probability of a leak based at least on the extent to which the sensed acoustic signals exceed the baseline waveform. The DSP may compare the sensed acoustic signals with the baseline waveform within a predetermined frequency bandwidth. The leak detector may further comprise a first crystal oscillator coupled to the MCU and a second crystal oscillator coupled to the DSP. In some embodiments, the at least one printed circuit board is further configured to support a sensor interface coupled between the sensor assembly and the MCU.

The sensor assembly may comprise at least an acoustic sensor and a pressure sensor, wherein the pressure sensor is configured to detect a burst in a pipe. The MCU may be configured to analyze a high-speed pressure transient profile of the pressure sensor to detect the burst. Also, the MCU may be configured to wake the DSP when a burst is detected. In addition, the sensor assembly may further comprise a temperature sensor. The leak detector described above may have a sensor assembly that is configured to detect acoustic signals from water pipes having a diameter greater than twelve inches. In other embodiments, the sensor assembly may be configured to detect acoustic signals from water pipes having a diameter less than twelve inches.

The at least one printed circuit board mentioned above may be further configured to support a communication device for wirelessly communicating acoustic signals to a host. The at least one printed circuit board may comprise a first circuit board and a second circuit board, the first circuit board configured to support the MCU and DSP, and the second circuit board configured to support the communication device.

The DSP may be configured to convert the acoustic signals to the time domain using a Fast Fourier transform process. The sensor assembly may comprise at least a hydrophone that continually senses acoustic signals. The MCU may be configured to correlate acoustic waveforms associated with events unrelated to leaks in order to remove any presence of the correlated waveforms from the sensed acoustic signals. One method for correlating acoustic waveforms may involve sampling a particular area during high traffic times of day, using Fourier Transforms to understand which frequencies spike at which times of the day, and filtering out these frequencies from the associated signal. Other methods known in the art or developed in keeping with other aspects of this application of one of skill in the art may be utilized to provide this correlation. The leak detector may further comprise memory for storing the acoustic signals and a power source configured to provide power to the processing device.

According to a method for detecting leaks, one embodiment includes placing a digital signal processor (DSP) in a sleep mode, wherein the DSP is incorporated in a leak detector. The method also includes determining whether a request is received from a host to awaken the DSP and awakening the DSP when the request is received. Also, it is determined whether an urgent event related to a leak in a water main has been detected by a microcontroller unit (MCU) and awakening the DSP when the urgent event is detected. The method also includes enabling the DSP to analyze acoustic signals when awakened.

Awakening the DSP as mentioned above comprises the step of turning on a processor of the DSP. Turning on the processor of the DSP may comprise utilizing a real time clock to turn on the processor. The method may further comprise the step of forwarding the analyzed acoustic signals to a communication device for communication to the host.

As stated earlier, piezoelectric material must be accurately and repeatably punched to effect a predictable response curve. As such, FIG. 31 displays the punching jig 1200 for punching mounting holes in sensors 150,150'. The jig 1200 includes a support 1210, a cup 1220, and a punch 1230.

Figure 32:
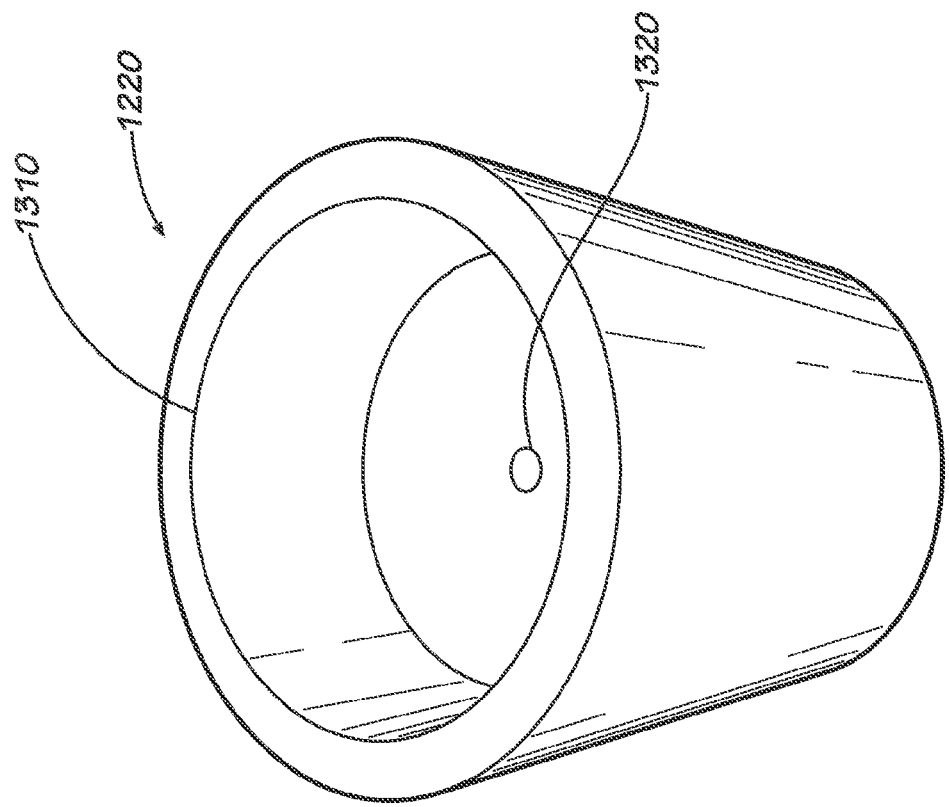
FIG. 32 is a perspective view of a cup of the jig of FIG. 31.
Figure 33:
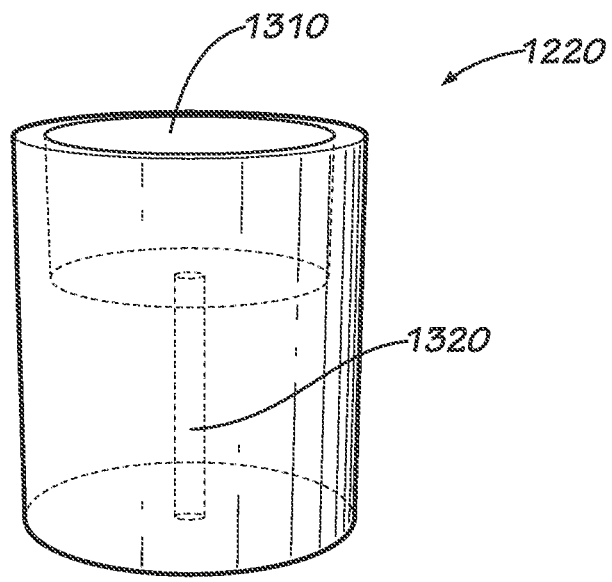
FIG. 33 is a perspective view of the cup of FIG. 32.

Referring to FIGS. 32 and 33, the cup 1220 is generally cylindrical in shape. The cup 1220 includes a cylindrical recess 1310 and a bore 1320. Although all features of the cup 1220 are cylindrical and/or circular in cross-section in the current embodiment, other configurations are considered included in this disclosure. As seen in the view of FIG. 33, the recess 1310 and bore 1320 are approximately a constant diameter for their entire depth in the current embodiment. Stated differently, neither the recess 1310 nor the bore 1320 include any taper, although a taper may be found in some embodiments. Dimensions included in the current figures should not be considered limiting on the disclosure, as any dimensions sufficient to perform the described function are considered included in this disclosure. The dimensions included are for illustration only and provide but one possible configuration.

Figure 34:
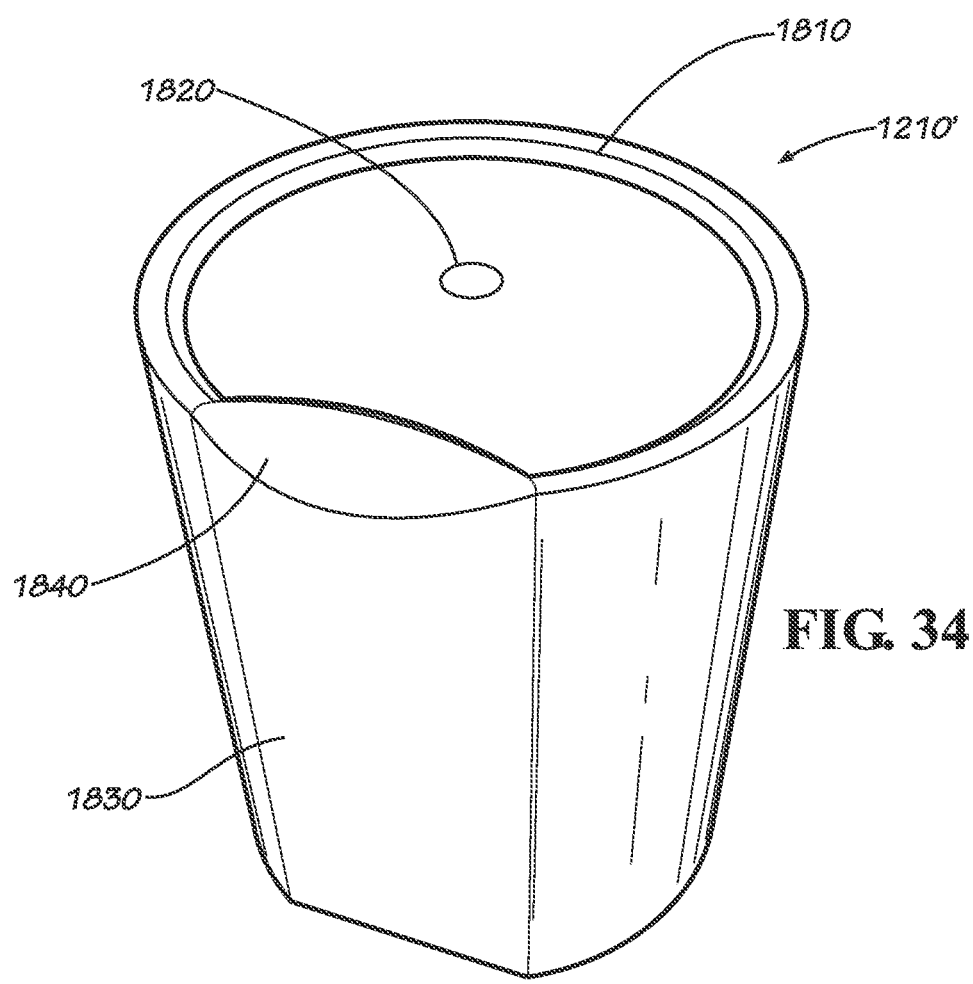
FIG. 34 is a perspective view of a support of the jig of FIG. 31.
Figure 35:
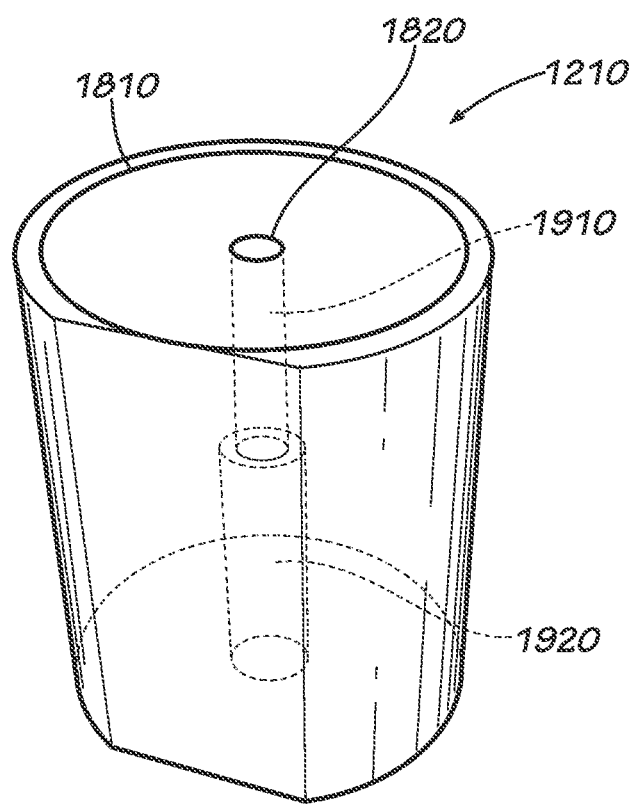
FIG. 35 is a perspective view of a support of the jig of FIG. 31.

FIG. 34 displays the support 1210'. FIG. 35 displays the support 1210. Each support 1210,1210' includes a sensor recess 1810 sized to accept vibration sensor 150. A bore 1820 is located centrally to the sensor recess 1810. A cutout 1830 is located in the side of the support 1210,1210'. Because the vibration sensor 150 is provided with electrical leads (such as leads 157a,b) attached to its outer edge, the cutout 1830 provides clearances so that the leads 157a,b will not be crushed inside the jig 1200. The support 1210' includes a relief edge 1840 between the sensor recess 1810 and the cutout 1830 so that the leads 157a,b are not exposed to any sharp edges. Although a flat cutout 1830 is included in the current embodiment, any type of cutout 1830 may be included in various embodiments so long as the cutout 1830 provides clearance for the leads 157a,b.

Figure 36:
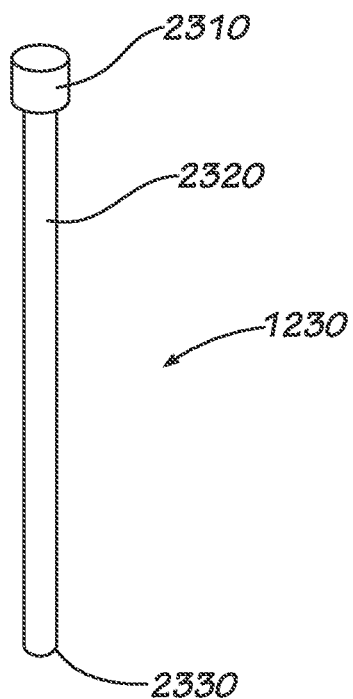
FIG. 36 is a perspective view of a punch of the jig of FIG. 31.
Figure 37:
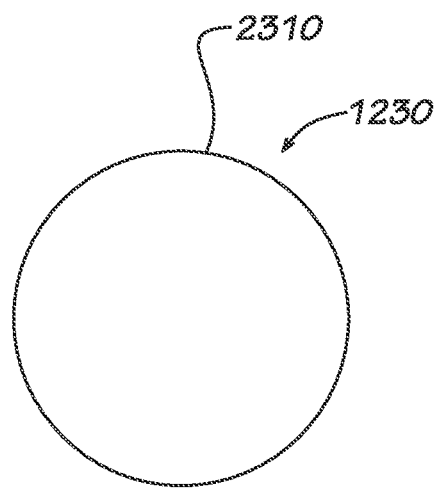
FIG. 37 is a top view of the punch of FIG. 36
Figure 38:
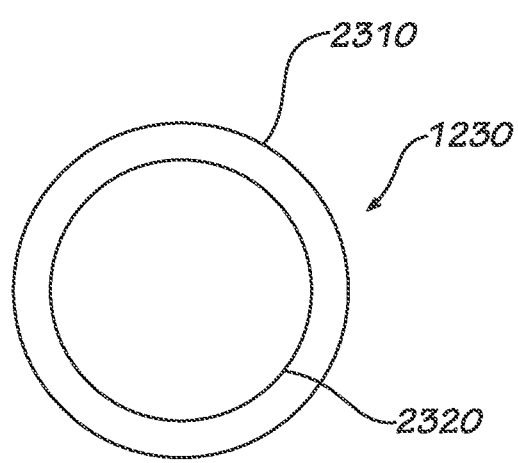
FIG. 38 is a bottom view of the punch of FIG. 36.

As can be seen with reference to FIG. 35, the bore 1820 includes an upper portion 1910 and a lower portion 1920. The upper portion 1910 includes approximately the same diameter as the bore 1320. The lower portion 1920 includes a larger diameter than the bore 1320. It should also be noted that the support 1210 includes a taper to the outside edge, such that the bottom of the support 1210 is smaller in diameter or footprint than the top of the support 1210. The punch 1230 is shown in FIG. 36. The punch 1230 includes a head 2310 and a shaft 2320. A punching edge 2330 is included at the bottom of the shaft 2320. The punching edge 2330 is designed to be sharp to effect a clean cut on the piezoelectric sensors 150. The shaft 2320 is of a diameter slightly smaller than the diameter of the bore 1320 and the upper portion 1910. The diameter of the head 2310 is larger than the diameter of the shaft 2320 which fits into the bore 1320. This can be seen in FIGS. 37 and 38. The diameter of the head 2310 is larger than the diameter of the bore 1320 to retain it against the jig 1200.

Referring back to FIG. 31, the jig 1200 is assembled with the punch 1230 inserted into the bore 1320. To create a mounting hole 158 in vibration sensor 150, one vibration sensor 150 without a mounting hole 158 is placed in the sensor recess 1810. The sensor recess 1810 is sized to hold the vibration sensor 150 in a specific alignment to effect a precise bore in the vibration sensor 150 when punched. The leads 157a,b of the vibration sensor 150 are aligned with the cutout 1830 and fed down the side of the support 1210. The cup 1220 is placed over the support 1210 and the vibration sensor 150. The vibration sensor 150 is supported along its entire bottom surface by the support 1210 and is held in place by the pressure of the cup 1220. Because piezoelectric material may be extremely brittle, the support placed along the entire bottom surface aids in preventing fracture of the piezoelectric material.

To effect a bore such that a mounting hole 158 is created, the punch 1230 is first inserted into the bore 1320. Because it is a tight fit, the punch 1230 is located precisely in the center of the vibration sensor 150. Quick, high-force pressure is applied to the punch 1230. The punching edge 2330 comes in contact with the vibration sensor 150, thereby forcing it through the vibration sensor 150 and creating mounting hole 158 in the sensor 150. The punch 1230 continues through the upper portion 1910 and is sized so that punching edge 2330 will extend through the upper portion 1910 and into the lower portion 1920. This gives the blank created as a byproduct of the punching clearance to fall out of the jig 1200. Although the disclosure refers to punching a vibration sensor 150 that is produced at low cost, various materials may be used for the vibration sensor 150 or for various other sensors in accord with this disclosure. This disclosure contemplates that one of skill in the art may both create the sensor (through deposition of piezoelectric material and a conductor on a base) and punch mounting holes in one process. Nothing in this disclosure is intended to suggest that these steps must be performed by multiple actors. Additionally, a mounting hole may be included prior to the deposition of piezoelectric material or conductor on the base.

This disclosure represents one of many possible assembly configurations. One skilled in the art will understand obvious variations of this disclosure are intended to be included, including variations of steps, combinations of steps, and dissections of steps, among others. Where materials are chosen for the elements of this assembly, similar material choices may also be used and would be obvious to one in the art.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

Various implementations described in the present disclosure may include additional systems, methods, features, and advantages, which may not necessarily be expressly disclosed herein but will be apparent to one of ordinary skill in the art upon examination of the detailed description and accompanying drawings. It is intended that all such systems, methods, features, and advantages be included within the present disclosure and protected by the accompanying claims.

What is claimed is:

1. A leak detection sensor for attachment to a fire hydrant, the leak detection structure comprising:
   a housing that is fixed to the fire hydrant, the fire hydrant defining an internal surface that defines a hydrant cavity, the housing being in fluid communication with the hydrant cavity, the housing having internal surfaces defining a housing cavity internal to the housing; and
   a leak detection subassembly, the leak detection subassembly including:
   at least one piezoelectric vibration sensor mounted with a fastener to an internal surface of the housing within the housing cavity, the at least one piezoelectric vibration sensor including a base and a piezoelectric layer deposited onto the base, the piezoelectric layer composed of piezoelectric crystals, the at least one piezoelectric vibration sensor arranged to receive a vibration from the housing via the fastener;
   at least one circuit arranged within the housing cavity and in electrical communication with the at least one piezoelectric sensor;
   an antenna in electrical communication with the at least one circuit;
   and wherein the housing is rigid.

2. The leak detection structure of claim 1, wherein the housing is a housing assembly including a primary housing and a mating housing connected to the primary housing.

3. The leak detection structure of claim 2, wherein the housing cavity is open on one side of the primary housing, and wherein the mating housing is connected to the primary housing on the open side of the housing cavity such that the mating housing substantially seals the interior of the primary housing from the exterior of the primary housing.

4. The leak detection structure of claim 1, wherein each at least one circuit is encased in potting and wherein each piezoelectric vibration sensor is not encased in potting.

5. The leak detection structure of claim 1, further comprising at least one battery.

6. The leak detection structure of claim 5, wherein the housing is a housing assembly including a primary housing and a mating housing connected to the primary housing, wherein the at least one battery is arranged in a mating cavity of the mating housing, and wherein the at least one battery is encased in potting.

7. The leak detection structure of claim 6, wherein the at least one battery is removably connected to the at least one circuit.

8. The leak detection structure of claim 1, wherein the antenna protrudes from the housing.

9. The leak detection structure of claim 8, wherein an antenna cable connects the antenna to the at least one circuit.

10. The leak detection structure of claim 8, wherein the housing defines an internal surface and an external surface, the internal surface and external surface defining a bore extending from the internal surface to the external surface, an intersection between the bore and the external surface defining a housing outlet; and the antenna protrudes out from the housing through the housing outlet.

11. The leak detection structure of claim 1, wherein the housing includes threading for attachment to the threading of the fire hydrant.

12. The leak detection structure of claim 1, wherein the at least one piezoelectric vibration sensor is coated with a sensor damping material that dampens frequencies outside of a desired frequency range within which leak detection is expected.

13. The leak detection structure of claim 1, wherein the at least one piezoelectric vibration sensor includes:
a conduction layer deposited above the piezoelectric layer, the conduction layer composed of conductive material.

14. The leak detection structure of claim 1, wherein the base and the piezoelectric layer of the at least one piezoelectric vibration sensor are a first base and a first piezoelectric layer, wherein the at least one piezoelectric vibration sensor includes:
a second base joined to the first base through an adhesive layer;
a second piezoelectric layer deposited onto the second base opposite the adhesive layer, the second piezoelectric layer composed of piezoelectric crystals; and
a conduction layer deposited above each piezoelectric layer, the conduction layer composed of conductive material.

15. A leak detection structure permanently attached to a fire hydrant, the leak detection structure comprising:
a nozzle cap fixed to the fire hydrant, the nozzle cap having internal surfaces defining a cavity internal to the nozzle cap, the nozzle cap defining an internal surface and an external surface, the internal surface and the external surface defining a nozzle cap bore extending from the internal surface to the external surface, an intersection between the nozzle cap bore and the external surface defining a nozzle cap outlet;
a housing secured to the nozzle cap within the cavity of the nozzle cap, the housing having internal surfaces defining a cavity internal to the housing,
at least one piezoelectric vibration sensor mounted with a fastener to an internal surface of the housing, the at least one piezoelectric vibration sensor including a base and a piezoelectric layer deposited onto the base, the piezoelectric layer composed of piezoelectric crystals, the at least one piezoelectric vibration sensor arranged to receive a vibration from the nozzle cap via the fastener;
at least one circuit arranged in the cavity and in electrical communication with the at least one piezoelectric vibration sensor; and
an antenna in electrical communication with the at least one circuit, the antenna protruding out from the fire hydrant through the nozzle cap outlet.

16. The leak detection structure of claim 15, wherein at least one battery is removably connected to the at least one circuit.

17. A leak detection structure for attachment to a fire hydrant, the leak detection structure comprising:
a housing assembly including a rigid primary housing and a rigid mating housing connected to the primary housing, the primary housing fixed to the fire hydrant, the primary housing defining a cavity that is open on one side of the primary housing, wherein the mating housing substantially seals the cavity;
a leak detection subassembly, the leak detection subassembly including
at least one piezoelectric vibration sensor mounted with a fastener to an internal surface of the housing within the cavity, the at least one piezoelectric vibration sensor including a base and a piezoelectric layer deposited onto the base, the piezoelectric layer composed of piezoelectric crystals, the at least one piezoelectric vibration sensor arranged to receive a vibration from the housing via the fastener,
at least one circuit arranged within the cavity and in electrical communication with the at least one piezoelectric vibration sensor, and
an antenna in electrical communication with the at least one circuit; and
an antenna enclosure fixed to the fire hydrant, the antenna arranged within the antenna enclosure.

18. The leak detection structure of claim 17, wherein at least one battery is removably connected to the at least one circuit.

19. The leak detection structure of claim 17, wherein:
the antenna enclosure defines an internal surface and an external surface, the internal surface and external surface defining a bore extending from the internal surface to the external surface, an intersection between the bore and the external surface defining an antenna enclosure outlet; and
the antenna protrudes out from the antenna enclosure through the antenna enclosure outlet.

* * * * *